United States Patent
Graham et al.

(10) Patent No.: US 9,087,104 B2
(45) Date of Patent: Jul. 21, 2015

(54) DYNAMIC PRESENTATION OF TARGETED INFORMATION IN A MIXED MEDIA REALITY RECOGNITION SYSTEM

(71) Applicants: Jamey Graham, San Jose, CA (US); Jonathan J. Hull, San Carlos, CA (US)

(72) Inventors: Jamey Graham, San Jose, CA (US); Jonathan J. Hull, San Carlos, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/789,669

(22) Filed: Mar. 7, 2013

(65) Prior Publication Data

US 2013/0218886 A1   Aug. 22, 2013

Related U.S. Application Data

(63) Continuation of application No. 12/342,330, filed on Dec. 23, 2008, now Pat. No. 8,156,116, and a continuation-in-part of application No. 11/461,017, filed on Jul. 31, 2006, now Pat. No. 7,702,673, and a (Continued)

(51) Int. Cl.
*G06F 17/30* (2006.01)
*G06K 9/00* (2006.01)
(Continued)

(52) U.S. Cl.
CPC .... *G06F 17/30477* (2013.01); *G06F 17/30035* (2013.01); *G06F 17/30047* (2013.01); *G06F 17/30247* (2013.01); *G06F 17/30648* (2013.01); *G06F 17/30699* (2013.01); *G06F 17/30876* (2013.01); *G06K 9/00463* (2013.01); *G06K 9/6227* (2013.01); *G06K 9/6262* (2013.01);
(Continued)

(58) Field of Classification Search
CPC .................. G06F 17/30047; G06F 17/30247; G06F 17/30274
See application file for complete search history.

(56) References Cited

U.S. PATENT DOCUMENTS

| 5,010,581 A | 4/1991 | Kanno |
| 5,754,772 A | 5/1998 | Leaf |

(Continued)

FOREIGN PATENT DOCUMENTS

| JP | 2001-265811 | 9/2001 |
| JP | 2002521752 | 7/2002 |

(Continued)

OTHER PUBLICATIONS

JP Office Action for JP Patent Application No. 2009-119205 dated Feb. 19, 2013, 2 pages.

(Continued)

*Primary Examiner* — Wilson Lee
(74) *Attorney, Agent, or Firm* — Patent Law Works LLP

(57) ABSTRACT

A context-aware targeted information delivery system comprises a mobile device, an MMR matching unit, a plurality of databases for user profiles, user context and advertising information, a plurality of comparison engines and a plurality of weight adjusters. The mobile device is coupled to deliver an image patch to the MMR matching unit which in turn performs recognition to produce recognize text. The recognized text is provided to a first and second comparison engines to produce relevant topics and relevant ads. The relevant topics and relevant ads are adjusted with information from a user context database including information such as location, date, time, and other information from a user profile. The third comparison engine compares the relevant topics and relevant ads to produce a set of final ads that are most related to the topics of interest for the user and delivered for display on to the mobile device.

20 Claims, 42 Drawing Sheets

Related U.S. Application Data continuation-in-part of application No. 11/461,279, filed on Jul. 31, 2006, now Pat. No. 8,600,989, and a continuation-in-part of application No. 11/461,286, filed on Jul. 31, 2006, now Pat. No. 8,335,789, and a continuation-in-part of application No. 11/461,294, filed on Jul. 31, 2006, now Pat. No. 8,332,401, and a continuation-in-part of application No. 11/461,300, filed on Jul. 31, 2006, now Pat. No. 8,521,737, and a continuation-in-part of application No. 11/461,126, filed on Jul. 31, 2006, now Pat. No. 8,195,659, and a continuation-in-part of application No. 11/461,143, filed on Jul. 31, 2006, now Pat. No. 8,156,427, and a continuation-in-part of application No. 11/461,268, filed on Jul. 31, 2006, now Pat. No. 7,639,387, and a continuation-in-part of application No. 11/461,272, filed on Jul. 31, 2006, now Pat. No. 8,005,831, and a continuation-in-part of application No. 11/461,064, filed on Jul. 31, 2006, now Pat. No. 7,669,148, and a continuation-in-part of application No. 11/461,075, filed on Jul. 31, 2006, now Pat. No. 7,812,986, and a continuation-in-part of application No. 11/461,090, filed on Jul. 31, 2006, now Pat. No. 7,551,780, and a continuation-in-part of application No. 11/461,037, filed on Jul. 31, 2006, now Pat. No. 8,838,591, and a continuation-in-part of application No. 11/461,085, filed on Jul. 31, 2006, now Pat. No. 8,949,287, and a continuation-in-part of application No. 11/461,091, filed on Jul. 31, 2006, now Pat. No. 7,885,955, and a continuation-in-part of application No. 11/461,095, filed on Jul. 31, 2006, now Pat. No. 7,917,554, and a continuation-in-part of application No. 11/466,414, filed on Aug. 22, 2006, now Pat. No. 7,587,412, and a continuation-in-part of application No. 11/461,147, filed on Jul. 31, 2006, and a continuation-in-part of application No. 11/461,164, filed on Jul. 31, 2006, and a continuation-in-part of application No. 11/461,024, filed on Jul. 31, 2006, now Pat. No. 7,991,778, and a continuation-in-part of application No. 11/461,032, filed on Jul. 31, 2006, now Pat. No. 7,672,543, and a continuation-in-part of application No. 11/461,049, filed on Jul. 31, 2006, now Pat. No. 7,920,759, and a continuation-in-part of application No. 11/461,109, filed on Jul. 31, 2006, and a continuation-in-part of application No. 11/827,530, filed on Jul. 11, 2007, now Pat. No. 8,276,088, and a continuation-in-part of application No. 12/060,194, filed on Mar. 31, 2008, now Pat. No. 8,156,115, and a continuation-in-part of application No. 12/059,583, filed on Mar. 31, 2008, and a continuation-in-part of application No. 12/060,198, filed on Mar. 31, 2008, and a continuation-in-part of application No. 12/060,200, filed on Mar. 31, 2008, now Pat. No. 8,989,431, and a continuation-in-part of application No. 12/060,206, filed on Mar. 31, 2008, and a continuation-in-part of application No. 12/121,275, filed on May 15, 2008, now Pat. No. 8,385,589, and a continuation-in-part of application No. 11/776,510, filed on Jul. 11, 2007, now Pat. No. 8,086,038, and a continuation-in-part of application No. 11/776,520, filed on Jul. 11, 2007, now Pat. No. 8,144,921, and a continuation-in-part of application No. 11/776,530, filed on Jul. 11, 2007, now Pat. No. 8,184,155, and a continuation-in-part of application No. 11/777,142, filed on Jul. 12, 2007, now Pat. No. 8,176,054, and a continuation-in-part of application No. 11/624,466, filed on Jan. 18, 2007, now Pat. No. 7,970,171, and a continuation-in-part of application No. 12/210,511, filed on Sep. 15, 2008, now Pat. No. 8,825,682, and a continuation-in-part of application No. 12/210,519, filed on Sep. 15, 2008, now Pat. No. 8,510,283, and a continuation-in-part of application No. 12/210,532, filed on Sep. 15, 2008, now Pat. No. 8,868,555, and a continuation-in-part of application No. 12/210,540, filed on Sep. 15, 2008, now Pat. No. 8,856,108, and a continuation-in-part of application No. 11/327,087, filed on Jan. 5, 2006, now Pat. No. 8,620,747.

(51) Int. Cl.
  *G06K 9/62* (2006.01)
  *G06Q 30/02* (2012.01)

(52) U.S. Cl.
  CPC .............. *G06K 9/6292* (2013.01); *G06Q 30/02* (2013.01); *G06Q 30/0241* (2013.01)

(56) References Cited

U.S. PATENT DOCUMENTS

| | | |
|---|---|---|
| 5,848,184 A | 12/1998 | Taylor et al. |
| 5,889,886 A | 3/1999 | Mahoney |
| 5,933,823 A | 8/1999 | Cullen |
| 6,006,240 A | 12/1999 | Handley |
| 6,026,411 A | 2/2000 | Delp |
| 6,121,969 A | 9/2000 | Jain et al. |
| 6,430,312 B1 | 8/2002 | Huang et al. |
| 6,693,649 B1 | 2/2004 | Lipscomb et al. |
| 6,874,131 B2 | 3/2005 | Blumberg |
| 6,958,821 B1 | 10/2005 | McIntyre |
| 7,054,489 B2 | 5/2006 | Yamaoka et al. |
| 7,150,021 B1 | 12/2006 | Vajjhala et al. |
| 7,213,101 B1 | 5/2007 | Srinivasan |
| 7,725,508 B2 | 5/2010 | Lawarence et al. |
| 7,742,953 B2 * | 6/2010 | King et al. .................. 705/26.1 |
| 7,801,845 B1 | 9/2010 | King et al. |
| 8,326,037 B1 | 12/2012 | Abitz et al. |
| 8,386,336 B1 | 2/2013 | Fox et al. |
| 8,600,989 B2 | 12/2013 | Hull et al. |
| 8,612,475 B2 | 12/2013 | Graham et al. |
| 8,676,810 B2 | 3/2014 | Moraleda |
| 8,825,682 B2 | 9/2014 | Kishi et al. |
| 8,838,591 B2 | 9/2014 | Hull et al. |
| 8,856,108 B2 | 10/2014 | Erol et al. |
| 8,868,555 B2 | 10/2014 | Erol et al. |
| 8,892,595 B2 | 11/2014 | Graham et al. |
| 8,949,287 B2 | 2/2015 | Hull et al. |
| 8,965,145 B2 | 2/2015 | Moraleda et al. |
| 8,989,431 B1 | 3/2015 | Erol et al. |
| 2001/0047373 A1 | 11/2001 | Jones |
| 2002/0008697 A1 | 1/2002 | Deering |
| 2002/0029232 A1 | 3/2002 | Bobrow et al. |
| 2002/0069418 A1 | 6/2002 | Philips |
| 2002/0126905 A1 | 9/2002 | Suzuki et al. |
| 2002/0129057 A1 | 9/2002 | Spielberg |
| 2002/0131641 A1 | 9/2002 | Luo et al. |
| 2002/0198789 A1 | 12/2002 | Waldman |
| 2003/0012428 A1 | 1/2003 | Syeda-Mahmood |
| 2003/0063319 A1 | 4/2003 | Umeda et al. |
| 2003/0069932 A1 | 4/2003 | Hall et al. |
| 2004/0015495 A1 | 1/2004 | Kim et al. |
| 2004/0220898 A1 | 11/2004 | Eguchi et al. |
| 2004/0264780 A1 | 12/2004 | Zhang |
| 2005/0021478 A1 | 1/2005 | Gautier et al. |
| 2005/0080871 A1 | 4/2005 | Dinh et al. |
| 2005/0088684 A1 | 4/2005 | Naito et al. |
| 2005/0097435 A1 | 5/2005 | Prakash et al. |
| 2005/0108406 A1 | 5/2005 | Lee et al. |
| 2005/0187768 A1 | 8/2005 | Godden |
| 2005/0256866 A1 | 11/2005 | Lu et al. |
| 2006/0047639 A1 * | 3/2006 | King et al. ........................ 707/3 |
| 2006/0053101 A1 | 3/2006 | Stuart et al. |

(56) References Cited

U.S. PATENT DOCUMENTS

| | | | |
|---|---|---|---|
| 2006/0114485 | A1 | 6/2006 | Sato |
| 2006/0140614 | A1 | 6/2006 | Kim et al. |
| 2006/0192997 | A1 | 8/2006 | Matsumoto et al. |
| 2006/0200347 | A1 | 9/2006 | Kim et al. |
| 2006/0253491 | A1 | 11/2006 | Gokturk et al. |
| 2006/0262352 | A1* | 11/2006 | Hull et al. ............ 358/1.18 |
| 2006/0264209 | A1 | 11/2006 | Atkinson et al. |
| 2006/0294094 | A1* | 12/2006 | King et al. ............ 707/6 |
| 2007/0006129 | A1 | 1/2007 | Cieslak et al. |
| 2007/0041642 | A1 | 2/2007 | Romanoff et al. |
| 2007/0118794 | A1 | 5/2007 | Hollander et al. |
| 2007/0300142 | A1* | 12/2007 | King et al. ............ 715/500 |
| 2008/0004944 | A1 | 1/2008 | Calabria |
| 2008/0009268 | A1 | 1/2008 | Ramer et al. |
| 2008/0059419 | A1 | 3/2008 | Auerbach et al. |
| 2008/0141117 | A1* | 6/2008 | King et al. ............ 715/238 |
| 2008/0177541 | A1 | 7/2008 | Satomura |
| 2010/0013615 | A1 | 1/2010 | Hebert et al. |
| 2010/0046842 | A1* | 2/2010 | Conwell ............ 382/218 |
| 2010/0211567 | A1 | 8/2010 | Abir |
| 2011/0314031 | A1 | 12/2011 | Chittar et al. |

FOREIGN PATENT DOCUMENTS

| | | |
|---|---|---|
| JP | 2004-055658 | 2/2004 |
| JP | 2004234656 | 8/2004 |
| JP | 2005100274 | 4/2005 |
| JP | 2005157931 | 6/2005 |
| JP | 2006-229465 | 8/2006 |
| JP | 2007264992 | 10/2007 |
| JP | 2008-158823 | 7/2008 |
| WO | WO00/05663 | 2/2000 |

OTHER PUBLICATIONS

U.S. Appeal Decision, U.S. Appl. No. 11/461,164, dated Feb. 27, 2013, 10 pages.
U.S. Appeal Decision, U.S. Appl. No. 11/461,147, dated Mar. 4, 2013, 11 pages.
U.S. Appeal Decision, U.S. Appl. No. 11/461,109, dated Mar. 13, 2013, 23 pages.
US Non-Final Office Action for U.S. Appl. No. 12/060,200, dated Mar. 22, 2013, 47 pages.
US Final Office Action for U.S. Appl. No. 11/461,279 dated Mar. 25, 2013, 36 pages.
US Non-Final Office Action for U.S. Appl. No. 12/060,198 dated Apr. 2, 2013, 56 pages.
US Notice of Allowance for U.S. Appl. No. 13/415,228 dated Apr. 30, 2013, 10 pages.
US Notice of Allowance for U.S. Appl. No. 12/210,519 dated May 1, 2013, 24 pages.
US Notice of Allowance for U.S. Appl. No. 13/273,189 dated May 9, 2013, 11 pages.
European Office Action for Application No. 08 252 377.0, dated Aug. 9, 2013, 5 pages.
Non-Final Office Action for U.S. Appl. No. 13/330,492, dated Aug. 27, 2013, 14 pages.
Non-Final Office Action for U.S. Appl. No. 11/461,164, dated Aug. 30, 2013, 19 pages.
Non-Final Office Action for U.S. Appl. No. 12/240,596, dated Sep. 5, 2013, 17 pages.
Non-Final Office Action for U.S. Appl. No. 11/461,109, dated Sep. 9, 2013, 14 pages.
European Search Report for Application No. 12159375.0, dated Sep. 12, 2013, 9 pages.
Notice of Allowance for U.S. Appl. No. 13/273,189, dated Sep. 13, 2013, 15 pages.
Non-Final Office Action for U.S. Appl. No. 11/461,147, dated Sep. 27, 2013, 15 pages.
Non-Final Office Action for U.S. Appl. No. 12/210,532, dated Oct. 7, 2013, 18 pages.
Non-Final Office Action for U.S. Appl. No. 12/247,205, dated Oct. 7, 2013, 19 pages.
Final Office Action for U.S. Appl. No. 11/461,037, dated Oct. 24, 2013, 24 pages.
Chi-Hung Chi et al., Context Query in Information Retrieval, dated 2002, Proceedings of the 14th IEEE International Conference on Tools with Artificial Intelligence (ICTAI'02) 6 pages (http://ieeexplore.ieee.org/stamp/stamp.jsp?tp=&arnumber=1180793).
US Notice of Allowance for U.S. Appl. No. 11/461,300 dated May 15, 2013, 13 pages.
US Final Office Action for U.S. Appl. No. 13/273,186, dated Jun. 12, 2013, 24 pages.
US Non-Final Office Action for U.S. Appl. No. 11/461,037, dated Jun. 24, 2013, 25 pages.
US Non-Final Office Action for U.S. Appl. No. 12/719,437, dated Jun. 25, 2013, 22 pages.
US Notice of Allowance for U.S. Appl. No. 11/461,279, dated Jul. 31, 2013, 14 pages.
JP Office Action for JP Application No. 2009212242 dated Jul. 16, 2013, 2 pages.
US Non-Final Office Action for U.S. Appl. No. 11/461,085, dated Jul. 9, 2013, 11 pages.
Japanese Office Action for JP Application No. 2013222652, dated May 20, 2014, 5 pages.
Japanese Office Action for JP Application No. 2013222655, dated May 20, 2014, 4 pages.
Non-Final Office Action for U.S. Appl. No. 13/933,078, dated Mar. 17, 2014, 9 pages.
Notice of Allowance for U.S. Appl. No. 13/273,186, dated Mar. 26, 2014, 9 pages.
Notice of Allowance for U.S. Appl. No. 11/461,037, dated Apr. 3, 2014, 10 pages.
Non-Final Office Action for U.S. Appl. No. 12/060,200, dated Apr. 8, 2014, 65 pages.
Non-Final Office Action for U.S. Appl. No. 11/461,085, dated Apr. 9, 2014, 16 pages.
Final Office Action for U.S. Appl. No. 11/461,147, dated Apr. 24, 2014, 11 pages.
Notice of Allowance for U.S. Appl. No. 12/210,511, dated Apr. 30, 2014, 11 pages.
Final Office Action for U.S. Appl. No. 12/247,205, dated May 13, 2014, 17 pages.
Notice of Allowance for U.S. Appl. No. 12/210,540, dated May 22, 2014, 20 pages.
Final Office Action for U.S. Appl. No. 13/729,458, dated Jun. 2, 2014, 8 pages.
Non-Final Office Action for U.S. Appl. No. 13/192,458, dated Jun. 5, 2014, 12 pages.
Final Office Action for U.S. Appl. No. 12/060,198, dated Jun. 5, 2014, 63 pages.
Josef Sivic, "Video Google: A Text Retrieval Approach to Object Matching in Videos," IEEE, Proceedings of the Ninth IEEE International Conference on Computer Vision (ICCV 2003), 8 pages, vol. 2.
Non-Final Office Action for U.S. Appl. No. 12/060,198, dated Nov. 7, 2013, 55 pages.
Final Office Action for U.S. Appl. No. 12/060,200, dated Nov. 8, 2013, 58 pages.
Non-Final Office Action for U.S. Appl. No. 13/273,186, dated Dec. 5, 2013, 25 pages.
Final Office Action for U.S. Appl. No. 11/461,085, dated Dec. 10, 2013, 16 pages.
Non-Final Office Action for U.S. Appl. No. 13/729,458, dated Dec. 17, 2013, 8 pages.
Non-Final Office Action for U.S. Appl. No. 12/253,715, dated Dec. 19, 2013, 38 pages.
Notice of Allowance for U.S. Appl. No. 12/240,596, dated Dec. 23, 2013, 10 pages.
Final Office Action for U.S. Appl. No. 11/461,164, dated Dec. 26, 2013, 17 pages.
Final Office Action for U.S. Appl. No. 13/330,492, dated Jan. 2, 2014, 15 pages.
Final Office Action for U.S. Appl. No. 12/719,437, dated Jan. 16, 2014, 22 pages.

(56) References Cited

OTHER PUBLICATIONS

Final Office Action for U.S. Appl. No. 13/192,458, dated Jan. 27, 2014, 13 pages.
Non-Final Office Action for U.S. Appl. No. 12/340,124, dated Jan. 29, 2014, 24 pages.
Japanese Application Office Action for JP Publication No. 2013-192033, dated Jun. 24, 2014, 7 pages.
Japanese Application Office Action for JP Publication No. 2013-222655, dated Aug. 26, 2014, 5 pages.
Jonathan Hull, Mixed Media Reality (MMR) A New Method of eP-Fusion, Ricoh Technical Report, Ricoh Company, Ltd., dated Dec. 1, 2007, No. 33, p. 119-125; online search dated Aug. 22, 2013 <URL: http://www.ricoh.com/ja/technology/techreport/33/pdf/A3314.pdf >.
Non-Final Office Action for U.S. Appl. No. 11/461,109 dated Jun. 26, 2014, 18 pages.
Notice of Allowance for U.S. Appl. No. 13/273,186 dated Jul. 10, 2014, 9 pages.
Non-Final Office Action for U.S. Appl. No. 13/330,492 dated Jul. 17, 2014, 16 pages.
Final Office Action for U.S. Appl. No. 12/253,715, dated Jul. 25, 2014, 40 pages.
Final Office Action for U.S. Appl. No. 12/340,124, dated Aug. 21, 2014, 26 pages.
Non-Final Office Action for U.S. Appl. No. 13/494,008 dated Sep. 10, 2014, 18 pages.
Non-Final Office Action for U.S. Appl. No. 11/461,164, dated Sep. 15, 2014, 18 pages.
Notice of Allowance for U.S. Appl. No. 11/461,085, dated Sep. 17, 2014, 5 pages.
Moghaddam et al., Visualization and User-Modeling for Browsing Personal Photo Libraries, Mitsubishi Electric Research Laboratories, dated Feb. 2004, 34 pages.
Notice of Allowance for U.S. Appl. No. 13/729,458, dated Sep. 29, 2014, 8 pages.
Final Office Action for U.S. Appl. No. 13/933,078, dated Oct. 6, 2014, 14 pages.
Notice of Allowance for U.S. Appl. No. 12/060,200, dated Nov. 5, 2014, 8 pages.
Final Office Action for U.S. Appl. No. 13/330,492, dated Nov. 26, 2014, 18 pages.
Notice of Allowance for U.S. Appl. No. 12/340,124, dated Dec. 19, 2014, 12 pages.
Non-Final Office Action for U.S. Appl. No. 12/253,715, dated Jan. 7, 2015, 35 pages.
Final Office Action for U.S. Appl. No. 11/461,109, dated Jan. 15, 2015, 20 pages.
Notice of Allowance for U.S. Appl. No. 13/192,458, dated Jan. 28, 2015, 9 pages.
Final Office Action for U.S. Appl. No. 13/494,008, dated Feb. 10, 2015, 20 pages.
Non-Final Office Action for U.S. Appl. No. 13/933,078, dated Feb. 26, 2015, 7 pages.
Final Office Action for U.S. Appl. No. 11/461,164, dated Mar. 12, 2015, 19 pages.
Non-Final Office Action for U.S. Appl. No. 12/060,198, dated Mar. 13, 2015, 22 pages.
Non-Final Office Action for U.S. Appl. No. 11/461,147, dated Mar. 20, 2015, 11 pages.

* cited by examiner

DYNAMIC PRESENTATION OF TARGETED INFORMATION IN A MIXED MEDIA REALITY RECOGNITION SYSTEM

CROSS REFERENCE TO RELATED APPLICATIONS

This application is a continuation of U.S. patent application Ser. No. 12/342,330, titled "Dynamic Presentation of Targeted Information in a Mixed Media Reality Recognition System," filed Dec. 23, 2008; which is a continuation in part of U.S. patent application Ser. No. 11/461,017, titled "System and Methods for Creation and Use of a Mixed Media Environment," filed Jul. 31, 2006; U.S. patent application Ser. No. 11/461,279, titled "Method and System for Image Matching in a Mixed Media Environment," filed Jul. 31, 2006; U.S. patent application Ser. No. 11/461,286, titled "Method and System for Document Fingerprinting Matching in a Mixed Media Environment," filed Jul. 31, 2006; U.S. patent application Ser. No. 11/461,294, titled "Method and System for Position-Based Image Matching in a Mixed Media Environment," filed Jul. 31, 2006; U.S. patent application Ser. No. 11/461,300, titled "Method and System for Multi-Tier Image Matching in a Mixed Media Environment," filed Jul. 31, 2006; U.S. patent application Ser. No. 11/461,126, titled "Integration and Use Of Mixed Media Documents," filed Jul. 31, 2006; U.S. patent application Ser. No. 11/461,143, titled "User Interface for Mixed Media Reality," filed Jul. 31, 2006; U.S. patent application Ser. No. 11/461,268, titled "Authoring Tools Using A Mixed Media Environment," filed Jul. 31, 2006; U.S. patent application Ser. No. 11/461,272, titled "System and Methods for Creation and Use of a Mixed Media Environment With Geographic Location Information," filed Jul. 31, 2006; U.S. patent application Ser. No. 11/461,064, titled "System and Methods for Portable Device for Mixed Media System," filed Jul. 31, 2006; U.S. patent application Ser. No. 11/461,075, titled "System and Methods for Use Of Voice Mail and Email in a Mixed Media Environment," filed Jul. 31, 2006; U.S. patent application Ser. No. 11/461,090, titled "System and Method for Using Individualized Mixed Document," filed Jul. 31, 2006; U.S. patent application Ser. No. 11/461,037, titled "Embedding Hot Spots In Electronic Documents," filed Jul. 31, 2006; U.S. patent application Ser. No. 11/461,085, titled "Embedding Hot Spots In Imaged Documents," filed Jul. 31, 2006; U.S. patent application Ser. No. 11/461,091, titled "Shared Document Annotation," filed Jul. 31, 2006; U.S. patent application Ser. No. 11/461,095, titled "Visibly-Perceptible Hot Spots In Documents," filed Jul. 31, 2006; U.S. patent application Ser. No. 11/466,414, titled "Mixed Media Reality Brokerage Network and Methods of Use," filed Aug. 22, 2006; U.S. patent application Ser. No. 11/461,147, titled "Data Organization and Access for Mixed Media Document System," filed Jul. 31, 2006; U.S. patent application Ser. No. 11/461,164, titled "Database for Mixed Media Document System," filed Jul. 31, 2006; U.S. patent application Ser. No. 11/461,024, titled "Triggering Actions With Captured Input in a Mixed Media Environment," filed Jul. 31, 2006; U.S. patent application Ser. No. 11/461,032, titled "Triggering Applications Based On A Captured Text in a Mixed Media Environment," filed Jul. 31, 2006; U.S. patent application Ser. No. 11/461,049, titled "Triggering Applications for Distributed Action Execution and Use Of Mixed Media Recognition As A Control Input," filed Jul. 31, 2006; U.S. patent application Ser. No. 11/461,109, titled "Searching Media Content for Objects Specified Using Identifiers," filed Jul. 31, 2006; U.S. patent application Ser. No. 11/827,530, titled "User Interface for Three-Dimensional Navigation," filed Jul. 11, 2007; U.S. patent application Ser. No. 12/060,194, titled "Document-Based Networking With Mixed Media Reality," filed Mar. 31, 2008; U.S. patent application Ser. No. 12/059,583, titled "Invisible Junction Feature Recognition for Document Security Or Annotation," filed Mar. 31, 2008; U.S. patent application Ser. No. 12/060,198, titled "Document Annotation Sharing," filed Mar. 31, 2008; U.S. patent application Ser. No. 12/060,200, titled "Ad Hoc Paper-Based Networking With Mixed Media Reality," filed Mar. 31, 2008; U.S. patent application Ser. No. 12/060,206, titled "Indexed Document Modification Sharing With Mixed Media Reality," filed Mar. 31, 2008; U.S. patent application Ser. No. 12/121,275, titled "Web-Based Content Detection In Images, Extraction and Recognition," filed May 15, 2008; U.S. patent application Ser. No. 11/776,510, titled "Invisible Junction Features for Patch Recognition," filed Jul. 11, 2007; U.S. patent application Ser. No. 11/776,520, titled "Information Retrieval Using Invisible Junctions and Geometric Constraints," filed Jul. 11, 2007; U.S. patent application Ser. No. 11/776,530, titled "Recognition and Tracking Using Invisible Junctions," filed Jul. 11, 2007; U.S. patent application Ser. No. 11/777,142, titled "Retrieving Documents By Converting Them to Synthetic Text," filed Jul. 12, 2007; U.S. patent application Ser. No. 11/624,466, titled "Synthetic Image and Video Generation From Ground Truth Data," filed Jan. 18, 2007; U.S. patent application Ser. No. 12/210,511, titled "Architecture for Mixed Media Reality Retrieval Of Locations and Registration Of Images," filed Sep. 15, 2008; U.S. patent application Ser. No. 12/210,519, titled "Automatic Adaptation of an Image Recognition System To Image Capture Devices," filed Sep. 15, 2008; U.S. patent application Ser. No. 12/210,532, titled "Computation of a Recognizability Score (Quality Predictor) for Image Retrieval," filed Sep. 15, 2008; U.S. patent application Ser. No. 12/210,540, titled "Combining Results Of Image Retrieval Processes" filed Sep. 15, 2008; and U.S. patent application Ser. No. 11/327,087, titled "Method, System and Computer Code for Content Based Web Advertising," filed Jan. 5, 2006, all of which are incorporated by reference herein in their entirety.

BACKGROUND OF THE INVENTION

1. Field of the Invention

The invention relates to a Mixed Media Reality (MMR) system that uses printed media in combination with electronic media to retrieve mixed media documents. Still more particular, the present invention relates to a method for delivering targeted information to mobile devices using an MMR system and a user's context, history and pattern of interacting with paper documents.

2. Background of the Invention

Document printing and copying technology has been used for many years in many contexts. By way of example, printers and copiers are used in commercial office environments, in home environments with personal computers, and in document printing and publishing service environments. However, printing and copying technology has not been thought of previously as a means to bridge the gap between static printed media (i.e., paper documents), and the "virtual world" of interactivity that includes the likes of digital communication, networking, information provision, advertising, entertainment and electronic commerce.

Printed media has been the primary source of communicating information, such as news papers and advertising information, for centuries. The advent and ever-increasing popularity of personal computers and personal electronic devices, such as personal digital assistant (PDA) devices and cellular telephones (e.g., cellular camera phones), over the past few years has expanded the concept of printed media by making it available in an electronically readable and searchable form and by introducing interactive multimedia capabilities, which are unparalleled by traditional printed media.

Unfortunately, a gap exists between the electronic multimedia-based world that is accessible electronically and the physical world of print media. For example, although almost everyone in the developed world has access to printed media and to electronic information on a daily basis, users of printed media and of personal electronic devices do not possess the tools and technology required to form a link between the two (i.e., for facilitating a mixed media document).

Moreover, there are particular advantageous attributes that conventional printed media provides such as tactile feel, no power requirements, and permanency for organization and storage, which are not provided with virtual or digital media. Likewise, there are particular advantageous attributes that conventional digital media provides such as portability (e.g., carried in storage of cell phone or laptop) and ease of transmission (e.g., email).

One particular problem is that a publisher cannot allow access to electronic versions of content using printed versions of the content. For example, for the publisher of a newspaper there is no mechanism that allows its users who receive the printed newspaper on a daily basis to use images of the newspaper to access the same online electronic content as well as augmented content. Moreover, while the publisher typically has the content for the daily newspaper in electronic form prior to printing, there currently does not exist a mechanism to easily migrate that content into an electronic form with augmented content.

A second problem in the prior art is that the image capture devices that are most prevalent and common as part of mobile computing devices (e.g., cell phones) produce low-quality images. In attempting to compare the low-quality images to pristine versions of printed documents, recognition is very difficult if not impossible. Thus there is a need for a method for recognizing low-quality images of printed newspapers.

A third problem in the prior art is that the image recognition process is computationally very expensive and can require seconds if not minutes to accurately recognize the page and location of a pristine document from an input query image. This can especially be a problem with a large data set, for example, millions of pages of documents. Thus, there is a need for mechanisms to improve the speed in which recognition can be performed.

A fourth problem in the prior is that comparing low-quality images to a database of pristine images often produces a number of possible matches. Furthermore, when low-quality images are used as the query image, multiple different recognition algorithms may be required in order to produce any match. Currently the prior art does not have a mechanism to combine the recognition results into a single result that can be presented to the user.

A fifth problem in the prior is that most cell phones and other smart phones have very limited functional capabilities. Most cell phones are used predominately for voice communication, and some add the capability for data communication (simple email), and to capture images. Cell phones use the voice channel, data channel or in some cases WiFi or 3G for data communication, but are very limited as to the functions other than those provided by the manufacturer. While the cell phone industry is growing at a phenomenal rate and more people are accessing online content using their cell phone than ever before, the limited screen size and other capabilities of cell phones are a problem for providing enhanced content and advertising. As a result, advertisers are seeking ways of connecting to these users that do not interfere with normal cell phone use and which minimizes the cost to the cell phone user. There have been attempts to embed advertisements in web pages when browsing the web with a cell phone. These advertisements, however, are based on traditional advertising techniques where only the simple context of the web session along with keywords can be used to generate relevant advertisements. The challenge for search engine companies is to find a way to unobtrusively present users with targeted advertisements while conforming to the small form factor of the cell phone screen.

For these reasons, a need exists for techniques, methods and systems that enable the use of mixed media reality systems in the area of mass media printed publishing.

SUMMARY OF THE INVENTION

The present invention overcomes the deficiencies of the prior art with an MMR system that dynamically presents targeted information. In one embodiment, a context-aware targeted information delivery system comprises a mobile device, an MMR matching unit, a plurality of databases for user profiles, user context and advertising information, a plurality of comparison engines and a plurality of weight adjusters. The mobile device is coupled to deliver an image patch to the MMR matching unit which in turn performs recognition to produce recognized text. The recognized text is provided to first and second comparison engines: a first engine receives user profile information and the recognized text to produce relevant topics, and a second comparison engine receives information from an advertiser database and the recognized text to produce relevant ads. The first and second comparison engines are each coupled to a respective weight adjuster. The respective weight adjusters receive information from a user context database including information such as location, date, time, and other information from a user profile in addition to the outputs of the corresponding comparison engines. The respective weight adjusters modify the weightings of the relevant topics and relevant ads, respectively, and each provides the weight-adjusted relevant topics and relevant ads to a third comparison engine. The third comparison engine compares the weighted relevant topics and relevant ads to produce a set of final ads that are most related to the topics of interest for the user. These final ads are delivered for display on the mobile device 102. The present invention also includes a variety of methods including a method for delivering context-aware targeted information, a method for weighting ads and topics and a method for determining and adjusting word relevance based on proximity.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF PREFERRED EMBODIMENTS

Figure 1:
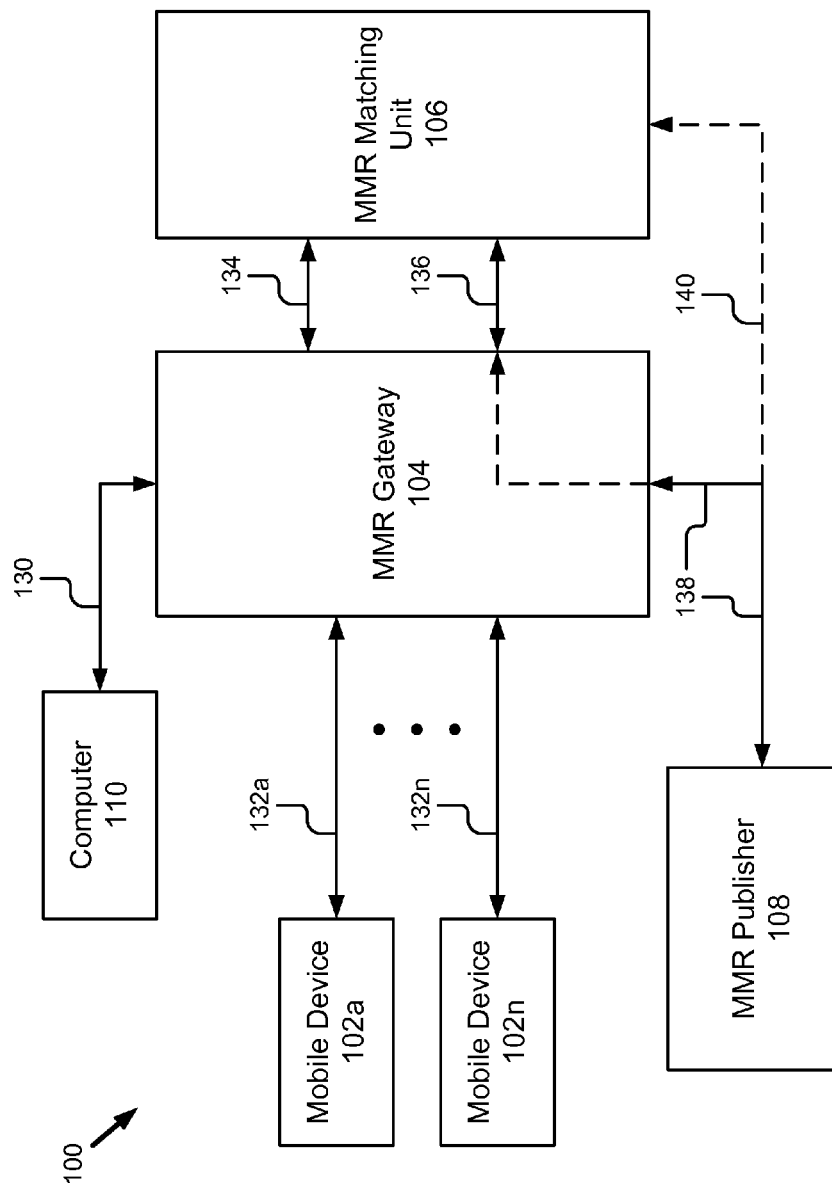
FIG. 1 is a block diagram of a first embodiment of system mixed-media reality retrieval of location and registration of images in accordance with the present invention.

An architecture for a mixed media reality (MMR) system 100 capable of receiving the query images and returning document pages and location as well as receiving images, hot spots and other data and adding such information to the MMR system is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to use with a conventional mass media publisher, in particular a newspaper publisher. However, the present invention applies to any type of computing system and data processing in which multiple types of media including electronic media and print media are used.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present invention is described below in the context of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is described without reference to any particular programming language. It will be appreciated that a variety of programming languages may be used to implement the teachings of the invention as described herein.

System Overview

FIG. 1 shows an embodiment of a MMR system 100 in accordance with the present invention. The MMR system 100 comprises a plurality of mobile devices 102a-102n, an MMR gateway 104, an MMR matching unit 106, an MMR publisher 108 and a computer 110. The present invention provides an MMR system 100 for use in newspaper publishing. The MMR system 100 for newspaper publishing is particularly advantageous because provides an automatic mechanism for a newspaper publisher to register images and content with the MMR system 100. The MMR system 100 for newspaper publishing is also advantageous because it has a unique architecture adapted to respond to image queries formed of image portions or pages of a printed newspaper.

The mobile devices 102a-102n are communicatively coupled by signal lines 132a-132n, respectively, to the MMR gateway 104 to send a "retrieval request." A retrieval request includes one or more of "image queries," other contextual information and metadata. In one embodiment, an image query is an image in any format, or one or more features of an image. Examples of image queries include still images, video frames and sequences of video frames. The mobile devices 102a-102n are mobile phones including a camera to capture images. It should be understood that the MMR system 100 will be utilized by hundreds or even thousands of users that receive a traditional publication such as a daily newspaper. Thus, even though only two mobile devices 102a, 102n are shown, those skilled in the art will appreciate that the MMR gateway 104 may be simultaneously coupled to, receive and respond to retrieval requests from numerous mobile devices 102a-102n. Alternate embodiments for the mobile devices 102a-102n are described in more detail below with reference to FIGS. 2A and 2B.

As noted above, the MMR gateway 104 is able to couple to hundreds if not millions of mobile computing devices 102a-102n and service their retrieval requests. The MMR gateway 104 is also communicatively coupled to the computer 110 by signal line 130 for administration and maintenance of the MMR gateway 104 and running business applications. In one embodiment, the MMR gateway 104 creates and presents a web portal for access by the computer 110 to run business applications as well as access logs of use of the MMR system 100. The computer 110 can be any conventional computing device such as a personal computer. The main function of the MMR gateway 104 is processing retrieval requests from the mobile devices 102a-102n and returning recognition results back to the mobile devices 102a-102n. In one embodiment, the recognition results include one or more of a Boolean value (true/false) and if true, a page ID and a location on the page. In other embodiments, the recognition results also include one or more from the group of actions, a message acknowledging that the recognition was successful (or not) and consequences of that decision, such as the sending of an email message, a document, actions defined within a portable document file, addresses such as URLs, binary data such as video, information capable of being rendered on the mobile device 102, menus with additional actions, raster images, image features, etc. The MMR gateway 104 processes received retrieval requests by performing user authentication, accounting, analytics and other communication. The MMR gateway 104 also generates an image query and recognition parameters from the retrieval request, and passes them on to the MMR matching unit 106 via signal line 134. Embodiments and operation of the MMR gateway 104 are described in greater detail below with reference to FIG. 3.

The MMR matching unit 106 receives the image query from the MMR gateway 104 on signal line 134 and sends it to one or more of recognition units to identify a result including a document, the page and the location on the page corresponding to the image query, referred to generally throughout this application as the "retrieval process." The result is returned from the MMR matching unit 106 to the MMR gateway 104 on signal line 134. In addition to the result, the MMR matching unit 106 may also return other related information such as hotspot data. The MMR matching unit 106 also includes components for receiving new content and updating and reorganizing index tables used in the retrieval process. The process of adding new content to the MMR matching unit 106 is referred to generally throughout this application as the "registration process." In one embodiment, the MMR matching unit 106 is coupled to the output of the MMR publisher 108 via signal lines 138 and 140 to provide new content used to update index tables of the MMR matching unit 106. In alternate embodiment, the MMR publisher 108 is coupled to the MMR gateway 104 by signal line 138 and the MMR gateway 104 is in turn coupled by signal line 136 to the MMR matching unit 106. In this alternate environment, MMR gateway 104 extracts augmented data such as hotspot information, stores it and passes the images, page references and other information to the MMR matching unit 106 for updating of the index tables. Various embodiments of the MMR matching unit 106 and its components are described in more detail below with reference to FIG. 4A-7.

The MMR publisher 108 includes a conventional publishing system used to generate newspapers or other types of periodicals. In one embodiment, the MMR publisher 108 also includes components for generating additional information needed to register images of printed documents with the MMR system 100. The information provided by the MMR publisher 108 to the MMR matching unit 106 includes an image file, bounding box data, hotspot data, and a unique page identification number. In the symbols of embodiment, this is a document in portable document format by Adobe Corp. of San Jose Calif. and bounding box information. An embodiment for the MMR publisher 108 is described in more detail below with reference to FIG. 8.

Mobile Device 102

Figure 2A:
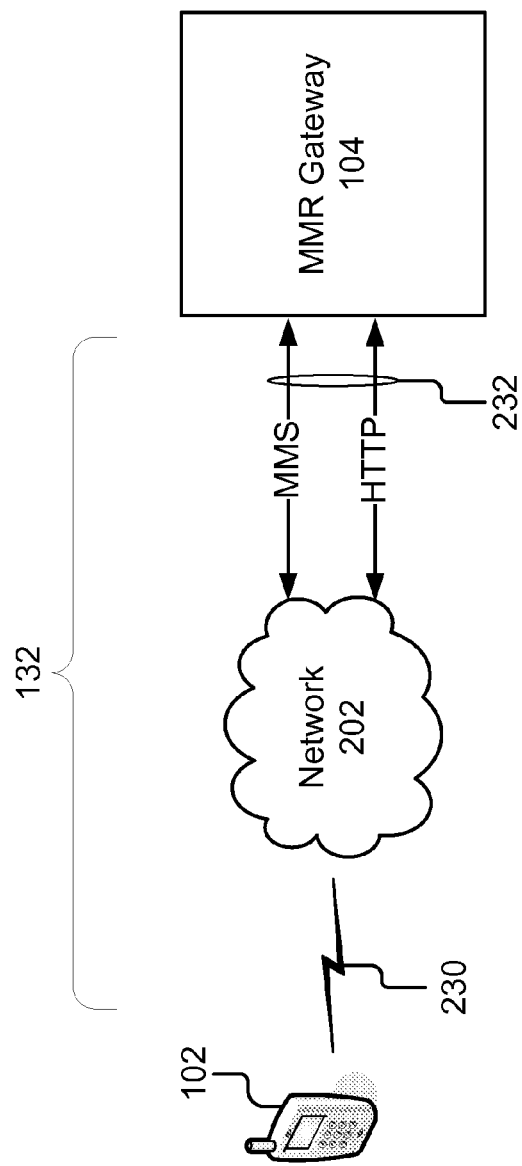
FIG. 2A is a block diagram of a first embodiment of a mobile device, network and MMR gateway configured in accordance with the present invention.
Figure 2B:
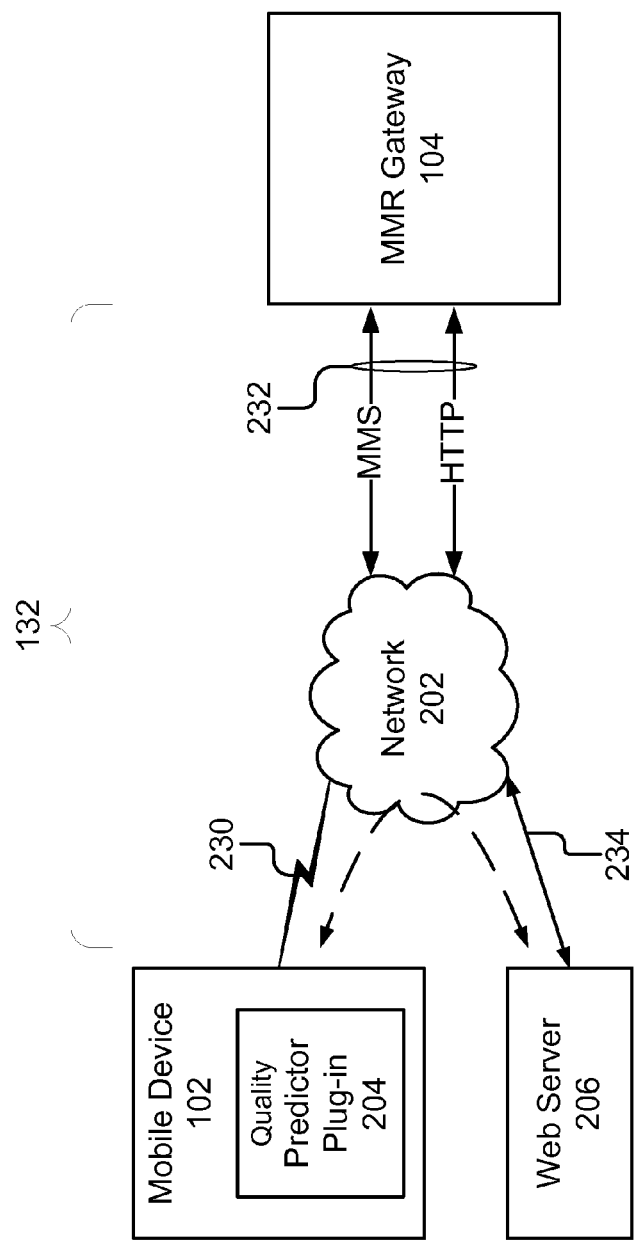
FIG. 2B is a block diagram of a second embodiment of a mobile device, network and MMR gateway configured in accordance with the present invention.

Referring now to FIGS. 2A and 2B, the first and second embodiment for the mobile device 102 will be described.

FIG. 2A shows a first embodiment of the coupling 132 between the mobile device 102 and the MMR gateway 104. In this embodiment, the mobile device 102 is any mobile phone (or other portable computing device with communication capability) that includes a camera. For example, the mobile device 102 may be a smart phone such as the Blackberry® manufactured and sold by Research In Motion. The mobile device 102 is adapted for wireless communication with the network 202 by a communication channel 230. The network 202 is a conventional type such as a cellular network maintained by wireless carrier and may include a server. In this embodiment, the mobile device 102 captures an image and sends the image to the network 202 over communications channel 230 such as by using a multimedia messaging service (MMS). The network 202 can also use the communication channel 230 to return results such as using MMS or using a short message service (SMS). As illustrated, the network 202 is in turn coupled to the MMR gateway 104 by signal lines 232. Signal lines 232 represent a channel for sending MMS or SMS messages as well as a channel for receiving hypertext transfer protocol (HTTP) requests and sending HTTP responses. Those skilled in the art will recognize that this is just one example of the coupling between the mobile device 102 and the MMR gateway 104. In an alternate embodiment for example, Bluetooth®, WiFi or any other wireless communication protocol may be used as part of communication coupling between the mobile device 102 and the MMR gateway 104. The mobile device 102 and the MMR gateway 104 could be coupled in any other ways understood by those skilled in the art (e.g., direct data connection, SMS, WAP, email) so long as the mobile device 102 is able to transmit images to the MMR gateway 104 and the MMR gateway 104 is able to respond by sending document identification, page number and location information.

Referring now to FIG. 2B, a second embodiment of the mobile device 102 is shown. In this second embodiment, the mobile device 102 is a smart phone such as the iPhone™ manufactured and sold by Apple Computer Inc. of Cupertino California. The second embodiment has a number of components similar to those of the first embodiment, and therefore, like reference numbers are used to reference like components with the same or similar functionality. Notable differences between the first embodiment and the second embodiment include a quality predictor plug-in 204 that is installed on the mobile device 102, and a Web server 206 coupled by signal line 234 to the network 202. The quality predictor plug-in 204 analyzes the images captured by the mobile device 102. The quality predictor plug-in 204 provides additional information produced by its analysis and includes that information as part of the retrieval request sent to the MMR gateway 104 to improve the accuracy of recognition. In an alternate embodiment, the output of the quality predictor plug-in 204 is used to select which images are transmitted from the mobile device 102 to the MMR gateway 104. For example, only those images that have a predicted quality above a predetermined threshold (e.g., images capable of being recognized) are transmitted from the mobile device 102 to the MMR gateway 104. Since transmission of images requires significant bandwidth and the communication channel 230 between the mobile device 102 and the network 202 may have limited bandwidth, using the quality predictor plug-in 204 to select which images to transmit is particularly advantageous. The second embodiment shown in FIG. 2B also illustrates how the results returned from the MMR gateway 104 or other information provided by the quality predictor plug-in 204 can be used by the mobile device 102 to access hotspot or augmented information available on a web server 206. In such a case, the results from the MMR gateway 104 or output of the quality predictor plug-in 204 would include information that can be used to access Web server 206 such as with a conventional HTTP request and using web access capabilities of the mobile device 102.

It should be noted that regardless of whether the first embodiment or the second embodiment of the mobile device 102 is used, the mobile device 102 generates the retrieval request that includes: a query image, a user or device ID, a command and other contact information such as device type, software, plug-ins, location (for example if the mobile device includes a GPS capability), device and status information (e.g., device model, macro lens on/off status, autofocus on/off, vibration on/off, tilt angle, etc), context-related information (weather at the phone's location, time, date, applications currently running on the phone), user-related information (e.g., id number, preferences, user subscriptions, user groups and social structures, action and action-related meta data such as email actions and emails waiting to be sent), etc.

Referring now to FIGS. 2C-2H, various embodiments are shown of a plug-in (client 250) for the mobile device 102, the MMR gateway 104 and MMR matching unit 106 represented generally as including a server 252 that has various possible configurations in accordance with the present invention. More particularly, FIGS. 2C-2H illustrate how the components of the plug-in or client 250 can have varying levels of functionality and the server 252 can also have varying levels of functionality that parallel or match with the functionality of the client 250. In the various embodiments of FIGS. 2C-2H, either the client 250 or the server 252 includes: an MMR database 254; a capture module 260 for capturing an image or video; a preprocessing module 262 for processing the image before feature extraction for improved recognition such as quality prediction; a feature extraction module 264 for extracting image features; a retrieval module 266 for using features to retrieve information from the MMR database 254; a send message module 268 for sending messages from the server 252 to the client 250; an action module 270 for performing an action; a preprocessing and prediction module 272 for processing the image prior to feature extraction; a feedback module 274 for presenting information to the user and receiving input; a sending module 276 for sending information from the client 250 to the server 252; and a streaming module 278 for streaming video from the client 250 to the server 252.

Figure 2C:
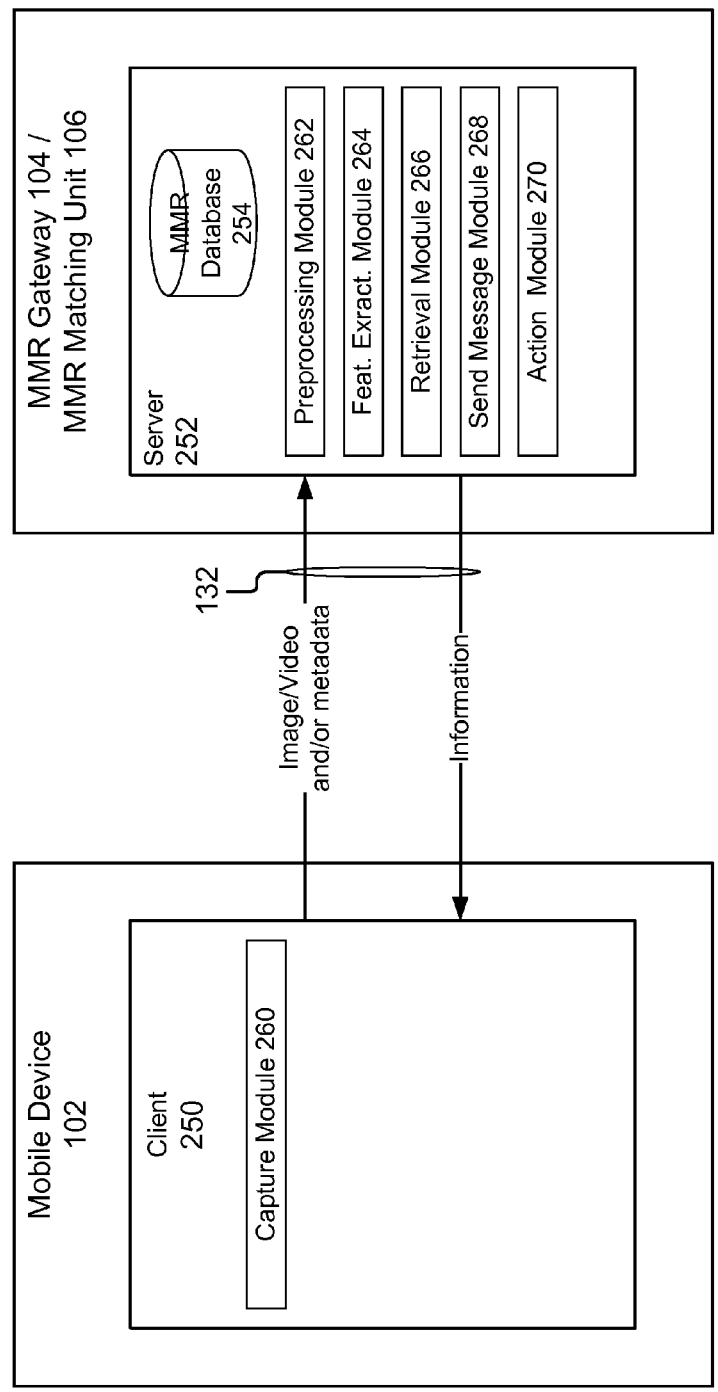
FIGS. 2C-2H are block diagrams of various embodiments of a mobile device plug-in, MMR gateway and MMR matching unit showing various possible configurations in accordance with the present invention.

FIG. 2C illustrates one embodiment for the client 250 and the server 252 in which the client 250 sends an image or video and/or metadata to the server 252 for processing. In this embodiment, the client 250 includes the capture module 260. The server 252 includes: the MMR database 254, the preprocessing module 262, the feature extraction module 264, the retrieval module 266, the send message module 268 and the action module 270. In one embodiment, the client 250 uses the native applications of the mobile device 102 to capture an image, and generate and send a message, such as in a multimedia messaging service (MMS) format, that includes a query image. Such an embodiment is particularly advantageous because no additional software needs to be loaded to the mobile device 102. Further, the message includes additional information such as: 1) email addresses, user ids, and preferences; 2) GPS information, device settings (i.e. macro on/off), etc.; 3) metadata about the query images such as its location and document name; and 4) information about the action to be taken on the recognition result, such as 'send email' or 'add to MySpace', etc. Those skilled in the art will recognize that the message need not include all of the information identified above, but includes as much information as necessary to interact with the server 252 according to the action being performed. The client 250 sends the message including an image or video and/or metadata to the server 252. The server 252 parses the message received to obtain the image and additional information sent by the client 250. In one embodiment, the additional information and the image are used by the preprocessing module 262, the feature extraction module 264, and the retrieval module 268 to recognize the image and identify a corresponding electronic document in the MMR database 254. These operations are described in more detail below with reference to FIGS. 4-7. The recognition results, if any, and additional information are then used by the server 252 to perform an action. In some embodiments, the action(s) that the server 252 performs includes sending a return confirmation message to the client 250 that includes: 1) Identified document(s), pages, and locations; 2) A thumbnail of the identified document; 3) Identified document itself; 4) A video overview of identified document; 5) A message about the performed actions, e.g. 'sent e-mail to xxx@yy.com'; 6) If the image is not retrieved, further instructions about taking the image, such as: a) Image was too blurry, please select macro mode, hold camera still and try again; b) Document was too far from the camera and try again; or c) Image was too dark/there are shadows, and try again.

Figure 2D:
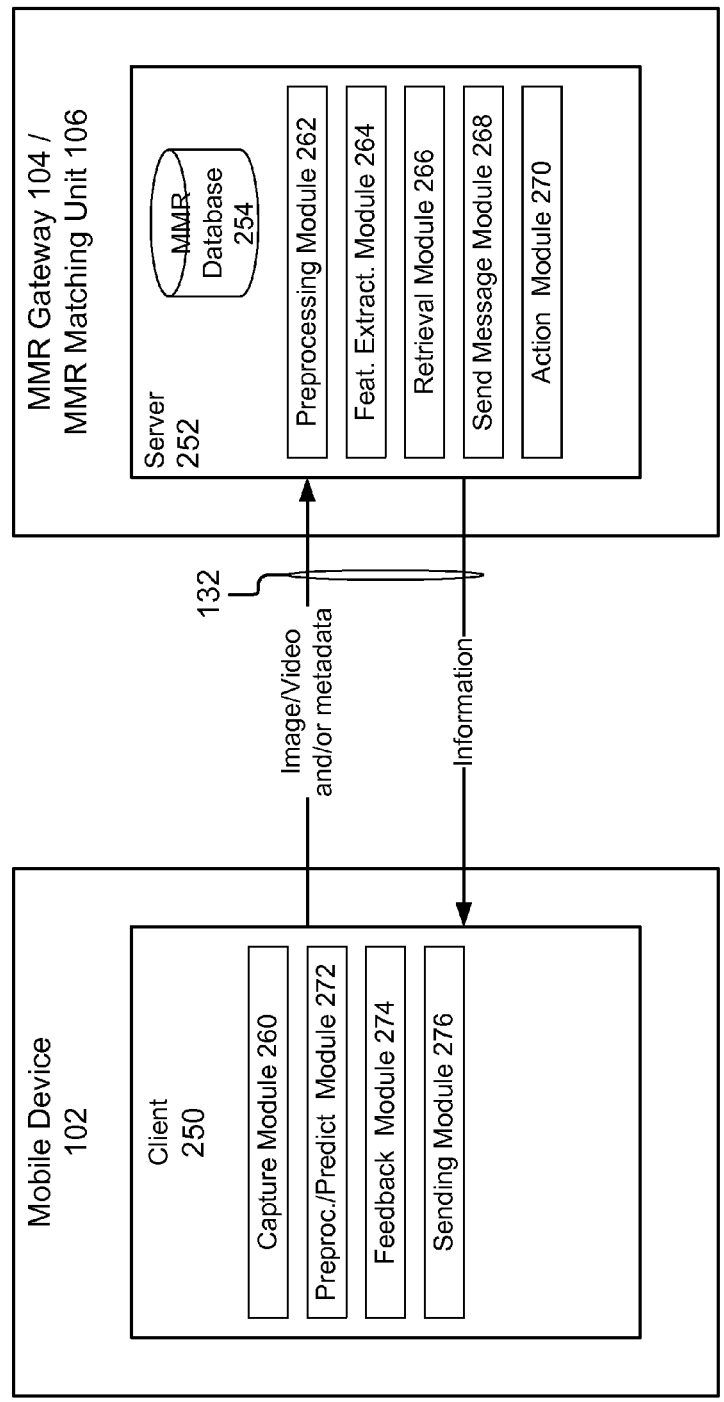

FIG. 2D illustrates another embodiment for the client 250 and the server 252 in which the client 250 captures an image or video, runs quality prediction, and sends an image or video and/or metadata to the server 252 for processing. In this embodiment, the client 250 includes: the capture module 260, the preprocessing and prediction module 272, the feedback module 274 and the sending module 276. The server 252 includes: the MMR database 254, the preprocessing module 262, the feature extraction module 264, the retrieval module 266, the send message module 268 and the action module 270. It should be noted that in this embodiment the image sent to the server 252 may be different than the captured image. For example, the image sent may be digitally enhanced, sharpened, or may be just binary data.

Figure 2E:
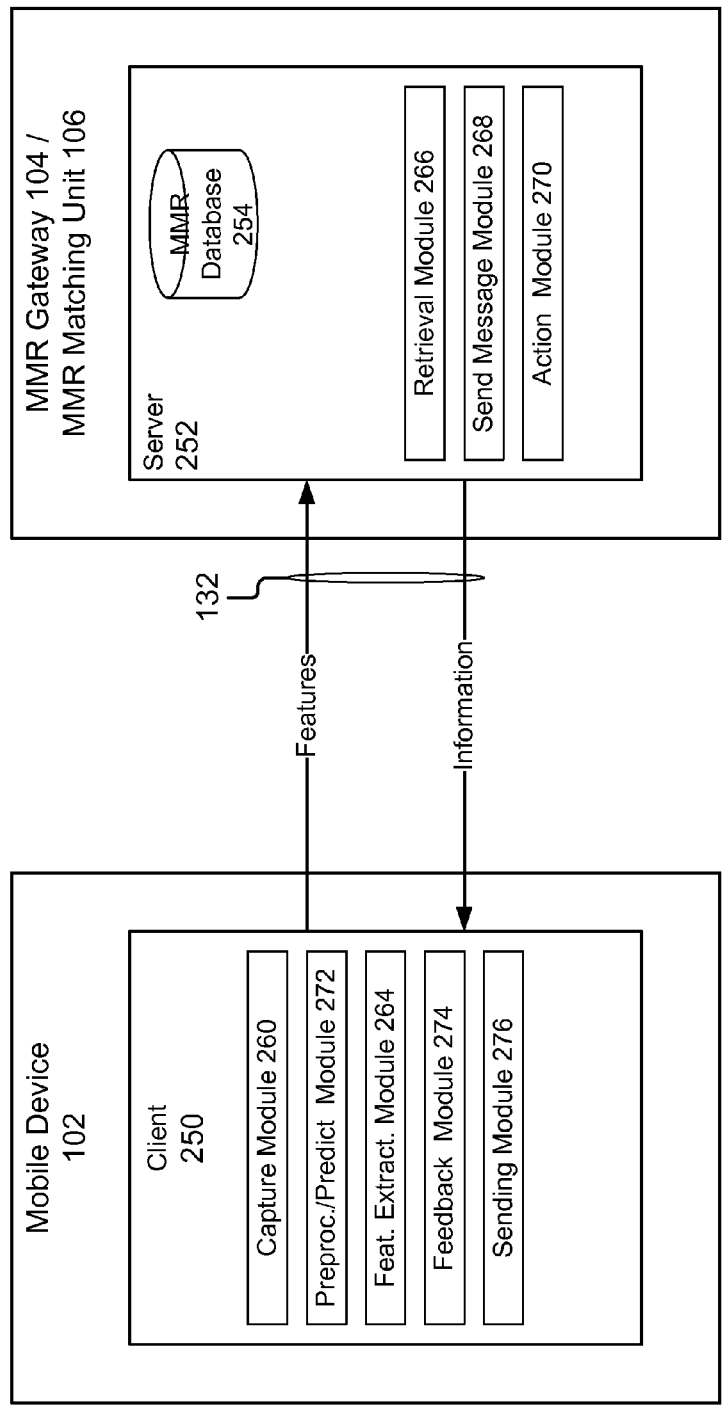

FIG. 2E illustrates another embodiment for the client 250 and the server 252 in which the client 250 captures an image or video, performs feature extraction and sends image features to the server 252 for processing. In this embodiment, the client 250 includes: the capture module 260, the feature extraction module 264, the preprocessing and prediction module 272, the feedback module 274 and the sending module 276. The server 252 includes: the MMR database 254, the retrieval module 266, the send message module 268 and the action module 270. It should be noted that in this embodiment feature extraction may include preprocessing. After features are extracted, the preprocessing and prediction module 272 may run on these features and if the quality of the features is not satisfactory, the user may be asked to capture another image.

Figure 2F:
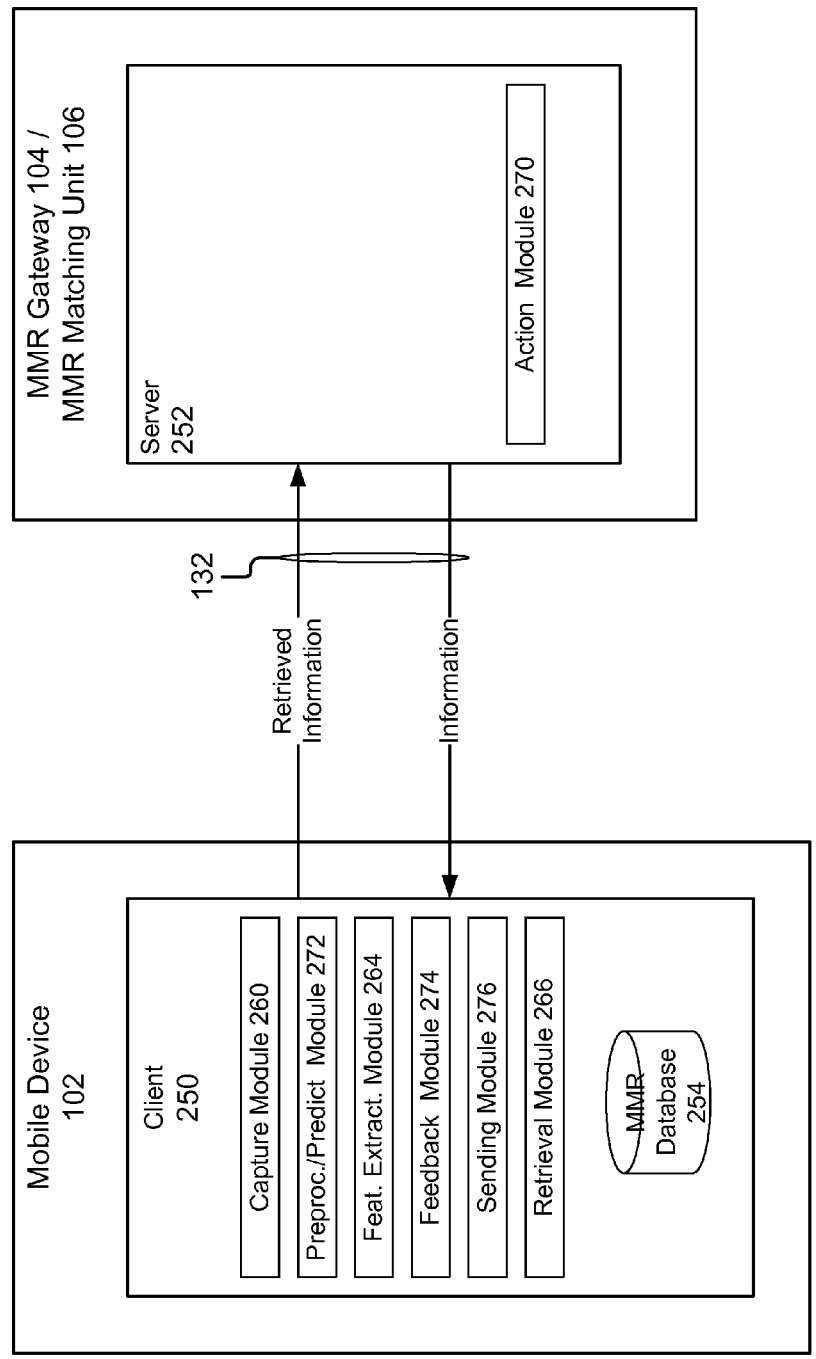

FIG. 2F illustrates another embodiment for the client 250 and the server 252 in which the entire retrieval process is performed at the client 250. In this embodiment, the client 250 includes: the capture module 260, the feature extraction module 264, the preprocessing and prediction module 272, the feedback module 274 and the sending module 276, the MMR database 254, and the retrieval module 266. The server 252 need only have the action module 270. In a modification to this embodiment, the entire retrieval for one recognition algorithm is run on the client 250 of the mobile device 102, and if the query fails, the captured image is sent to the server 252 as described above with reference to FIG. 2C to that the server 252 process the captured image with more complex retrieval algorithms.

Figure 2G:
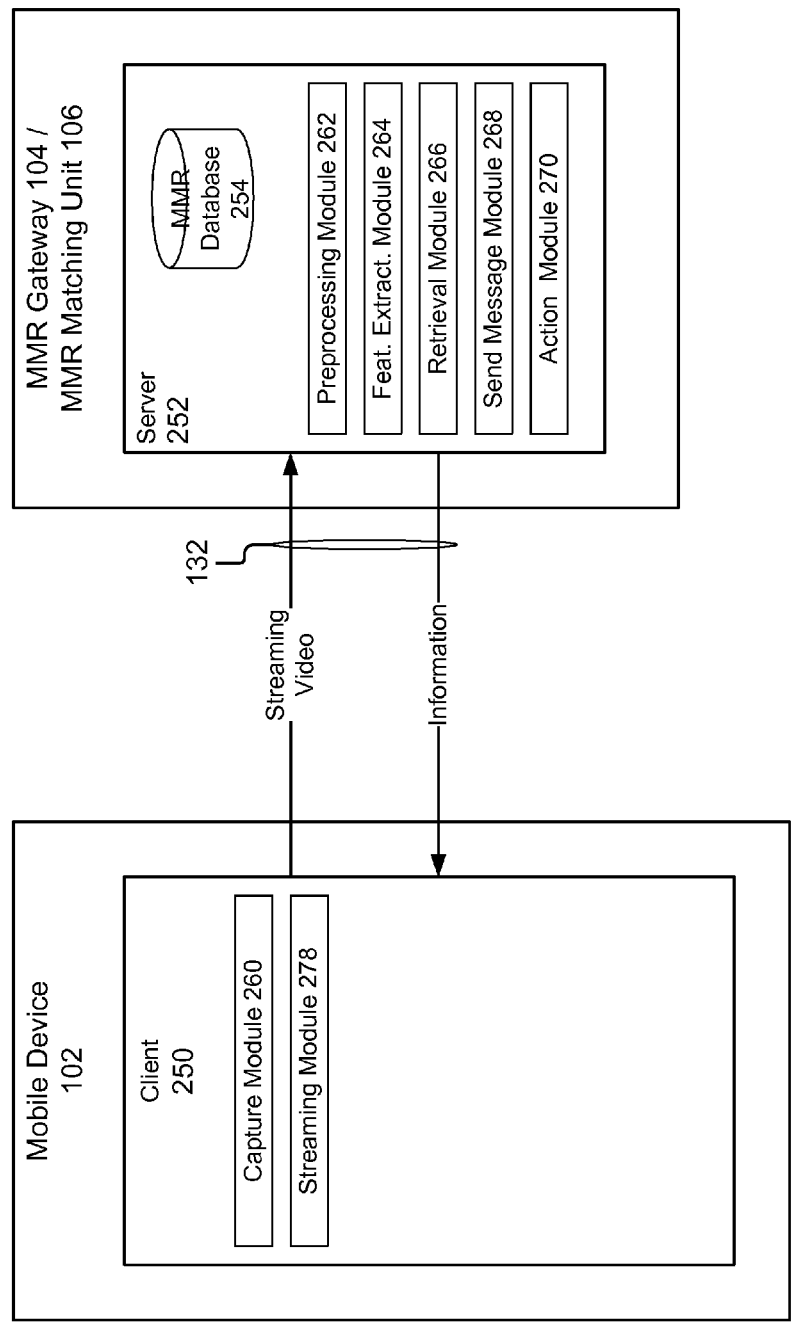

FIG. 2G illustrates another embodiment for the client 250 and the server 252 in which the client 250 streams video to the server 252. In this embodiment, the client 250 includes the capture module 260 and a streaming module 278. The server 252 includes the MMR database 254, the preprocessing module 262, the feature extraction module 264, the retrieval module 266, the send message module 268 and the action module 270. Although not shown, the client 250 can run a predictor in the captured video stream and provide user feedback on where to point the camera or how to capture better video for retrieval. In a modification of this embodiment, the server 252 streams back information related to the captured video and the client 250 can overlay that information on a video preview screen.

Figure 2H:
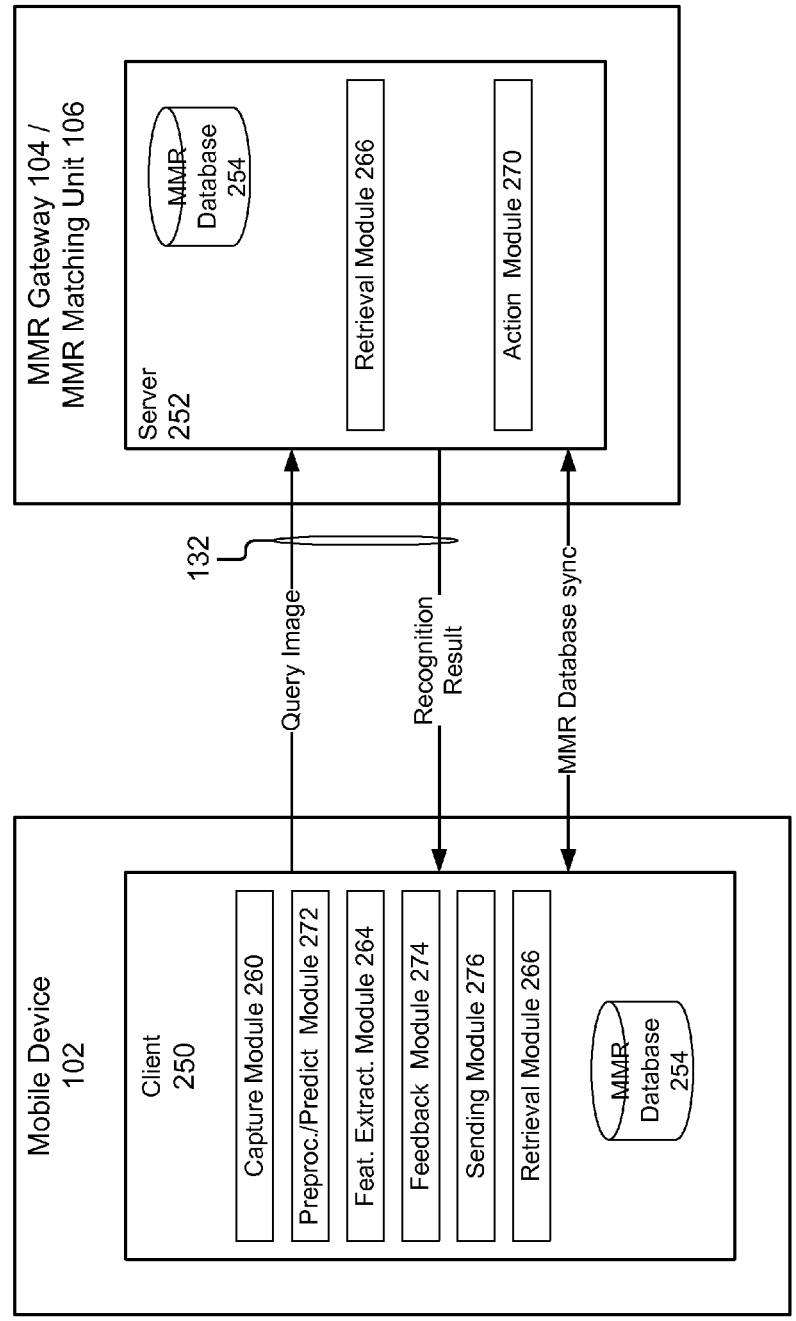

FIG. 2H illustrates another embodiment for the client 250 and the server 252 in which the client 250 runs a recognizer and the server 252 streams MMR database information to a local database operable with the client 250 based upon a first recognition result. This embodiment is similar to that described above with reference to FIG. 2F. For example, the entire retrieval process for one recognition algorithm is run at the client 250. If the recognition algorithm fails, the query is handed to the server 252 for running more complex retrieval algorithm. In this embodiment, the client 250 includes: the capture module 260, the feature extraction module 264, the preprocessing and prediction module 272, the feedback module 274, the sending module 276, the MMR database 254 (a local version) and the retrieval module 266. The server 252 includes another retrieval module 266, the action module 270 and the MMR database 254 (a complete and more complex version). In one embodiment, if the query image cannot be recognized with the local MMR database 254, the client 250 sends an image for retrieval to the server 252 and that initiates an update of the local MMR database 254. Alternatively, the client 250 may contain an updated version of a database for one recognizer, but if the query image cannot be retrieved from the local MMR database 254, then a database for another retrieval algorithm may be streamed to the local MMR database 254.

MMR Gateway 104

Figure 3:
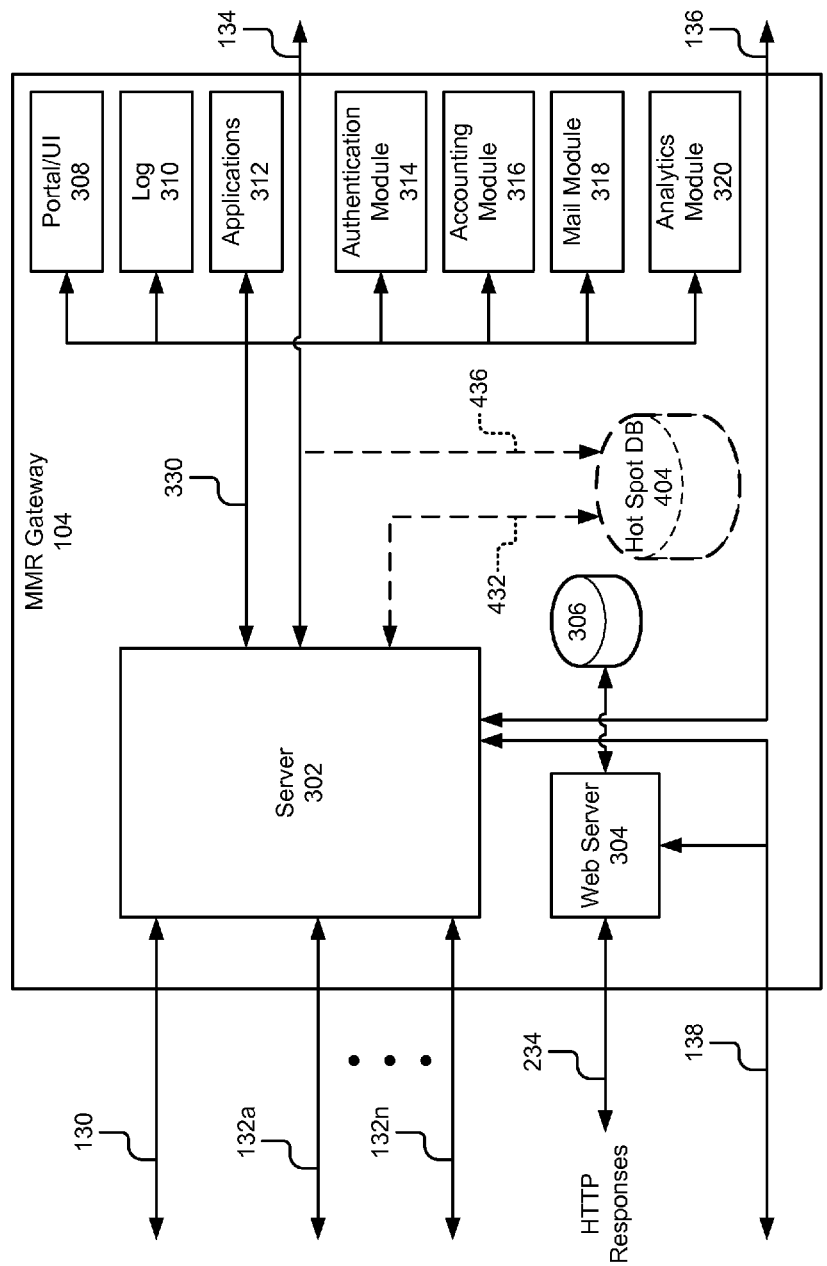
FIG. 3 is a block diagram of an embodiment of an MMR gateway in accordance with the present invention.

Referring now to FIG. 3, one embodiment of the MMR gateway 104 is shown. This embodiment of the MMR gateway 104 comprises a server 302, a Web server 304, a data store 306, a portal module 308, a log 310, one or more applications 312, an authentication module 314, an accounting module 316, a mail module 318 and an analytics module 320.

As noted above, one of the primary functions of the MMR gateway 104 is to communicate with many mobile devices 102 to receive retrieval requests and send responses including a status indicator (true=recognized/false=not recognized), a page identification number, a location on the page and other information such as hotspot data. A single MMR gateway 104 can respond to hundreds or millions of retrieval requests. For convenience and ease of understanding only a single MMR gateway 104 is shown in FIGS. 1 and 3, however, those skilled in the art will recognize that in other embodiments any number of MMR gateways 104 may be utilized to service the needs of a multitude of mobile devices 102. More particularly, the server 302 of the MMR gateway 104 is coupled to signal lines 132a-132n for communication with various mobile devices 102. The server 302 receives retrieval requests from the mobile devices 102 via signal lines 132a-132n and sends responses back to the mobile devices 102 using the same signal lines 132a-132n. In one embodiment, the retrieval request includes: a command, a user identification number, an image and other context information. For example, other context information may include: device information such as the make, model or manufacture of the mobile device 102; location information such as provided by a GPS system that is part of the mobile device or by triangulation; environmental information such as time of day, temperature, weather conditions, lighting, shadows, object information; and placement information such as distance, location, tilt and jitter.

The server 302 is also coupled to signal line 130 for communication with the computer 110. Again, for convenience and ease of understanding only a single computer 110 and signal line 130 are shown in FIGS. 1 and 3, but any number of computing devices may be adapted for communication with the server 302. The server 302 facilitates communication between the computer 110 and the portal module 308, the log module 310 and the applications 312. The server 302 is coupled to the portal module 308, the log module 310 and the applications 312 by signal line 330. As will be described in more detail below, the modules cooperate with the server 302 to present a web portal that provides a user experience for exchanging information. The Web portal 308 can also be used for system monitoring, maintenance and administration.

The server 302 processes the retrieval request and generates an image query and recognition parameters that are sent via signal line 134 to the MMR matching unit 106 for recognition. The server 302 also receives recognition responses from the MMR matching unit 106 via signal line 134. The server 302 also processes the retrieval request and sends information via signal line 330 to the other components of the MMR gateway 104 as will be described below. The server 302 is also adapted for communication with the MMR publisher 108 by signal line 138 and the MMR matching unit 106 via signal line 136. The signal line 138 provides a path for the MMR publisher 108 to send Web content for hotspots to the Web server 304 and to provide other information to the server 302. In one embodiment, the server 302-receives information from the MMR publisher 108 and sends that information via signal line 136 for registration with the MMR matching unit 106.

The web server 304 is a conventional type and is responsible for accepting requests from clients and sending responses along with data contents, such as web pages, documents and linked objects (images, etc.) The Web server 304 is coupled to data store 306 such as a conventional database. The Web server 304 is adapted for communication via signal line 234 to receive HTTP requests from any communication device across a network such as the Internet. The Web server 304 is also coupled to signal line 138 as described above to receive Web content associated with hotspots for storage in the data store 306 and then for later retrieval and transmission in response to HTTP requests. Those skilled in the art will understand that inclusion of the Web server 304 and data store 306 as part of the MMR gateway 104 is merely one embodiment and that the Web server 304 and the data store 306 may be operational in any number of alternate locations or configuration so long as the Web server 304 is accessible to mobile devices 102 and computers 110 via the Internet.

In one embodiment, the portal module 308 is software or routines operational on the server 302 for creation and presentation of the Web portal. The portal module 308 is coupled to signal line 330 for communication with the server 302. In one embodiment, the web portal provides an access point for functionality including administration and maintenance of other components of the MMR gateway 104. In another embodiment, the web portal provides an area where users can share experiences related to MMR documents. In yet another embodiment, the web portal is an area where users can access business applications and the log 310 of usage.

The log 310 is a memory or storage area for storing a list of the retrieval requests received by the server 302 from mobile devices 102 and all corresponding responses sent by the server 302 to the mobile devices. In another embodiment, the log 310 also stores a list of the image queries generated and sent to the MMR matching unit 106 and the recognition responses received from the MMR matching unit 106. The log 310 is coupled to signal line 330 for access by the server 302.

The one or more business applications 312 are software and routines for providing functionality related to the processing of MMR documents. In one embodiment the one or more business applications 312 are executable on the server 302. The business applications 312 can be any one of a variety of types of business applications adapted to utilize information related to the processing of retrieval quests and delivery of recognition responses such as but not limited to accounting, groupware, customer relationship management, human resources, outsourcing, loan origination, customer care, service relationships, etc.

The authentication module 314 is software and routines for maintaining a list of authorized users and granting access to the MMR system 110. In one embodiment, the authentication module 314 maintains a list of user IDs and passwords corresponding to individuals who have created an account in the system 100, and therefore, are authorized to use MMR gateway 104 and the MMR matching unit 106 to process retrieval requests. The authentication module 314 is communicatively coupled by signal line 330 to the server 302. But as the server 302 receives retrieval requests they can be processed and compared against information in the authentication module 314 before generating and sending the corresponding image query on signal line 134. In one embodiment, the authentication module 314 also generates messages for the server 302 to return to the mobile device 102 instances when the mobile device is not authorized, the mobile device has not established an account, or the account for the mobile device 102 is locked such as due to abuse or lack of payment.

The accounting module 316 is software and routines for performing accounting related to user accounts and use of the MMR system 100. In one embodiment, the retrieval services are provided under a variety of different economic models such as but not limited to use of the MMR system 100 under a subscription model, a charge per retrieval request model or various other pricing models. In one embodiment, the MMR system 100 provides a variety of different pricing models and is similar to those currently offered for cell phones and data networks. The accounting module 316 is coupled to the server 302 by signal line 330 to receive an indication of any retrieval request received by the server 302. In one embodiment, the accounting module 316 maintains a record of transactions (retrieval request/recognition responses) processed by the server 302 for each mobile device 102. Although not shown, the accounting module 316 can be coupled to a traditional billing system for the generation of an electronic or paper bill.

The mail module 318 is software and routines for generating e-mail and other types of communication. The mail module 318 is coupled by signal at 330 to the server 302. In one embodiment, the mobile device 102 can issue retrieval requests that include a command to deliver a document or a portion of a document or other information via e-mail, facsimile or other traditional electronic communication means. The mail module 318 is adapted to generate and send such information from the MMR gateway 104 to an addressee as prescribed by the user. In one embodiment, each user profile has associated addressees which are potential recipients of information retrieved.

The analytics module 320 is software and routines for measuring the behavior of users of the MMR system 100. The analytics module 320 is also software and routines for measuring the effectiveness and accuracy of feature extractors and recognition performed by the MMR matching unit 106. The analytics module 320 measures use of the MMR system 100 including which images are most frequently included as part of retrieval requests, which hotspot data is most often accessed, the order in which images are retrieved, the first image in the retrieval process, and other key performance indicators used to improve the MMR experience and/or a marketing campaign's audience response. In one embodiment, the analytics module 320 measures metrics of the MMR system 100 and analyzes the metrics used to measure the effectiveness of hotspots and hotspot data. The analytics module 320 is coupled to the server 302, the authentication module 314 and the accounting module 316 by signal line 330. The analytics module 320 is also coupled by the server 302 to signal line 134 and thus can access the components of the MMR matching unit 106 to retrieve recognition parameters, images features, quality recognition scores and any other information generated or used by the MMR matching unit 106. The analytics module 320 can also perform a variety of data retrieval and segmentation based upon parameters or criteria of users, mobile devices 102, page IDs, locations, etc.

In one embodiment, the MMR gateway 104 also includes a hotspot database 404. The hotspot database 404 is shown in FIG. 3 with dashed lines to reflect that inclusion in the MMR gateway 104 is an alternate embodiment. The hotspot database 404 is coupled by signal line 436 to receive the recognition responses via line 134. The hotspot database 404 uses these recognition responses to query the database and output via line 432 the hotspot content corresponding to the recognition responses. This hotspot content is sent to the server 302 so that it can be included with the recognition responses and sent to the requesting mobile device 102.

MMR Matching Unit 106

Figure 4A:
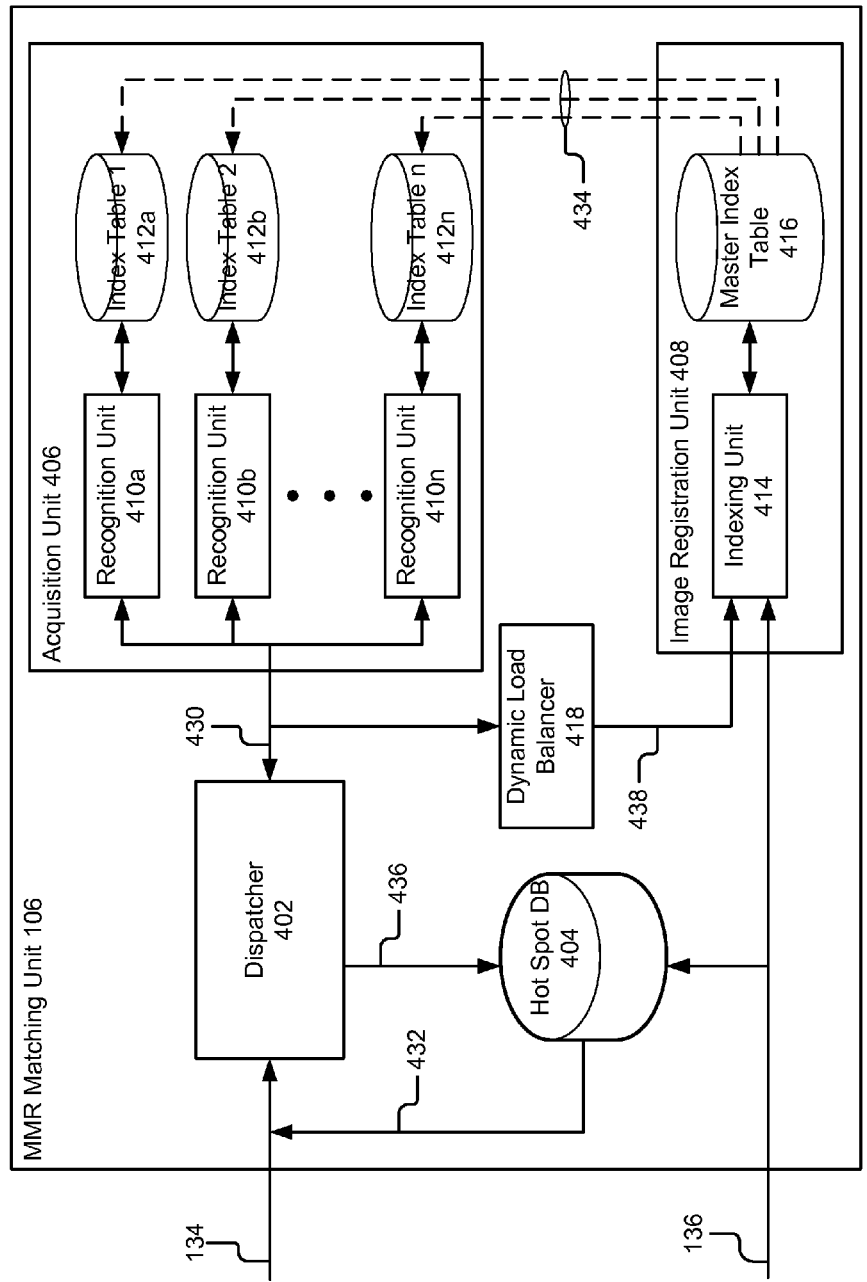
FIG. 4A is a block diagram of a first embodiment of a MMR matching unit in accordance with the present invention.
Figure 4B:
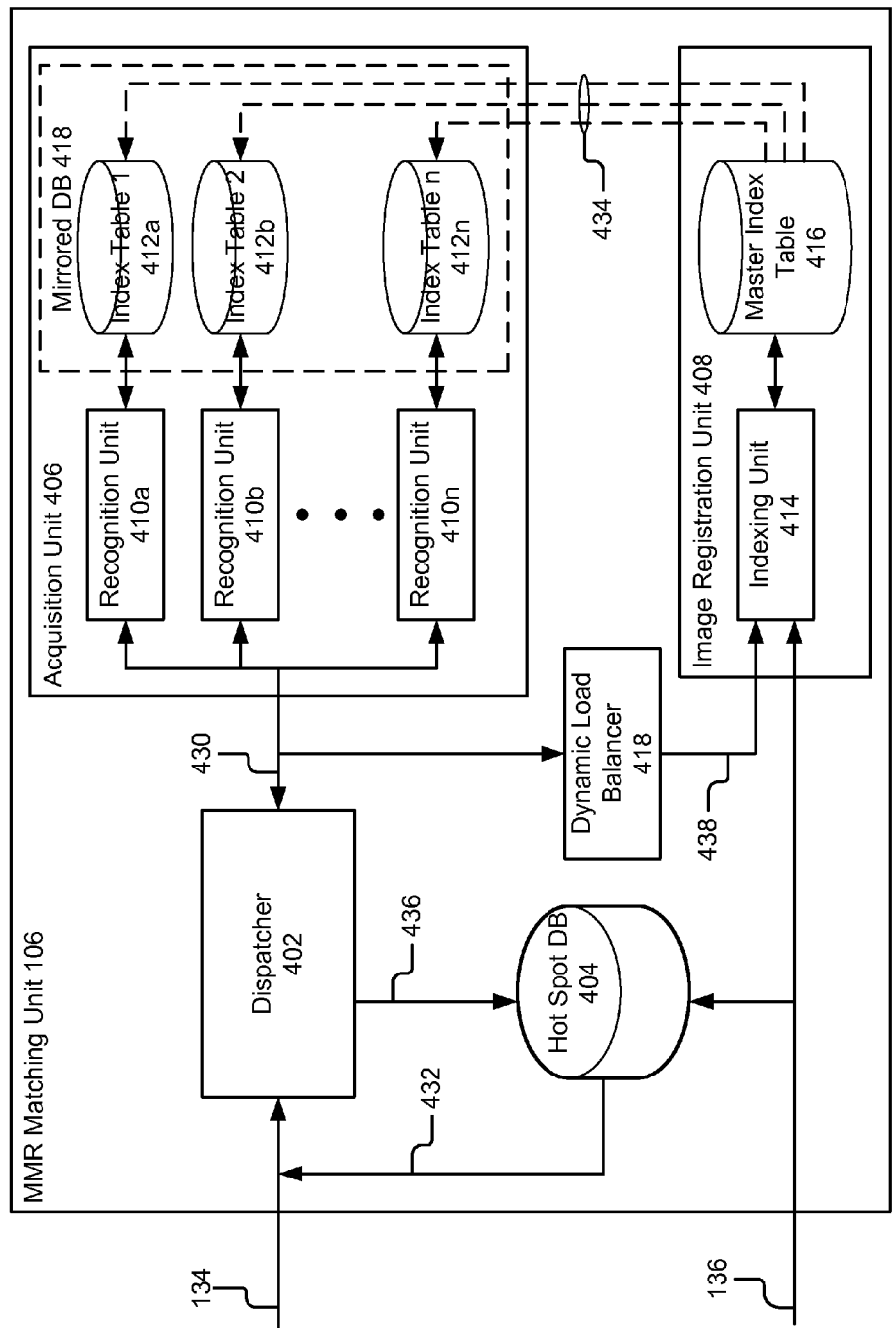
FIG. 4B is a block diagram of a second embodiment of the MMR matching unit in accordance with the present invention.

Referring now to FIGS. 4A and 4B, two embodiments for the MMR matching unit 106 will be described. The basic function of the MMR matching unit 106 is to receive an image query, send the image query for recognition, perform recognition on the images in the image query, retrieve hotspot information, combine the recognition result with hotspot information and send it back to the MMR gateway 104.

FIG. 4A illustrates a first embodiment of the MMR matching unit 106. The first embodiment of the MMR matching unit 106 comprises a dispatcher 402, a hotspot database 404, an acquisition unit 406, an image registration unit 408 and a dynamic load balancer 418. The acquisition unit 406 further comprises a plurality of the recognition units 410a-410n and a plurality of index tables 412a-412n. The image registration unit 408 further comprises an indexing unit 414 and a master index table 416.

The dispatcher 402 is coupled to signal line 134 for receiving an image query from and sending recognition results to the MMR gateway 104. The dispatcher 402 is responsible for assigning and sending an image query to respective recognition units 410a-410n. In one embodiment, the dispatcher 402 receives an image query, generates a recognition unit identification number and sends the recognition unit identification number and the image query to the acquisition unit 406 for further processing. The dispatcher 402 is coupled to signal line 430 to send the recognition unit identification number and the image query to the recognition units 410a-410n. The dispatcher 402 also receives the recognition results from the acquisition unit 406 via signal line 430. One embodiment for the dispatcher 402 will be described in more detail below with reference to FIG. 5.

An alternate embodiment for the hotspot database 404 has been described above with reference to FIG. 3 where the hotspot database is part of the MMR gateway 104. However, the preferred embodiment for the hotspot database 404 is part of the MMR matching unit 106 as shown in FIG. 4A. Regardless of the embodiment, the hotspot database 404 has a similar functionality. The hotspot database 404 is used to store hotspot information. Once an image query has been recognized and recognition results are produced, these recognition results are used as part of a query of the hotspot database 404 to retrieve hotspot information associated with the recognition results. The retrieved hotspot information is then output on signal line 134 to the MMR gateway 104 for packaging and delivery to the mobile device 102. As shown in FIG. 4A, the hotspot database 404 is coupled to the dispatcher 402 by signal line 436 to receive queries including recognition results. The hotspot database 404 is also coupled by signal line 432 and signal line 134 to the MMR gateway 104 for delivery of query results. The hotspot database 404 is also coupled to signal line 136 to receive new hotspot information for storage from the MMR publisher 108.

The acquisition unit 406 comprises the plurality of the recognition units 410a-410n and a plurality of index tables 412a-412n. Each of the recognition units 410a-410n has and is coupled to a corresponding index table 412a-412n. In one embodiment, each recognition unit 410/index table 412 pair is on the same server. The dispatcher 402 sends the image query to one or more recognition units 410a-410n. In one embodiment that includes redundancy, the image query is sent from the dispatcher 402 to a plurality of recognition units 410 for recognition and retrieval and the index tables 412a-n index the same data. In the serial embodiment, the image query is sent from the dispatcher 402 to a first recognition unit 410a. If recognition is not successful on the first recognition unit 410a, the image query is passed on to a second recognition unit 410b, and so on. In yet another embodiment, the dispatcher 402 performs some preliminary analysis of the image query and then selects a recognition unit 410a-410n best adapted and most likely to be successful at recognizing the image query. Those skilled in the art will understand that there are a variety of configurations for the plurality of recognition units 410a-410n and the plurality of index tables 412a-412n. Example embodiments for the acquisition unit 406 will be described in more detail below with reference to FIGS. 6A and 6B. It should be understood that the index tables 412a-412n can be updated at various times as depicted by the dashed lines 434 from the master index table 416.

The image registration unit 408 comprises the indexing unit 414 and the master index table 416. The image registration unit 408 has an input coupled to signal on 136 to receive updated information from the MMR publisher 108 and an input coupled to signal line 438 to receive updated information from the dynamic load balancer 418. The image registration unit 408 is responsible for maintaining the master index table 416 and migrating all or portions of the master index table 416 to the index tables 412a-412n (slave tables) of the acquisition unit 406. In one embodiment, the indexing unit 414 receives images, unique page IDs and other information; and converts it into index table information that is stored in the master index table. The indexing unit 414 also cooperates with the MMR publisher 108 to maintain a unique page identification numbering system that is consistent across image pages generated by the MMR publisher 108, the image pages stored in the master index table 416 and the page numbers used in referencing data in the hotspot database 404.

One embodiment for the image registration unit 408 is shown and described in more detail below with reference to FIG. 7.

The dynamic load balancer 418 has an input coupled to signal line 430 to receive the query image from the dispatcher 402 and the corresponding recognition results from the acquisition unit 406. The output of the dynamic load balancer 418 is coupled by signal line 438 to an input of the image registration unit 408. The dynamic load balancer 418 provides input to the image registration unit 408 that is used to dynamically adjust the index tables 412a-412n of the acquisition unit 406. In particular, the dynamic load balancer 418 monitors and evaluates the image queries that are sent from the dispatcher 402 to the acquisition unit 406 for a given period of time. Based on the usage, the dynamic load balancer 418 provides input to adjust the index tables 412a-412n. For example, the dynamic load balancer 418 may measure the image queries for a day. Based on the measured usage for that day, the index tables are modified and configured in the acquisition unit 406 to match the usage measured by the dynamic load balancer 418. The dynamic load balancer 418 implements the method described below with reference to FIG. 11.

FIG. 4B illustrates a second embodiment of the MMR matching unit 106. In the second embodiment, many of the components of the MMR matching unit 106 have the same or a similar function to corresponding elements of the first embodiment. Thus, like reference numbers have been used to refer to like components with the same or similar functionality. The second embodiment of the MMR matching unit 106 includes the dispatcher 402, the hotspot database 404, and the dynamic load balancer 418 similar to the first embodiment of the MMR matching unit 106. However, the acquisition unit 406 and the image registration unit 408 are different than that described above with reference to FIG. 4A. In particular, the acquisition unit 406 and the image registration unit 408 utilize a shared SQL database for the index tables and the master table. More specifically, there is the master index table 416 and a mirrored database 418 that includes the local index tables 412a-n. Moreover, a conventional functionality of SQL database replication is used to generate the mirror images of the master index table 416 stored in the index tables 412a-n for use in recognition. The image registration unit 408 is configured so that when new images are added to the master index table 416 they are immediately available to all the recognition units 410. This is done by mirroring the master index table 416 across all the local index tables 412a-n using large RAM (not shown) and database mirroring technology.

Dispatcher 402

Figure 5:
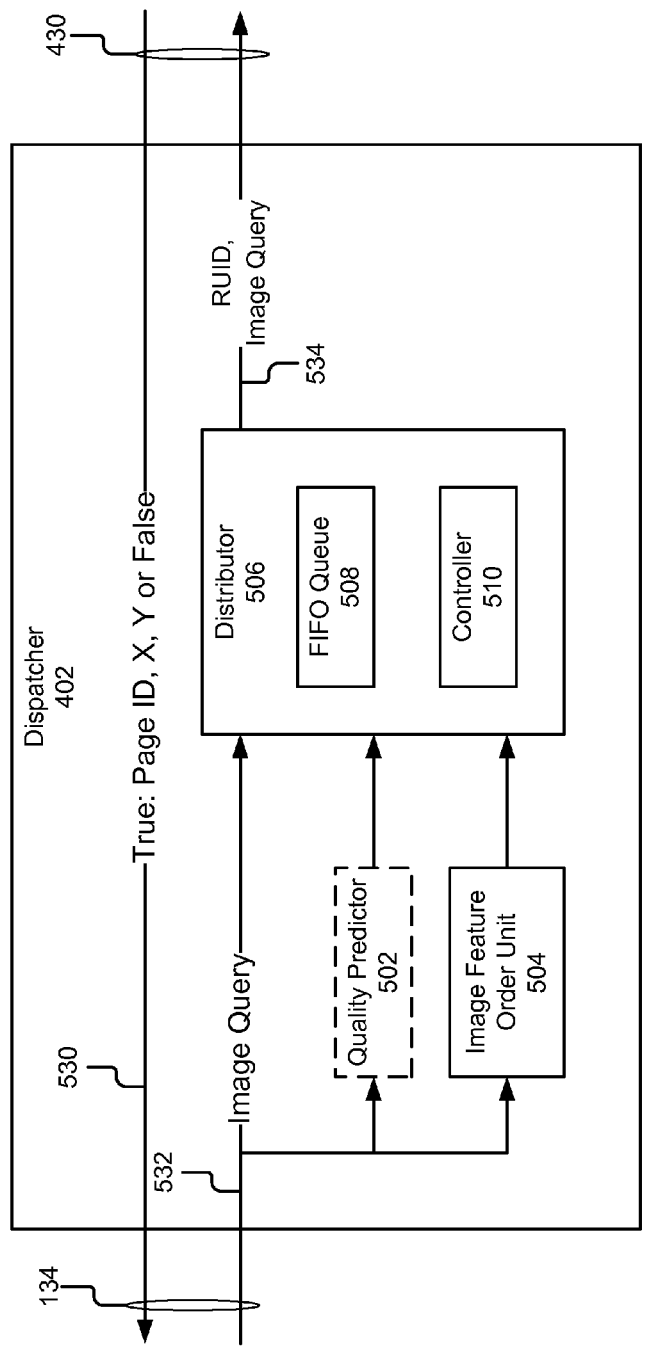
FIG. 5 is a block diagram of an embodiment of a dispatcher in accordance with the present invention.

Referring now to FIG. 5, an embodiment of the dispatcher 402 shown. The dispatcher 402 comprises a quality predictor 502, an image feature order unit 504 and a distributor 506. The quality predictor 502, the image feature order unit 504 and the distributor 506 are coupled to signal line 532 to receive image queries from the MMR gateway 104. The distributor 506 is also coupled to receive the output of the quality predictor 502 and the image feature order unit 504. The distributor 506 includes a FIFO queue 508 and a controller 510. The distributor 506 generates an output on signal line 534 that includes the image query and a recognition unit identification number (RUID). Those skilled in the art will understand that in other embodiments the image query may be directed to any particular recognition unit using a variety of means other than the RUID. As image queries are received on the signal line 532, the distributor 506 receives the image queries and places them in the order in which they are received into the FIFO queue 508. The controller 510 receives a recognizability score for each image query from the quality predictor 502 and also receives an ordering signal from the image feature order unit 504. Using this information from the quality predictor 502 and the image feature order unit 504, the controller 510 selects image queries from the FIFO queue 508, assigns them to particular recognition units 410 and sends the image query to the assigned recognition unit 410 for processing. The controller 510 maintains a list of image queries assigned to each recognition unit 410 and the expected time to completion for each image (as predicted by the image feature order unit 504). The total expected time to empty the queue for each recognition unit 410 is the sum of the expected times for the images assigned to it. The controller 510 can execute several queue management strategies. In a simple assignment strategy, image queries are removed from the FIFO queue 508 in the order they arrived and assigned to the first available recognition unit 410. In a balanced response strategy, the total expected response time to each query is maintained at a uniform level and query images are removed from the FIFO queue 508 in the order they arrived, and assigned to the FIFO queue 508 for a recognition unit so that its total expected response time is as close as possible to the other recognition units. In an easy-first strategy, images are removed from the FIFO queue 508 in an order determined by their expected completion times—images with the smallest expected completion times are assigned to the first available recognition unit. In this way, users are rewarded with faster response time when they submit an image that's easy to recognize. This could incentives users to carefully select the images they submit. Other queue management strategies are possible. The dispatcher 402 also receives the recognition results from the recognition units 410 on signal line 530. The recognition results include a Boolean value (true/false) and if true, a page ID and a location on the page. In one embodiment, the dispatcher 402 merely receives and retransmits the data to the MMR gateway 104.

The quality predictor 502 receives image queries and generates a recognizability score used by the dispatcher 402 to route the image query to one of the plurality of recognition units 410. In one embodiment, the quality predictor 502 also receives as inputs context information and device parameters. The operation of the quality predictor 502 is described in more detail below with reference to FIGS. 18-21. In one embodiment, the recognizability score includes information specifying the type of recognition algorithm most likely to produce a valid recognition result.

The image feature order unit 504 receives image queries and outputs an ordering signal. The image feature order unit 504 analyzes an input image query and predicts the time required to recognize an image by analyzing the image features it contains. The difference between the actual recognition time and the predicted time is used to adjust future predictions thereby improving accuracy. In the simplest of embodiments, simple images with few features are assigned to lightly loaded recognition units 410 so that they will be recognized quickly and the user will see the answer immediately. In one embodiment, the features used by the image order feature unit 504 to predict the time are different than the features used by recognition units 410 for actual recognition. For example, the number of corners detected in an image is used to predict the time required to analyze the image. The feature set used for prediction need only be correlated with the actual recognition time. In one embodiment, several different features sets are used and the correlations to recognition time measured over some period. Eventually, the feature set that is the best predictor and lowest cost (most efficient) would be determined and the other feature sets could be discarded. The operation of the image feature order unit 504 is described in more detail below and can be better understood with reference to FIG. 12.

Acquisition Unit 406

Figure 6A:
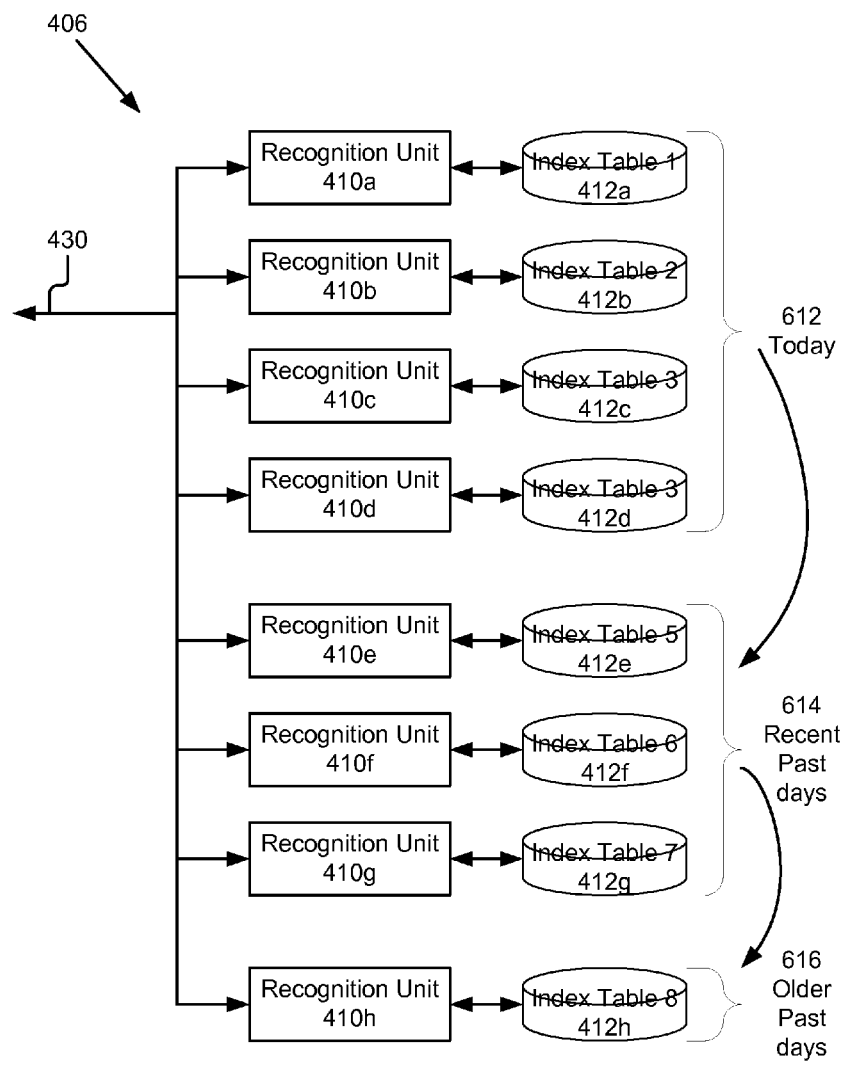
FIG. 6A is a block diagram of a first embodiment of an image retrieval unit in accordance with the present invention.
Figure 6B:
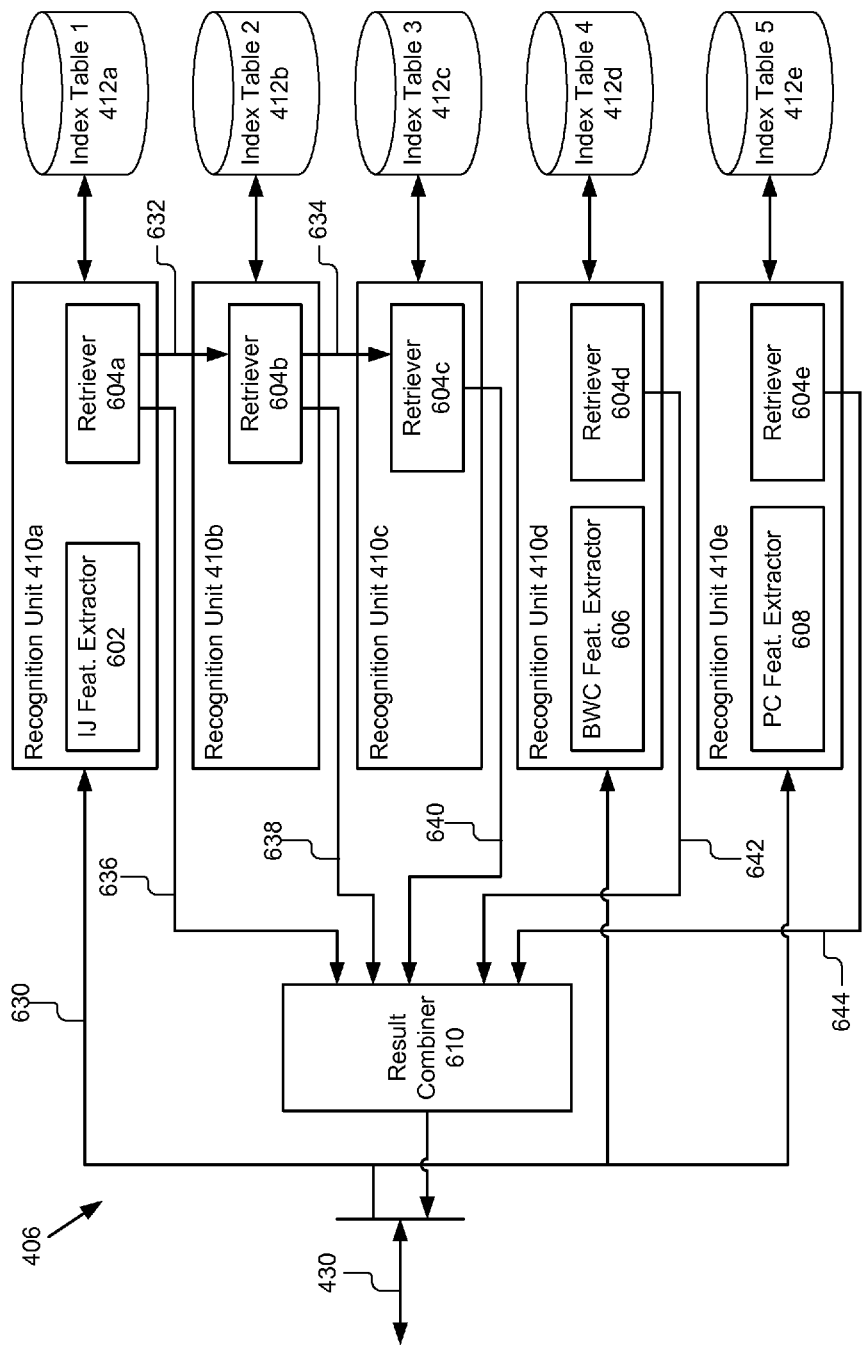
FIG. 6B is a block diagram of a second embodiment of the image retrieval unit in accordance with the present invention.

Referring now to FIGS. 6A and 6B, embodiments of the acquisition unit 406 will be described.

FIG. 6A illustrates one embodiment for the acquisition unit 406 where the recognition unit 410 and index table 412 pairs are partitioned based on the content or images that they index. This configuration is particularly advantageous for mass media publishers that provide content on a periodic basis. The organization of the content in the index tables 412 can be partitioned such that the content most likely to be accessed will be available on the greatest number of recognition unit 410 and index table 412 pairs. Those skilled in the art will recognize that the partition described below is merely one example and that various other partitions based on actual usage statistics measured over time can be employed. As shown in FIG. 6A, the acquisition unit 406 comprises a plurality of recognition units 410a-h and a plurality of index tables 412a-h. The plurality of recognition units 410a-h is coupled to signal line 430 to receive image queries from the dispatcher 402. Each of the plurality of recognition units 410a-h is coupled to a corresponding index table 412a-h. The recognition units 410 extract features from the image query and compare those image features to the features stored in the index table to identify a matching page and location on that page. Example recognition and retrieval systems and methods are disclosed in U.S. patent application Ser. No. 11/461,017, titled "System and Methods For Creation and Use of a Mixed Media Environment," filed Jul. 31, 2006; U.S. patent application Ser. No. 11/461,279, titled "Method and System For Image Matching in a Mixed Media Environment," filed Jul. 31, 2006; U.S. patent application Ser. No. 11/461,286, titled "Method and System For Document Fingerprinting Matching in a Mixed Media Environment," filed Jul. 31, 2006; U.S. patent application Ser. No. 11/461,294, titled "Method and System For Position-Based Image Matching in a Mixed Media Environment," filed Jul. 31, 2006; U.S. patent application Ser. No. 11/461,300, titled "Method and System For Multi-Tier Image Matching in a Mixed Media Environment," filed Jul. 31, 2006; U.S. patent application Ser. No. 11/461,147, titled "Data Organization and Access for Mixed Media Document System," filed Jul. 31, 2006; U.S. patent application Ser. No. 11/461,164, titled "Database for Mixed Media Document System," filed Jul. 31, 2006; U.S. patent application Ser. No. 11/461,109, titled "Searching Media Content For Objects Specified Using Identifiers," filed Jul. 31, 2006; U.S. patent application Ser. No. 12/059,583, titled "Invisible Junction Feature Recognition For Document Security Or Annotation," filed Mar. 31, 2008; U.S. patent application Ser. No. 12/121,275, titled "Web-Based Content Detection In Images, Extraction and Recognition," filed May 15, 2008; U.S. patent application Ser. No. 11/776,510, titled "Invisible Junction Features For Patch Recognition," filed Jul. 11, 2007; U.S. patent application Ser. No. 11/776,520, titled "Information Retrieval Using Invisible Junctions and Geometric Constraints," filed Jul. 11, 2007; U.S. patent application Ser. No. 11/776,530, titled "Recognition and Tracking Using Invisible Junctions," filed Jul. 11, 2007; and U.S. patent application Ser. No. 11/777,142, titled "Retrieving Documents By Converting Them to Synthetic Text," filed Jul. 12, 2007; and U.S. patent application Ser. No. 11/624,466, titled "Synthetic Image and Video Generation From Ground Truth Data," filed Jan. 18, 2007; which are incorporated by reference in their entirety.

As shown in FIG. 6A, the recognition unit 410/index table 412 pairs are grouped according to the content that in the index tables 412. In particular, the first group 612 of recognition units 410a-d and index tables 412a-d is used to index the pages of a publication such as a newspaper for a current day. For example, four of the eight recognition units 410 are used to index content from the current day's newspaper because most of the retrieval requests are likely to be related to the newspaper that was published in the last 24 hours. A second group 614 of recognition units 410e-g and corresponding index tables 412e-g are used to store pages of the newspaper from recent past days, for example the past week. A third group 616 of recognition unit 410h and index table 412h is used to store pages of the newspaper from older past days, for example for the past year. This allows the organizational structure of the acquisition unit 406 to be optimized to match the profile of retrieval requests received. Moreover, the operation of the acquisition unit 406 can be modified such that a given image query is first sent to the first group 612 for recognition, and if the first group 612 is unable to recognize the image query, it is sent to the second group 614 for recognition and so on.

It should be noted that the use of four recognition units 410 and index tables 412 as the first group 612 is merely be by way example and used demonstrate a relative proportion as compared with the number of recognition units 410 and index tables 412 in the second group 614 and the third group 616. The number of recognition units 410 and index tables 412 in any particular group 612, 614 and 616 may be scaled the modified based on the total number of recognition units 410 and index tables 412. Furthermore, the number of recognition units 410 and index tables 412 in any particular group 612, 614 and 616 may be adapted so that it matches the profile of all users sending retrieval request to the acquisition unit 406 for a given publication.

FIG. 6B illustrates a second embodiment for the acquisition unit 406 where the recognition units 410 and index tables 412 are partitioned based upon the type of recognition algorithm they implement. In the second embodiment, the recognition units 410 are also coupled such that the failure of a particular recognition unit to generate a registration result causes the input image query to be sent to another recognition unit for processing. Furthermore, in the second embodiment, the index tables 412 include feature sets that are varied according to different device and environmental factors of image capture devices (e.g., blur).

The second embodiment of the acquisition unit 406 includes a plurality of recognition units 410a-410e, a plurality of the index tables 412a-412e and a result combiner 610. In this embodiment, the recognition units 410a-410e each utilizes a different type of recognition algorithm. For example, recognition units 410a, 410b and 410c use an invisible junction algorithm; recognition unit 410d uses a brick wall coding algorithm; and recognition unit 410e uses a path coding algorithm for recognition and retrieval of page numbers and locations. Recognition units 410a, 410d and 410e each have an input coupled signal line 430 by signal line 630 for receiving the image query. The recognition results from each of the plurality of recognition units 410a-410e are sent via signal lines 636, 638, 640, 642 and 644 to the result combiner 610. The output of the result combiner 610 is coupled to signal line 430.

In one embodiment, the recognition units 410a, 410b and 410c cooperate together with index tables 1, 2 and 3, 412a-412c each storing image features corresponding to the same pages but with differing levels of blur caused by device and environmental factors. For example, index table 1 412a may store image features for pristine images of pages such as from a PDF document, while index table 2 412b stores images of the same pages but with a first level of blur and index table 3 412c stores images of the same pages but with the second level of blur. In one embodiment, the index tables 1, 2 and 3, 412a-412c are quantization trees. The first recognition unit 410a receives the image query via signal line 630. The first recognition unit 410a comprises an invisible junction feature extractor 602 and a retriever 604a. The invisible junction feature extractor 602 receives the image query, extracts the invisible junction features and provides them to the retriever 604a. The retriever 604a uses the extracted invisible junction features and compares them to the index table 1 412a. If the retriever 604a identifies a match, the retriever 604a sends the recognition results via signal line 636 to the result combiner 610. If however, the retriever 604a was unable to identify a match or identifies a match with low confidence, the retriever 604a sends the extracted invisible junction features to the retriever 604b of the second recognition unit 410b via signal line 632. It should be noted that since the invisible junction features have already been extracted, the second recognition unit 410b does not require an invisible junction feature extractor 602. The second recognition unit 410b performs retrieval functions similar to the first recognition unit 410a, but cooperates with index table 2 412b that has invisible junction features for slightly blurry images. If the retriever 604b identifies a match, the retriever 604b sends the recognition results via signal line 638 to the result combiner 610. If the retriever 604b of the second recognition unit 410b is unable to identify a match or identifies a match with low confidence, the retriever 604b sends the extracted invisible junction features to the retriever 604c of the third recognition unit 410c via signal line 634. The retriever 604c then performs a similar retrieval function but on index table 3 412c. Those skilled in the art will understand that while one pristine set of images and two levels of blur are provided, this is only by way of example and that any number of additional levels of blur from 0 to n may be used.

The recognition units 410d and 410e operate in parallel with the other recognition units 410a-c. The fourth recognition unit 410d comprises a brick wall coding feature extractor 606 and a retriever 604d. The brick wall coding feature extractor 606 receives the image query and bounding boxes, parses the bounding boxes and generates brick wall coding features. These brick wall coding features are provided to the retriever 604d and the retriever 604d compares them to the features stored in index table 4 412d. In one embodiment, index table 4 412d is a hash table. The retriever 604d identifies any matching pages and returns the recognition results to the result combiner 610 via signal line 642. The fifth recognition unit 410e operates in a similar manner but for path coding. The fifth recognition unit 410e comprises a path coding feature extractor 608 and a retriever 604e. The path coding feature extractor 608 receives the image query and bounding boxes, parses the image and generates path coding features that are provided to the retriever 604e and the retriever 604e compares them to features stored in the index table 5 412e. In one embodiment, the index table 5 412e is a SQL database of character strings. The retriever 604e identifies any matching strings and returns the recognition results to the result combiner 610 via signal line 644.

The result combiner 610 receives recognition results from the plurality of recognition units 410a-e and produces one or a small list of matching results. In one embodiment, each of the recognition results includes an associated confidence factor. In another embodiment, context information such as date, time, location, personal profile or retrieval history are provided to the result combiner 610. These confidence factors along with other information are used by the result combiner 610 to select the recognition results most likely to match the input image query. The result combiner 610 implements the functionality described below with reference to the methods of FIGS. 22-24.

Image Registration Unit 408

Figure 7:
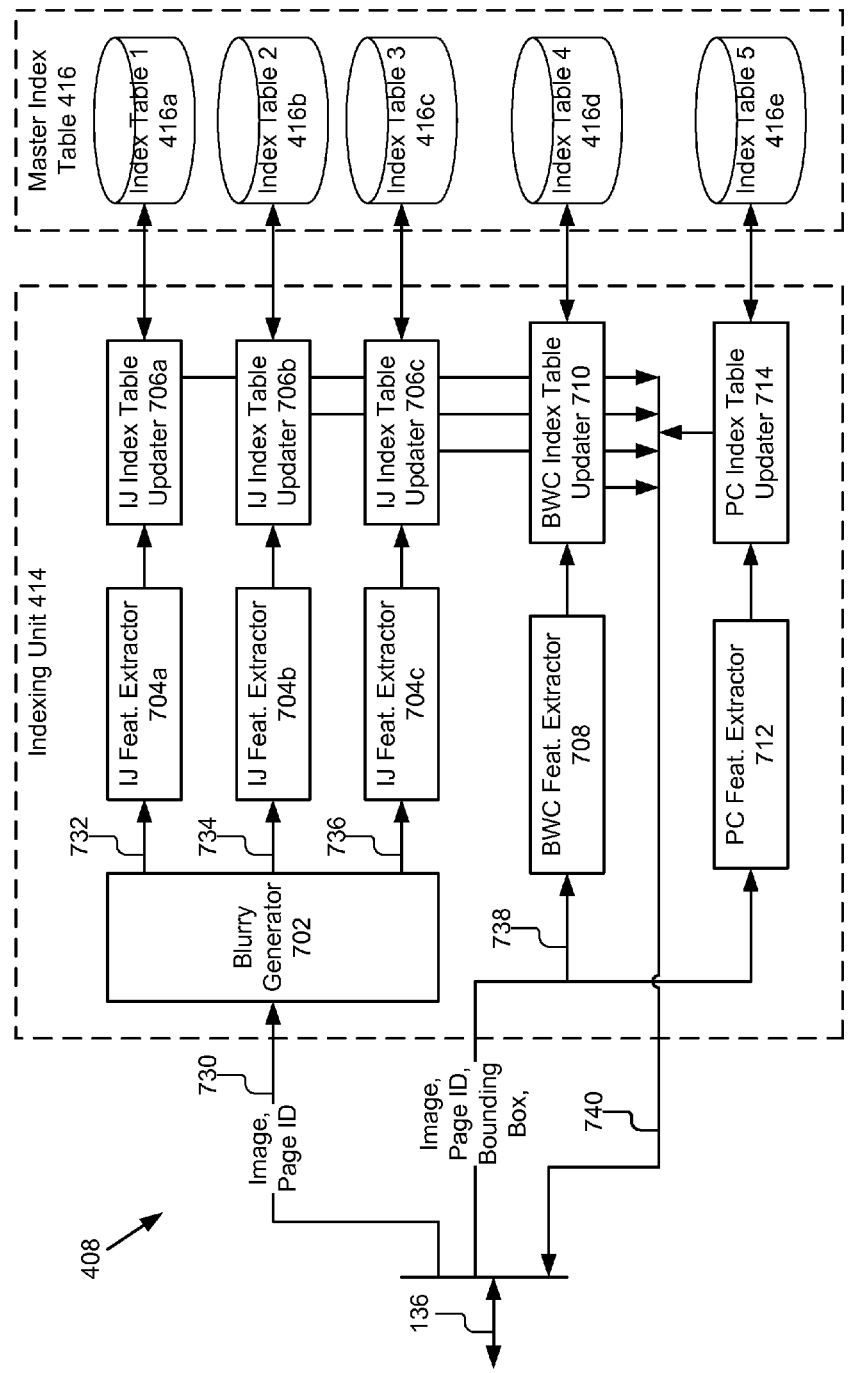
FIG. 7 is a block diagram of an embodiment of a registration unit in accordance with the present invention.

FIG. 7 shows an embodiment of the image registration unit 408. The image registration unit 408 comprises a blurry generator 702, a plurality of invisible junction feature extractors 704a-c, a plurality of invisible junction index table updaters 706a-c, a brick wall coding feature extractor 708, a brick wall coding index table updater 710, a path coding feature extractor 712, a path coding index table updater 714 and a plurality of master index tables 416a-e. The image registration unit 408 also includes other control logic (not shown) that controls the updating of the working index tables 412 from the master index table 416. The image registration unit 408 can update the index tables 412 of the acquisition unit 406 in a variety of different ways based on various criteria such performing updates on a periodic basis, performing updates when new content is added, performing updates based on usage, performing updates for storage efficiency, etc.

The blurry generator 702 has an input coupled in signal line 730 to receive an image and a page identification number. The blurry generator 702 has a plurality of outputs and each output is coupled by signal lines 732, 734 and 736 to invisible junction feature extractors 704a-c, respectively. The blurry generator 702 passes a pristine image and the page identification number to the output and signal line 732. The blurry generator 702 then generates an image with a first level of blurriness and outputs it and the page identification number on signal line 734 to invisible junction feature extractor 704b, and another image with a second level of blurriness and outputs it and page identification number on signal line 736 to invisible junction feature extractor 704c. The blurry generator 702 implements functionality described below with reference to FIGS. 13 and 14.

The invisible junction feature extractors 704 receive the image and page ID, extract the invisible junction features from the image and send them along with the page ID to a respective invisible junction index table updater 706. The outputs of the plurality of invisible junction feature extractors 704a-c are coupled to input of the plurality of invisible junction index table updaters 706a-c. For example, the output of invisible junction feature extractor 704a is coupled to an input of invisible junction index table updater 706a. The remaining invisible junction feature extractors 704b-c are similarly coupled to respective invisible junction index table updaters 706b-c. The invisible junction index table updaters 706 are responsible for formatting the extracted features and storing them in a corresponding master index table 416. While the master index table 416 is shown as five separate master index tables 416a-e, those skilled in the art will recognize that all the master index tables could be combined into a single master index table or into a few master index tables. Once the invisible junction index table updaters 706 have stored the extracted features in the index table 416, they issue a confirmation signal that is sent via signal lines 740 and 136 back to the MMR publisher 108.

The brick wall coding feature extractor 708 and the path coding feature extractor 712 operate in a similar fashion and are coupled to signal line 738 to receive the image, a page identification number and bounding box information. The brick wall coding feature extractor 708 extracts information from the input needed to update its associated index table 416d. The brick wall coding index table updater 710 receives the extracted information from the brick wall coding feature extractor 708 and stores it in the index table 416d. The path coding feature extractor 712 and the path coding index table updater 714 operate in a like manner but for path coding. The path coding feature extractor 712 also receives the image, a page number and bounding box information via signal line 738. The path coding feature extractor 712 extracts path coding information and passes it to the path coding index table updater 714. The path coding index table updater 714 stores the information in index table 5 416e. The architecture of the registration unit 408 is particularly advantageous because it provides an environment in which the MMR publisher 108 can automatically update the index tables simply by providing images and page numbers to the image registration unit 408 and the index tables are updated automatically.

MMR Publisher 108

Figure 8:
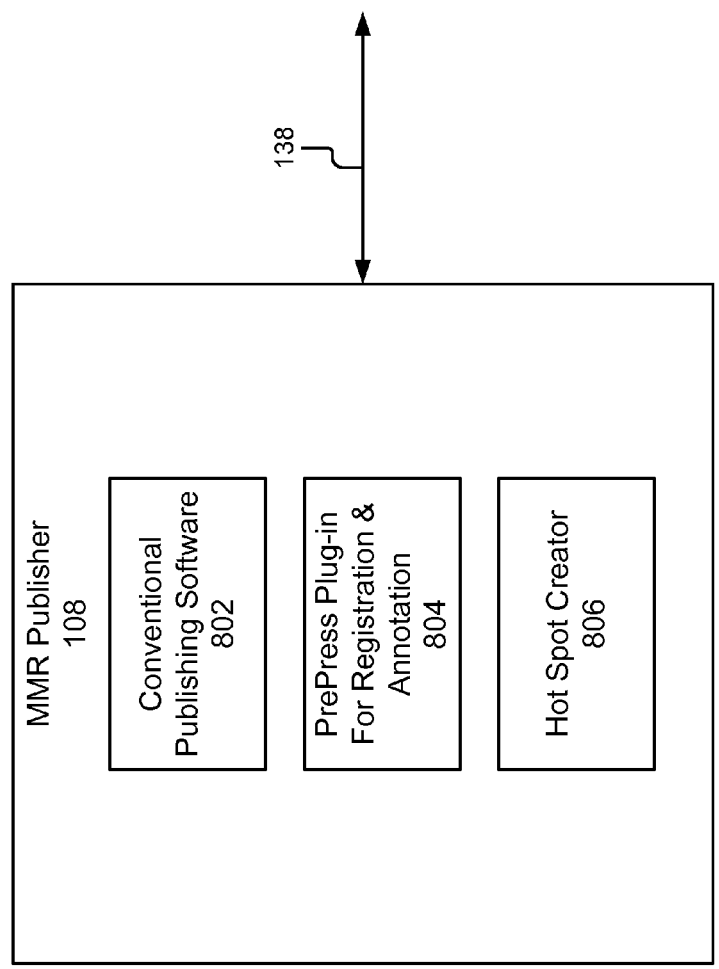
FIG. 8 is a block diagram of an embodiment of an MMR publisher in accordance with the present invention.

An embodiment of the MMR publisher 108 is shown in FIG. 8. The MMR publisher 108 comprises conventional publishing software 802, a pre-press software plug-in for registration and annotation 804 and a hotspot creator 806. The MMR publisher 108 is coupled to signal line 138 to connect with the image registration unit 408 and the hotspot database 404 (such as via the server 302).

The conventional publishing software 802 is software for creating digital content including text, graphics and pictures. Examples of the conventional publishing software used in the production and distribution of newspapers include Adobe Acrobat manufactured and sold by Adobe Inc. of San Jose, Calif. or QuarkXPress manufactured and sold by Quark, Inc. in Denver, Colo. The conventional publishing software 802 may be other types of proprietary software owned by large publishing companies.

The pre-press plug-in for registration and annotation 804 is software and routines for interfacing with the conventional publishing software 802 and generating additional information used by the image registration unit 408 so that the content can be automatically uploaded to the acquisition unit 406. For example, the prepress plug-in for registration and annotation communicates and interfaces with the image registration unit 408 to maintain a unique page identification numbering system that is consistent across image pages generated by the conventional publishing software 802, the image pages stored in the master index table 416 and the page numbers used in referencing data in the hotspot database 404. The prepress plug-in for registration 804 also generates bounding boxes for image pages generated by the conventional publishing software 802; the bounding boxes are subsequently used by the image registration unit 408 for certain types of encoding. The pre-press plug-in for registration and annotation 804 also analyzes the images provided by the conventional publishing software 802 and ensures that the files are of a type usable by the feature extractors 704, 708 712.

The hotspot creator 806 is an authoring tool for creating hotspots. Hotspots identify the (x,y) coordinates of polygons on a document image and links to electronic data such as URL's that are associated with each polygon. In one embodiment, hotspots are annotations in Acrobat PDF files that include the (x,y) coordinates of polygons on a document and links to electronic data such as URL's. The hotspot creator 806 can be used to create a hotspot (a "hotspot" is a polygon on an image), associate the hotspot with a particular page in a document, and a particular location on the page, associate zero or more links with each hotspot, and generate and send the hotspot files to the server 302 for storage in the hotspot database 404. A hotspot file lists each hotspot, the coordinates of its polygon, and any links associated with it. The hotspot file can be saved as a separate file or equivalently the same data can be embedded in the document source file. The hotspot creator 806 can be a stand-alone software application that reads a source document such as Word, PDF, or an image format such as tiff, and provides a user interface that lets the user draw polygons on the document, add links to each of the hotspots, and save the hotspot files. The hotspot creator 806 can also be packaged as a plug-in for existing document authoring applications such as Word, Acrobat, Quark Express, etc. and can be designed so that the user can define polygons on the document, add links, and save the hotspot files (or, equivalently the source file with the hotspot data embedded in it). The hotspot creator 806 can also be packaged as a software application that extracts links from existing documents and saves them in the hotspot file. For example, annotations in PDF files that include polygon coordinates and links to electronic data can be removed from the PDF and saved separately in a hotspot file.

Methods

Figure 9:
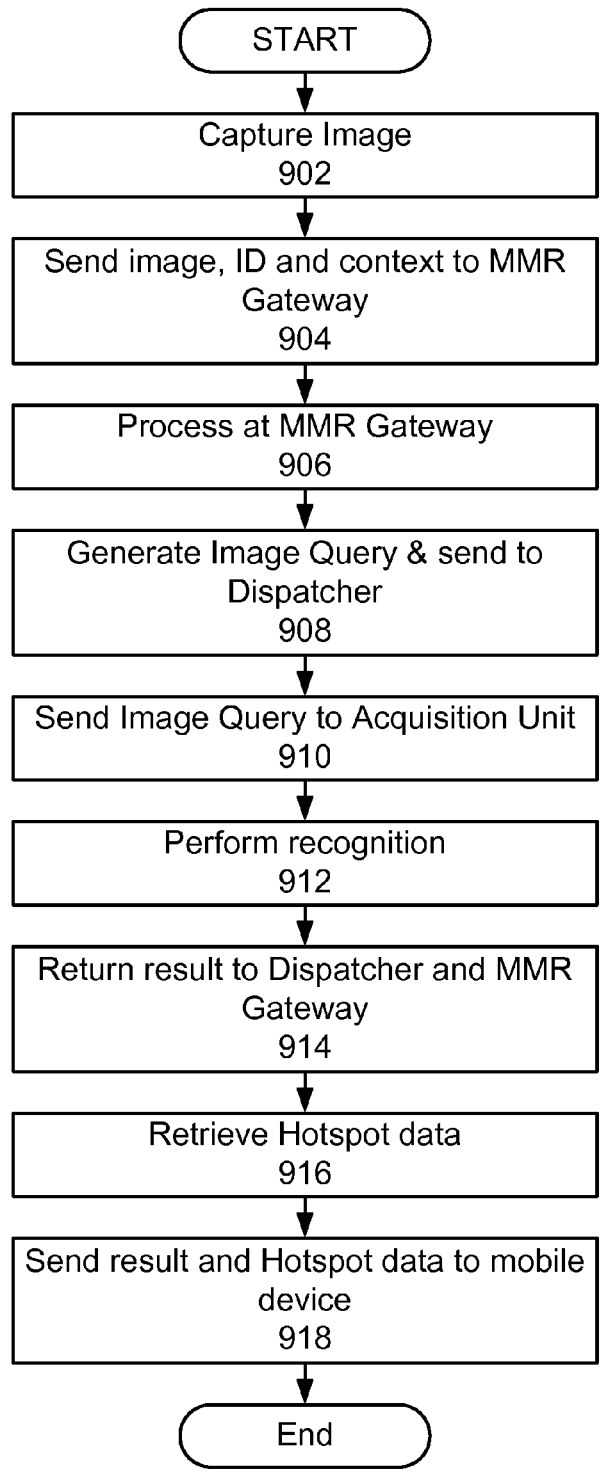
FIG. 9 is a flowchart of an embodiment of a method for retrieving a document and location from an input image in accordance with the present invention.

FIG. 9 is a flowchart of a general method for generating and sending a retrieval request and processing the retrieval request with an MMR system 100. The method begins with the mobile device 102 capturing 902 an image. A retrieval request that includes the image, a user identifier, and other context information is generated by the mobile device 102 and sent 904 to the MMR gateway 104. The MMR gateway 104 processes 906 the retrieval request by extracting the user identifier from the retrieval request and verifying that it is associated with a valid user. The MMR gateway 104 also performs other processing such as recording the retrieval request in the log 310, performing any necessary accounting associated with the retrieval request and analyzing any MMR analytics metrics. Next, the MMR gateway 104 generates 908 an image query and sends it to the dispatcher 402. The dispatcher 402 performs load-balancing and sends the image query to the acquisition unit 406. In one embodiment, the dispatcher 402 specifies the particular recognition unit 410 of the acquisition unit 406 that should process the image query. Then the acquisition unit 406 performs 912 image recognition to produce recognition results. The recognition results are returned 914 to the dispatcher 402 and in turn the MMR gateway 104. The recognition results are also used to retrieve 916 hotspot data corresponding to the page and location identified in the recognition results. Finally, the hotspot data and the recognition results are sent 918 from the MMR gateway 104 to the mobile device 102.

Figure 10:
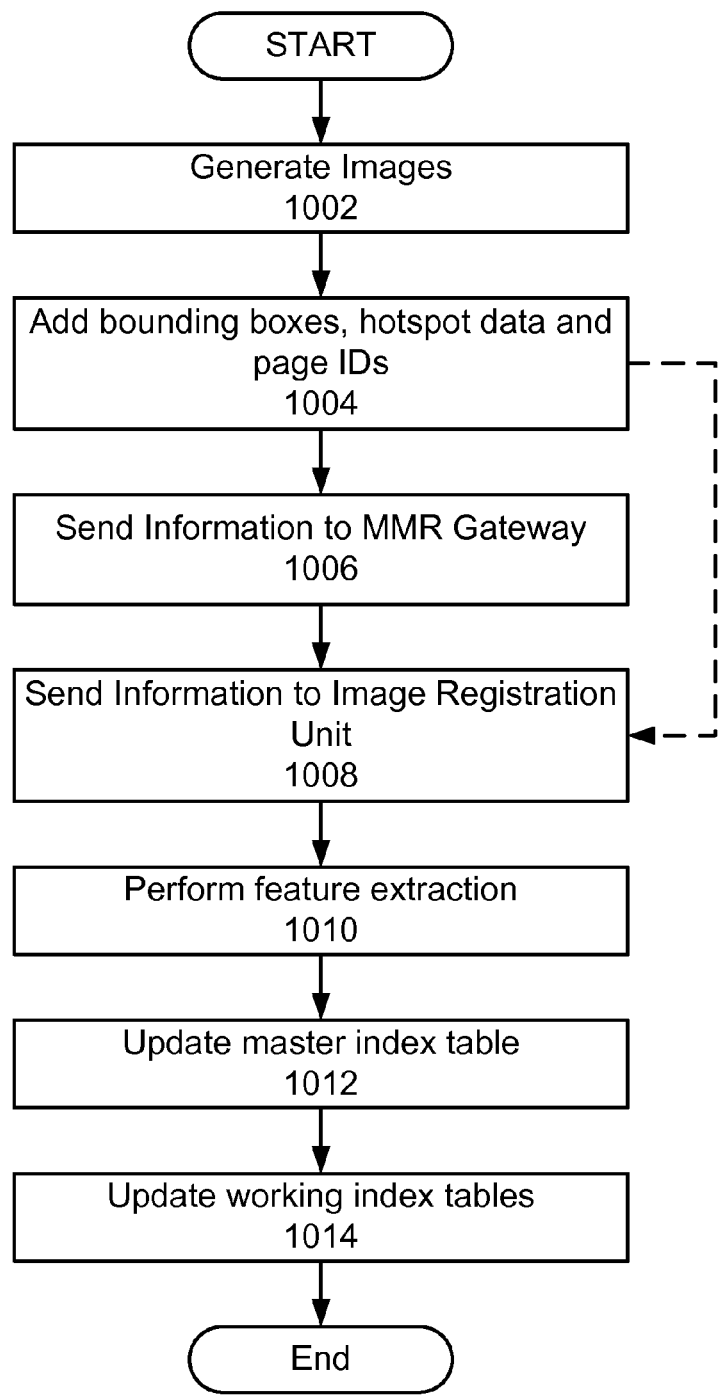
FIG. 10 is a flowchart of a method for registering an image with the MMR matching unit in accordance with embodiments of the present invention.

Referring now to FIG. 10, a method for registration of images will be described. The method begins by generating 1002 images by using conventional publishing software 802. The images are then augmented 1004 with bounding boxes, hotspot data and page identification numbers using the pre-press plug-in for registration and annotation 804. The augmented images are then sent 1006 to the MMR gateway 104. The MMR gateway 104 extracts the hotspot data and adds it to the hotspot database 404. The MMR gateway 104 then sends 1008 the image, page number and bounding boxes to the image registration unit 408. In an alternate embodiment as depicted in FIG. 10 by the dashed line, the augmented images can be sent to the image registration unit 408 without going through the MMR gateway 104. The indexing unit 414 and then performs 1010 feature extraction on the images. Depending on the embodiment, feature extraction may be performed for a single recognition algorithm, multiple different recognition algorithms or the same recognition algorithm on different data sets. The features extracted from step 1010 are then used to update 1012 the master index table(s) 416*a-e*. Finally, the changes that were applied to the master index table(s) 416*a-e* are migrated 1014 to working index tables 412*a-n* of the acquisition unit 406. This method is particularly advantageous because images need only be provided to the image registration unit 408 and the image registration unit 408 automatically updates the master index table 416, and automatically migrates the changes to the working index tables 412 of the acquisition unit 406.

Figure 11:
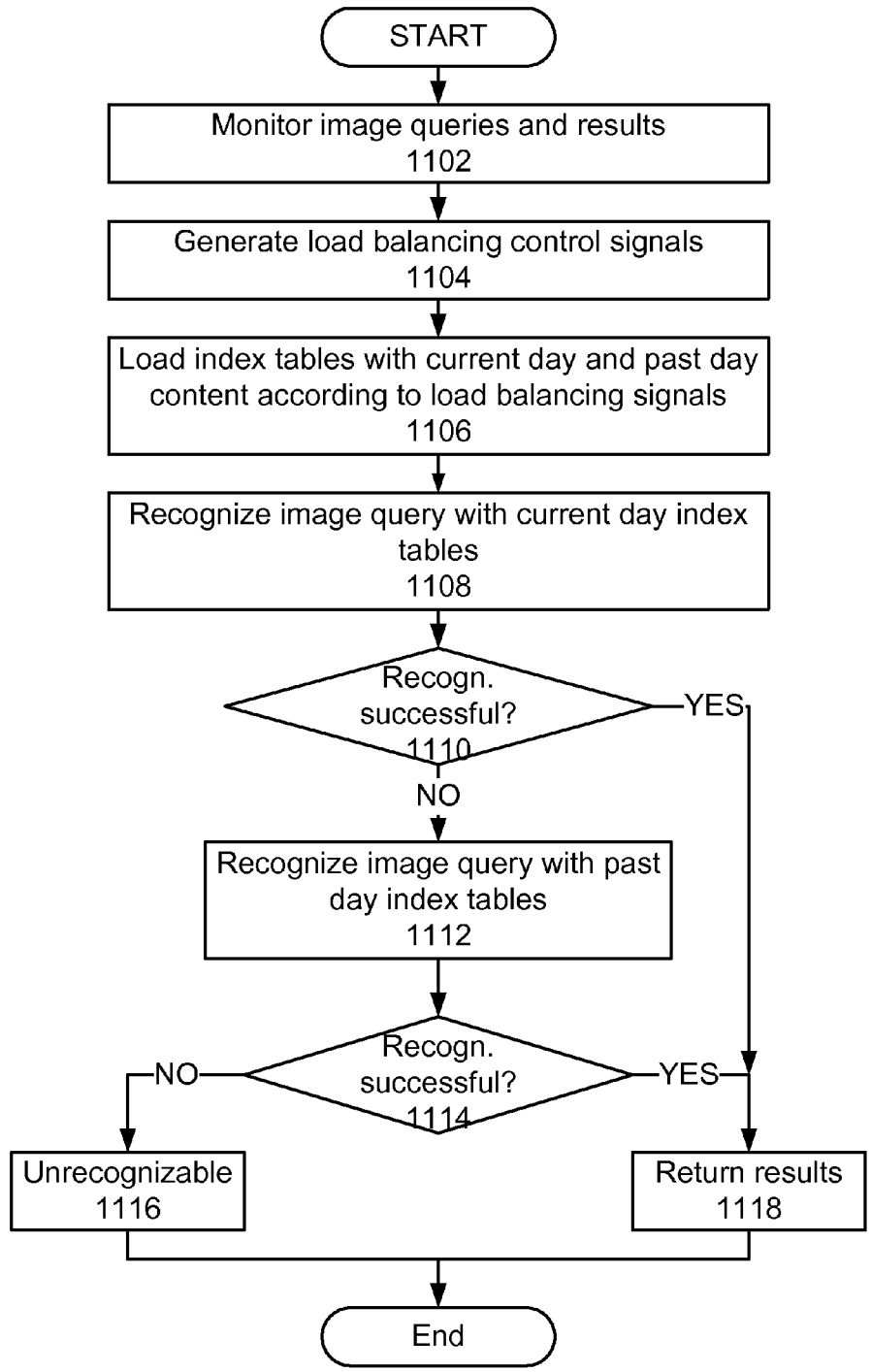
FIG. 11 is a flowchart of a method for dynamic load balancing in accordance with an embodiment of the present invention.

Referring now to FIG. 11, a method for dynamic load balancing will be described. This method relates generally to the operations performed by the dynamic load balancer 418 of FIG. 4A. The method begins by monitoring 1102 image queries and recognition results transferred between the dispatcher 402 and the acquisition unit 406 on signal line 430. The dynamic load balancer 418 monitors the image queries and corresponding recognition results for some pre-defined period such as a day. In particular, the actual distribution of images successfully found and in which index tables 412*a-n* they were found is monitored. The dynamic load balancer 418 generates 1104 load balancing control signals specifying a configuration for the working index tables 412*a-n* of the acquisition unit 406. For example, based on usage measured by the dynamic load balancer 418 for the prior day, expected usage can be predicted and the working index tables 412*a-n* of the acquisition unit 406 loaded with content appropriately. For example, n index tables are loaded with the newspaper content for the current day while m index tables are loaded with the newspaper content of past days. Thus there are a total of n+m servers. Based on past history, the present invention makes it expects n/(n+m) queries will be for the newspaper of the current day. The indexing unit 414 of the image registration unit 408 then receives new images for the current day's newspaper. Based upon the generated load balancing signals generated in step 1104, some (e.g., n) of the working index tables 412*a-n* are loaded with the new images while the existing information in the working index tables 412*a-n* are reconfigured such that they can be stored in the remaining (e.g., m=all working index tables-n) working index tables 412*a-n* that are not utilized to store the new images.

In one embodiment, operation of the acquisition unit 406 is modified or optimized to match the configuration of the working index tables 412*a-n*. In particular, the acquisition unit 406 upon receiving an image query, first attempts to recognize 1108 the image query with recognition units 410 and index tables 412 configured with the images of the current day's newspaper. Next, the method determines 1110 whether recognition was successful. If so the method returns 1118 the result and a method is complete. If not, the method attempts to recognize 1112 the image query with recognition units 410 and index tables 412 configured with images of past days newspapers. Again the method determines 1114 whether recognition was successful. If so, the method returns 1118 the result and the method is complete. If not, the method returns 1116 a signal indicating that recognition was unsuccessful and the method is complete. While the load balancing method was described above with reference to use of a periodic division of the data for a newspaper, those skilled in the art will understand that the load-balancing method may be applied for dividing the data based on any other usage criteria and that the image data may be any type of images other than newspapers.

Figure 12:
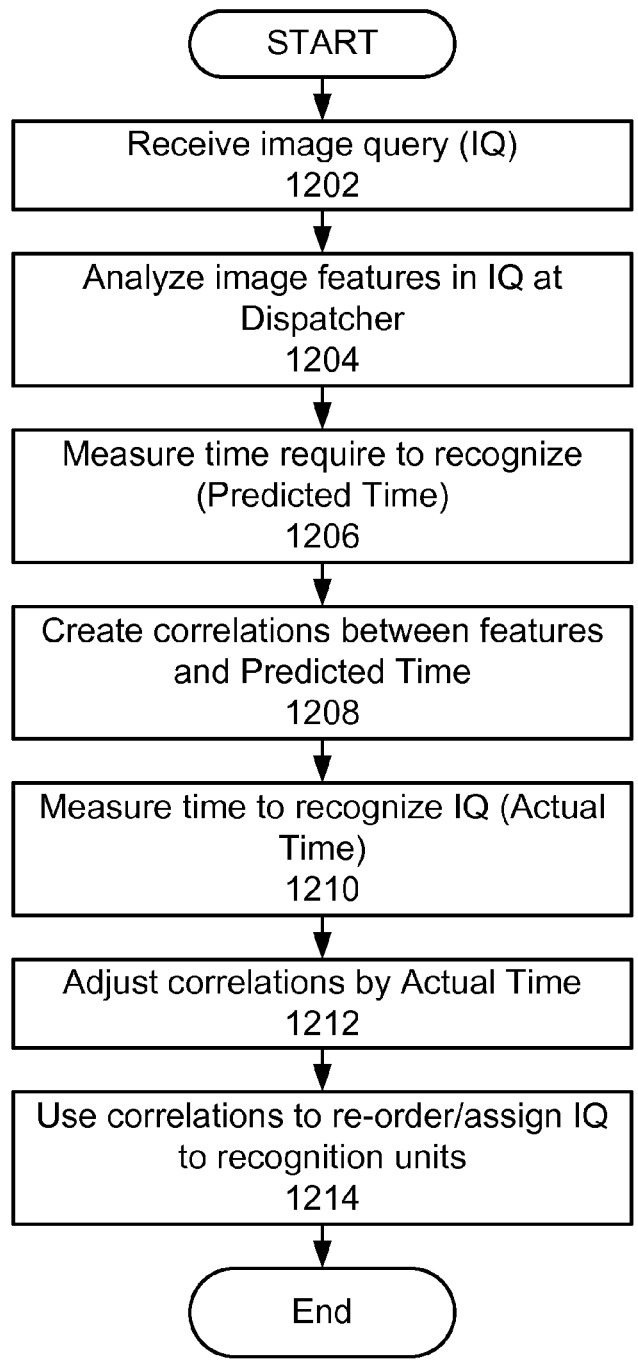
FIG. 12 is a flowchart of a method for image-feature-based ordering in accordance with an embodiment of the present invention.

Referring now to FIG. 12, one embodiment of a method for performing image feature-based ordering will be described. This functionality of this method is generally implemented by the image feature order unit 504 of the dispatcher 402. The method begins by receiving 1202 an image query. Next, the image feature order unit 504 of the dispatcher 402 analyzes 1204 the image features in the image query. It should be noted that the image features used in the analysis of step 1204 need not be the same image features used by the recognition units 410. It is only necessary to correlate the image features to recognition. In yet another embodiment, several different feature sets are used and correlations are measured over time. Eventually, the feature set that provides the best predictor and has the lowest computational cost is determined and the other feature sets are discarded. The image feature order unit 504 measures 1206 the time required to recognize the image features and thereby generates a predicted time. Next, the method creates 1208 correlations between features and predicted times. Next, the method measures 1210 the time actually required by the acquisition unit 406 to recognize the image query. This time required by the acquisition unit 406 is referred to as an actual time. Then the image feature order unit 504 adjusts 1212 the correlations generated in step 1208 by the actual time. The adjusted correlations are then used 1214 to reorder and assign image queries to recognition units. For example, simple images with few features are assigned to lightly loaded servers (recognition units 410 and index table 412 pairs) so that they will be recognized quickly and the user will receive the answer quickly. While the method shown in FIG. 12 illustrates the process for an image or a small set of images, those skilled in the art will recognize that once many images have been processed with the above method, a number of correlations will be created and the image feature order unit 504 essentially learns the distribution of image features against processing time and then the controller 501 of the distributor 506 can use the distribution to load balance and redirect image queries with particular image features accordingly. After the correlations are adjusted 1212, the new image-based feature ordering measurements can be used immediately in the previously described queue management strategies. The simple assignment strategy would simply use the new predictions. The balanced response strategy would re-balance the queues of requests pending for each recognition unit and optionally move requests between queues to maintain a uniform expected response for each recognition unit 410. The easy first strategy would simply use the new predictions when it inspected the incoming FIFO queue 508.

Blurry Images

Referring now to FIGS. 13-17, a method for automatically adapting the MMR system 100 for the characteristics of the image capture devices will be described. Recognition systems are often trained on pristine images of the objects they should recognize. However, handheld image capture devices and the environment in which they are used produce images that are much different. FIGS. 13-17 describe a method for automatically adapting the MMR system 100, originally designed for pristine object images, to images produced by a variety of capture devices as they are commonly used. Basically, the method trains N instances of a recognition algorithm on N different sets of data. The N data sets are chosen based on the ability of the recognition units they produce to successfully recognize a device training (DT) image set that represents the images a that device will produce when used in practice. Then, a query image is recognized with each instance until one of them produces a decision. These adaptations greatly enhance the recognition accuracy of MMR system 100. While the present invention will now be described in the context of adapting the MMR system 100 for blur, blur is only one characteristic that is used by way of example to illustrate the principles of the present invention. Any characteristic of the image capture device could alternatively be modeled to simulate actual variations in that characteristic, a data set created and the system 100 adapted to recognize images with such variations in a characteristic.

Figure 13:
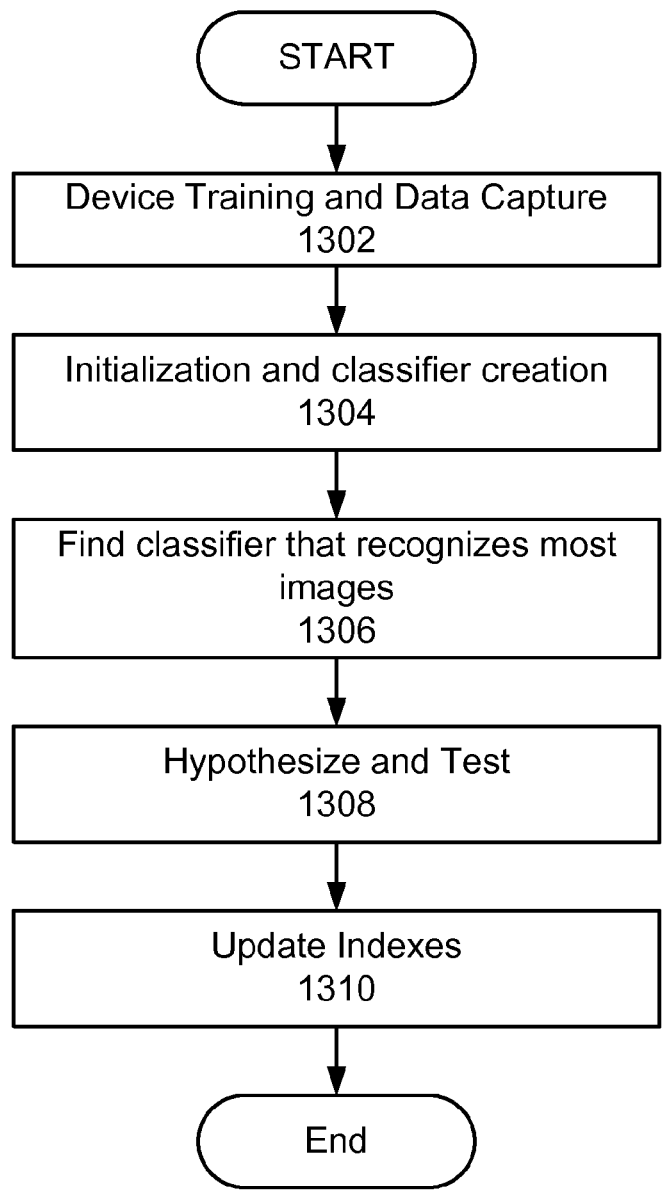
FIG. 13 is a flowchart of a method for generating blurry images and corresponding indices in accordance with an embodiment of the present invention.

FIG. 13 shows one embodiment for a general method of adapting the MMR system 100 for blur introduced by the mobile device 102. The process begins with device training 1302 and data capture. One embodiment for device training is described in more detail below with reference to FIG. 14. Once a set of training data has been created, the method performs initialization 1304 and creates classifiers. Embodiments for initialization and classifier creation 1304 are described below with reference to FIGS. 15A and 15B. Once a set of classifiers has been created, the method identifies 1306 the classifier that recognizes the greatest number of images correctly. In one embodiment this is accomplished by performing a greedy search as described below with reference to FIG. 16. Then the identified classifier is hypothesized 1308 and tested. In other words, the classifier is modified in an attempt to increase the number of images it can recognize and those modifications are validated. One embodiment for this testing is described below with reference to FIG. 17. Finally, the method updates 1310 the index tables 412 and recognition units 410 based on the classifier(s) that has been hypothesized and tested. In another embodiment, the method of FIG. 13 is combined with a method for monitoring the performance of the recognition algorithm as it runs and determines whether a new instance of the recognition algorithm should be added or whether a current instance should be replaced by performing the method of FIG. 13.

Figure 14:
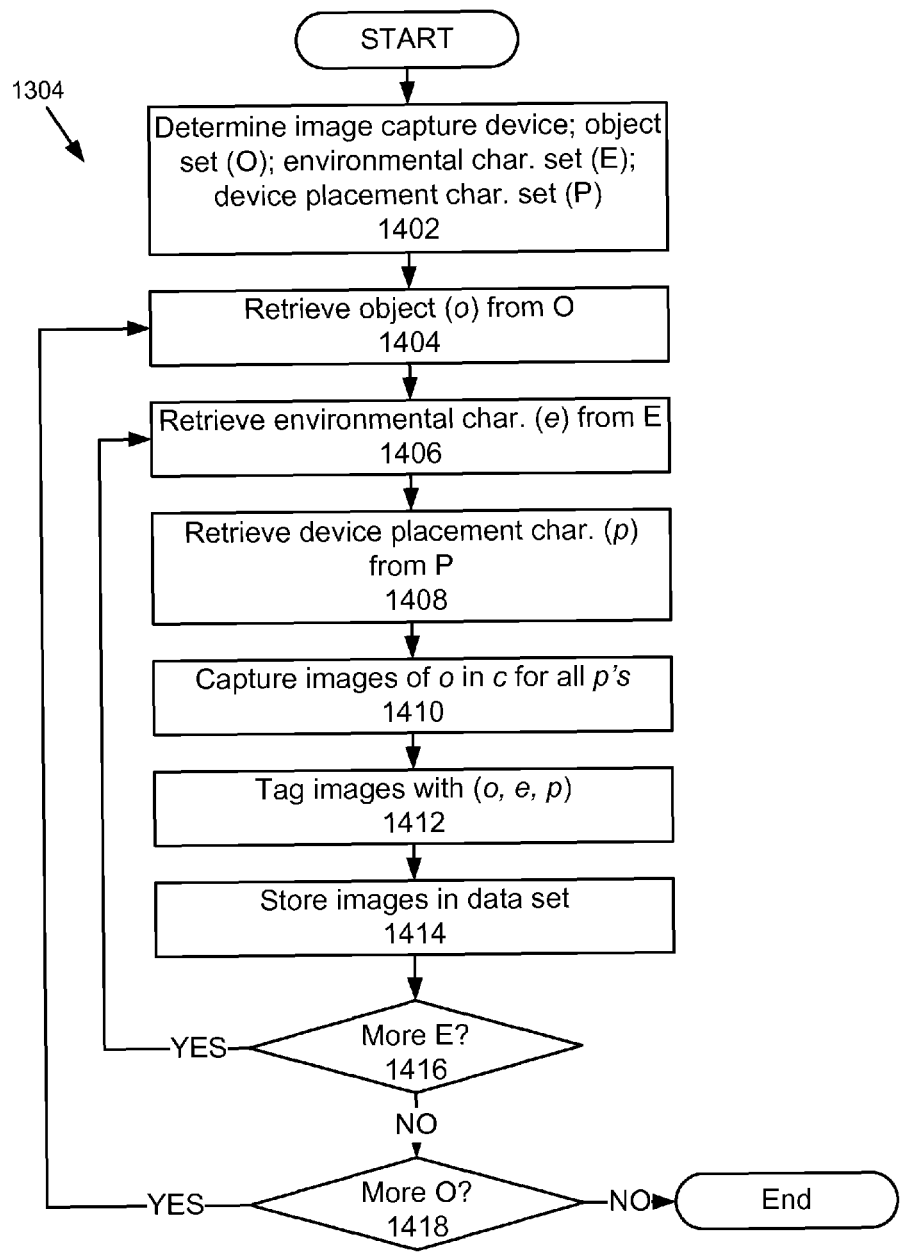
FIG. 14 is a flowchart of a method for generating blurry images for training in accordance with an embodiment of the present invention.

Referring now to FIG. 14, one embodiment of a method for creating a set of training data will be described. In general, creating a set of training data requires generation of a data set that spans the range of placement characteristics and environmental factors with respect to objects. The method collects a device training (DT) data set for the range of placement characteristics and environmental factors with respect to the objects. Each image with the measurement for each placement characteristic and environmental factor and added to the set.

The method begins by determining 1402 an image capture device, an object set (O), an environmental characteristic set (E) and a device placement characteristic set (P). The present invention assumes that the following have been identified: a given capture device, a representative set of objects (paper documents in the case of invisible junctions), a set of environmental factors (e.g., lighting, shadows, object deformation, temperature, etc.), and a set of placement characteristics (e.g., distance, rotation, tilt, jitter, etc.). For example, the given capture device may be a commercially available cell phone that includes a camera such as the iPhone from Apple Computer, Inc. or the Blackberry from Research In Motion. The object set can be paper newspaper pages with different X-Y locations on each page. The environmental characteristics and corresponding values such as light=florescent, sunlight, etc.; shadow=soft, sharp, etc. The placement characteristics can include values such as distance=1", 2", . . . . "; tilt=0 degrees, 5 degrees, 7 degrees; . . . .

Next, the method retrieves 1404 an object (o) from the object set (O); retrieves 1406 an environmental characteristic (e) from the environmental characteristic set (E); retrieves 1408 a device placement characteristic (p) from the device placement characteristic set (P). Then the method captures 1410 images of the object (o) in the environmental characteristic (e) for each value of the device placement characteristic (p). The images are tagged 1412 with their values of o, e and p. The tagged images are then stored 1414 in the data set (DT). The method then proceeds to step 1416 determine whether there are any more environmental characteristics in the environmental characteristic set (E). If so, the method returns to step 1406 to retrieve another environmental characteristic and then it captures, tags and stores images with that environmental characteristic in the data set until all the environmental characteristics in the data set have been processed. On the other hand, if there are no more environmental characteristics in step 1416, the method proceeds to step 1418 to determine whether there are any more objects (o) in the object set (0). If so, the method returns to step 1404 to retrieve another object and proceeds to repeat steps 1406 to 1416 for the retrieved object. If not the method is complete and ends having created and stored a data set with all possible combinations of objects, environmental characteristics and device placement characteristics. Those skilled in the art will recognize that this process can be automated to automatically perform the steps of FIG. 14 whenever a new device is added or detected.

Figure 15A:
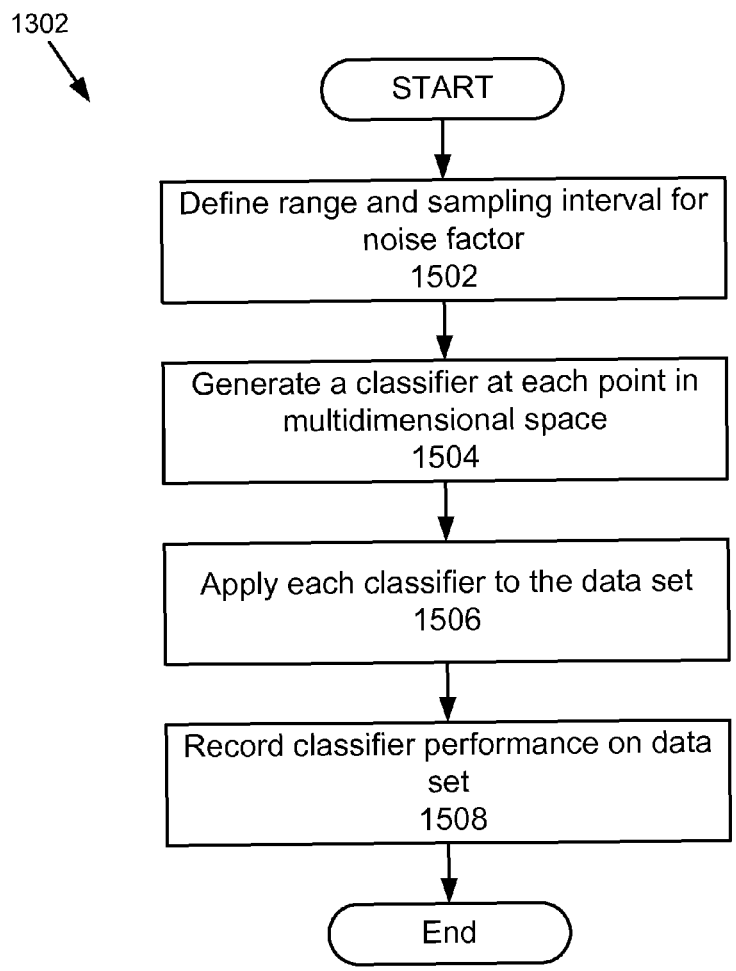
FIG. 15A is a flowchart of a first embodiment of a method for initializing and generating classifiers for blurry images in accordance with the present invention.

Referring now to FIG. 15A, a generalized version of a method for initialization 1302 and generation of the classifier is shown. The method begins by defining 1502 a range and sampling interval for the noise factors (e.g., focus blur, motion blur, dynamic range, etc.). This method generates 1504 a classifier at each point in a multidimensional space. Each classifier is then applied 1506 to the data set (DT). Finally, a performance of the classifier on the data set is recorded 1508.

Figure 15B:
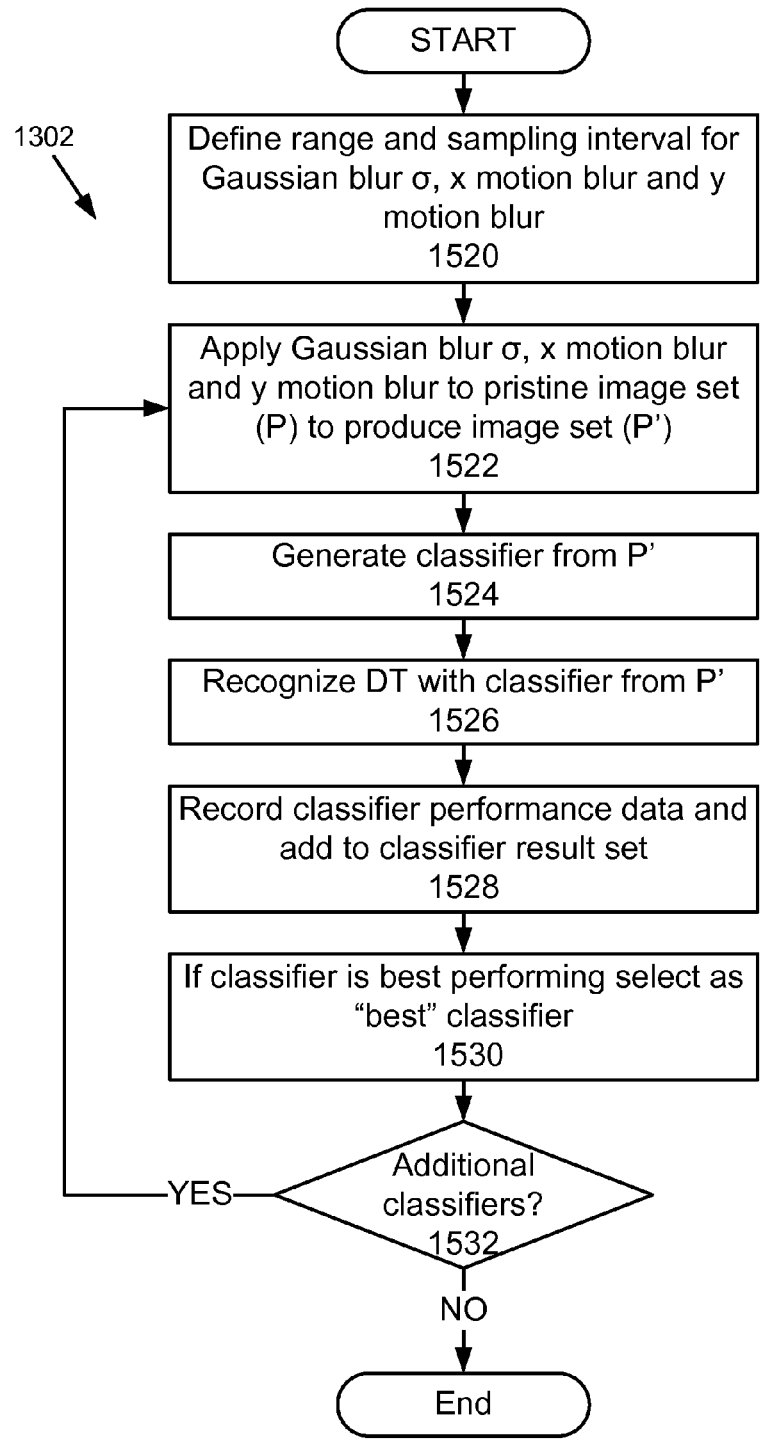
FIG. 15B is a flowchart of a first embodiment of a method for initializing and generating classifiers for blurry images in accordance with the present invention.

Referring now to FIG. 15B another embodiment of the method for initialization 1302 and generation of classifiers is shown. The method FIG. 15B provides an example of classifier generation where the noise is Gaussian blur σ, x motion blur and y motion blur. The method begins by defining 1520 the range and sampling interval for the Gaussian blur σ, x motion blur and y motion blur. For example, the Gaussian blur σ equals $s_0$ to $s_g$ by interval $s_i$; the motion blur in the x direction, $d_x$ equals $d_{xo}$ to $d_{xx}$ by interval $d_{xi}$; and the motion blur in the y direction, $d_y$, equals $d_{yo}$ to $d_{yy}$ by interval $d_{yi}$. Next the method applies 1522 the Gaussian blur σ, x motion blur and y motion blur to a pristine image set (P) to produce image set P'. For example, for each pristine object image p in the pristine image set P, this step applies Gaussian blur σ, $s_0$ to $s_g$ for each interval $s_i$, x motion blur $d_{x0}$ to $d_{xx}$ for each interval $d_x$, and y motion blur $d_{y0}$ to $d_{yy}$ by interval $d_{yi}$, and adds the resulting images to image set P'. Next, the method generates 1524 a classifier from P'. For example, the method generates a classifier C for sigma, $d_x$, $d_y$ for a point in a multidimensional space. The method then applies the classifier C sigma, $d_x$, $d_y$ to recognize 1526 the images in training set DT. The method records 1528 the classifier performance including the number of images recognized, the identity of the images and an average confidence score, for example the average number of inliers for invisible junctions. Then the classifier C is added to a classifier results set (CR). Next, the method determines 1530 whether the classifier is the best performing and if so identifies 1530 the classifier as such (best classifier=(sigma, $d_x$, $d_y$)). For example, the classifier is the best performing if it has the highest number of images recognized and the highest average confidence score among all the classifiers tested up to this point. The method next determines 1532 whether there are any additional classifiers. In other words, the method determines whether there are any points in the multi-dimensional space of possible values for Gaussian blur, x motion blur and y motion blur for which a classifier has not been generated. If so, the method returns to step 1522 and generates a classifier for one of those points and repeats steps 1524 to step 1532. On the other hand, if there are no additional classifiers to be generated the method is complete and ends.

Figure 16:
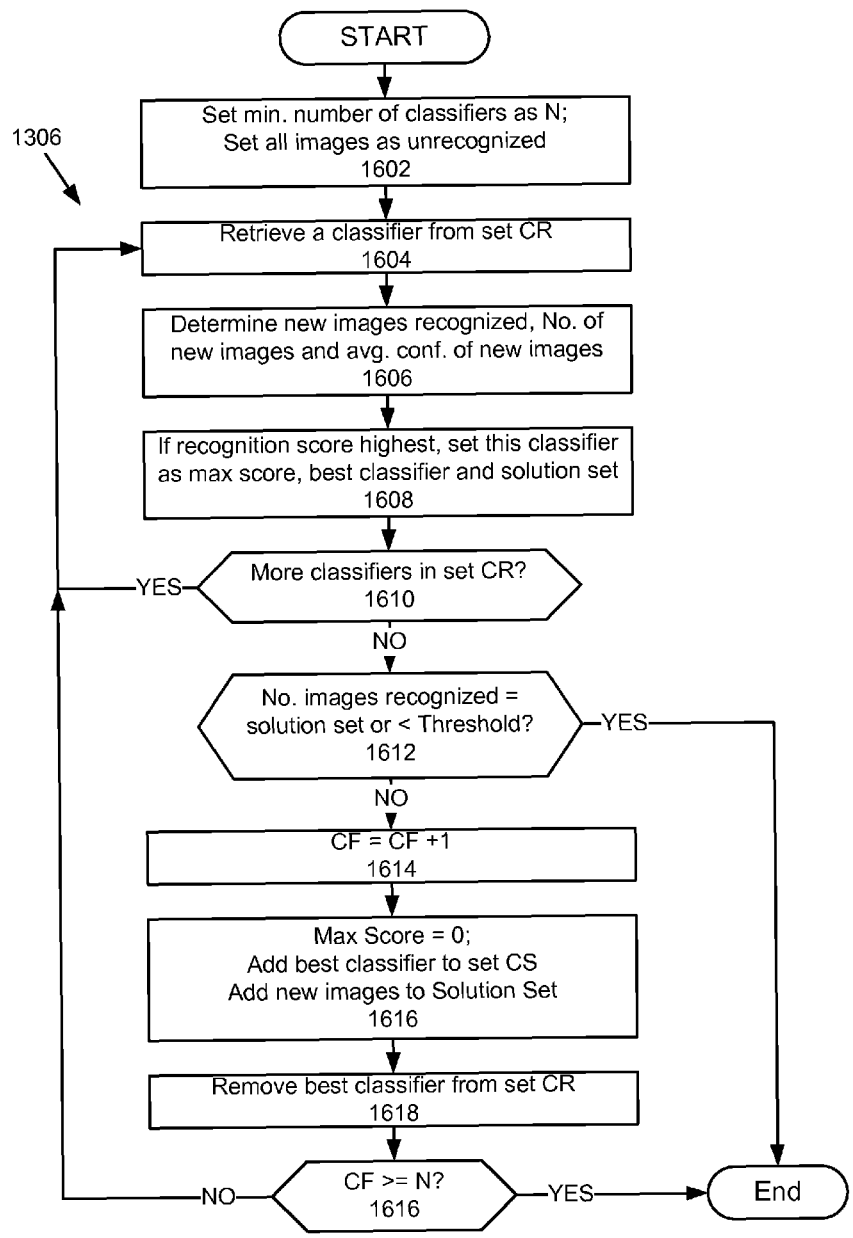
FIG. 16 is a flowchart of an embodiment of a method for finding a classifier that recognizes the most images in accordance with the present invention.

Referring now to FIG. 16 a method for finding a classifier that recognizes the greatest number of images will be described. Basically, the method finds the classifiers that recognize the most "unrecognized" images, adds it to the solution set, and considers those images "recognized." This process is repeated until either N classifiers are determined or the number of newly "recognized" images is less than a threshold.

The method begins by setting 1602 the minimum number of classifiers N required and setting all the device training images as "unrecognized." Next, the method retrieves 1604 a classifier from the classifier set CR. Then the method determines 1606 the images from the device training set that are recognized by the classifier and an average confidence score for the recognized images. A classifier recognition score is then determined using the number of new images recognized and average confidences scores for those new images. If the classifier recognition score is the highest, then a maximum score is set 1608 to this classifier's score, a best classifier is set to have the values of sigma, dx and dy of this classifier, and the solution set is defined as including the images recognized by this classifier. Next, the method determines 1610 whether there are more classifiers in the classifier set CR. If so, the method returns to step 1604 and proceeds to repeat steps 1606 and 1608. If not, the method determines 1612 whether this new "best" classifier significantly improves the expected performance of current solution. It does this by determining whether the number of newly recognized images is less than a threshold or the total number of recognized images is equal to the device training set. If either condition is true, the method is complete. Otherwise, the method proceeds to step 1614 and increments a variable CF representing the number of classifiers found by one. The method adds the new "best" classifier to classifier set CS, adds the new images recognized by the classifier to the solution set and resets the maximum score to zero. Then the method removes 1618 the "best" classifier from the classifier set CR. Finally, the method determines whether the number of classifiers found is greater than or equal to N, the number of classifiers desired for a working classifier set. If not, then method returns to step 1604 to repeat the process for the classifier set CR from which the best classifier has just been removed. If so, the method is complete and ends.

Figure 17:
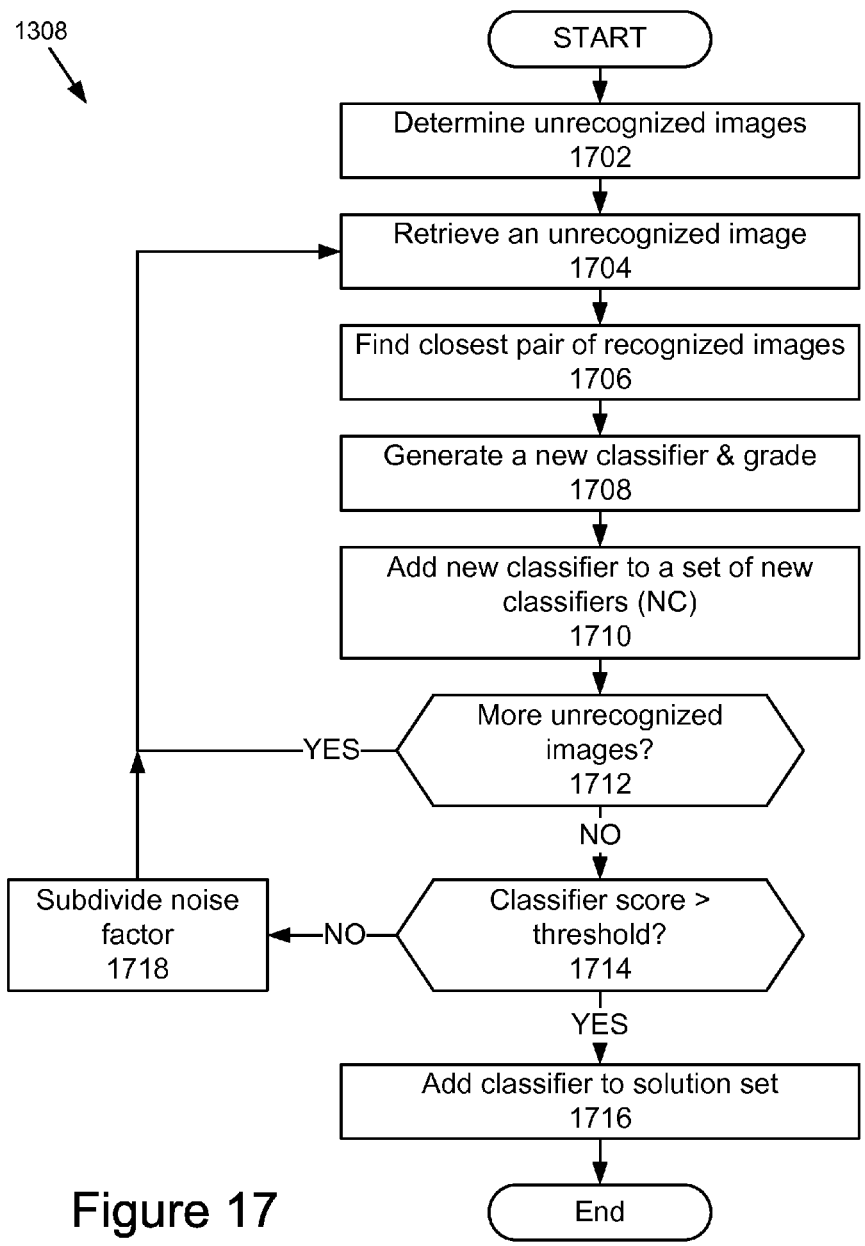
FIG. 17 is a flowchart of an embodiment of a method for modifying and testing a classifier against unrecognized images in accordance with the present invention.

Referring now to FIG. 17 a method for hypothesizing and testing will be described. Once the best classifiers have been determined, the present invention intends to improve recognition by modifying the classifiers. The method begins by determining 1702 the unrecognized images in the device training set. For example, this can be done by removing all the images recognized in the method of FIG. 16 from device training set (unrecognized images=DT−GS), where GS=the Solution Set found in FIG. 16. The method retrieves 1704 a selected unrecognized image. Next, the method finds 1706 the closest pair of recognized images that match different classifiers where distance is determined by comparing placement characteristics and environmental factors. In one embodiment, this step is performed by finding pair of images (i1, i2) in GS such that: a) i1 and i2 are recognized by different classifiers; b) distance (u,i1) is smallest over all images in GS; c) distance (u,i2) is second smallest over all images in GS subject to condition 1; and d) the distance between the two images is determined by comparing the object, environmental conditions, and placement characteristics for each one. In the simplest case, all objects and environmental conditions are considered to be the same and the distance is determined by the L2 norm on the placement characteristics, normalized for each dimension. Then the method generates 1708 a new classifier from noise characteristics that are half way between those of each member of the pair, and grades the new classifier. In one embodiment, the method generates the new classifier based on the pair of images i1 and i2. For example, the method starts with sigma=(sigma of i1+sigma of i2)/2; dx=(dx of i1+dx of i2)/2; dy=(dy of i1+dy of i2)/2. Then for each pristine object image p in training set P Gaussian blur sigma, motion blurs dx and dy are applied to p and the result added to P'. Then a modified classifier C sigma, dx, dy (P') is generated. Next the modified classifier C sigma, dx, dy (P') is used to recognize the unrecognized images (DT-GS) and the method records the number of images recognized, identity of images, and average confidence score (avg. # inliers for IJ). The new classifier is added 1710 to a set of new classifiers. Next, the method determines 1712 whether there are more unrecognized images. If so, the method returns to 1704 to retrieve another unrecognized image and then repeat steps 1706, 1708, 1710 and 1712 for that unrecognized image. Next, the method determines 1714 whether the classifier recognition score is above a threshold. If so, the method either adds 1716 the classifier to the solution set (if the solution set size is less than N) or adds it to the multidimensional space; and the method is complete. If not, the method continues subdividing 1718 the noise factor space until the difference is below threshold, and then returns to step 1704 to generate a new classifier.

In one example, the method begins with image u (3" from object, tilt=5 degrees, rotation=0 degrees), and finds images image i1 (3" from object, tilt=10 degrees, rotation=0 degrees) recognized by C (sigma=20, dx=0, dy=10) and image i2 (4" from object, tilt=0 degrees, rotation=10 degrees) recognized by C(sigma=10, dx=10, dy=0). The method generates a new classifier nc sigma=(10+20/2)=15, dx=(0+10/2)=5, dy=(10+0/2)=5.

Quality Predictor 502

Referring now to FIGS. 18-21, an embodiment of the quality predictor 502 and its operation will be described in more detail. The quality predictor 502 produces a recognizability score (aka Quality Predictor) that can be used for predicting whether or not an image is a good candidate for a particular available image/recognition algorithm. An image may not be recognizable based on many reasons, such as motion blur, focus blur, poor lighting, and lack of sufficient content. The goal of computing a recognizability score is to label the recognizable images as "poor quality," and label recognizable images as "good quality." Besides this binary classification, the present invention also outputs a "recognizability score" where images are assigned a score based on the probability of their recognition.

The quality predictor 502 will now be described with reference to an embodiment in which the quality predictor 502 is part of the dispatcher 402 as has been described above and is depicted in FIG. 5. In this embodiment, the quality predictor 502 provides a recognizability score as input to the distributor 506 that decides which recognition unit 410 (and thus which recognition algorithm to run). However, those skilled in the art will realize that there are numerous system configurations in which the quality predictor 502 and the recognizability score are useful and advantageous. In a second embodiment, the quality predictor 502 is run on a capture device (mobile device 102 phone, digital camera, computer 110) to determine if the quality of the captured image is sufficient to be recognized by one of recognition units 410 of the MMR matching unit 106. If the quality of the captured image is sufficient, it is sent to the MMR matching unit 106, if not, the user is simply asked to capture another image. Alternatively, the captured image and the quality predictor score are shown to the user and he/she decides whether it should be submitted to the MMR matching unit 106. In a third embodiment, the quality predictor 502 is part of the result combiner 610 where there are multiple recognition units 410 and the recognizability score determines how the recognition results are evaluated. In a fourth embodiment, the quality predictor 502 is part of the indexing unit 414 and computation of a recognizability score precedes the indexing process, and the score is used in deciding which indexer/indexers need to be used for indexing the input document page. For example, if the recognizability score is low for the image to be indexed using the BWC algorithm, then the image may be indexed using only the IJ algorithm. Further, the same quality predictor can be used for both indexing and recognition. In a fifth embodiment, the quality predictor 502 is used before the "image capture" process on a mobile device 102. The recognizability score is computed prior to capturing the image and device captures an image only if the recognizability score is higher than a threshold. The quality predictor 502 can be embedded in a camera chip and can be used to control the camera's hardware or software. For example, camera aperture, exposure time, flash, macro mode, stabilization, etc. can be turned on based on the recognition units 410 requirements and the captured image. For example, BWC can recognize blurry text images and capturing blurry images can be achieved by vibrating the camera phone.

Figure 18:
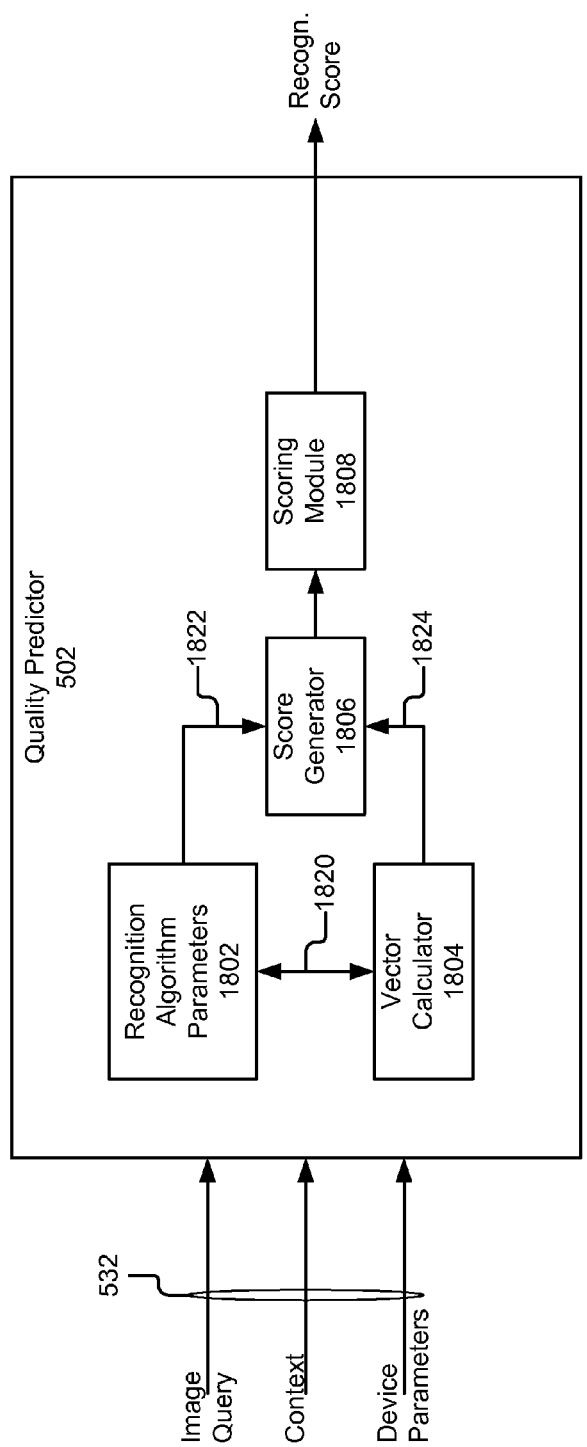
FIG. 18 is a block diagram of an embodiment of a quality predictor in accordance with the present invention.

As shown in FIG. 18, one embodiment of the quality predictor 502 comprises recognition algorithm parameters 1802, a vector calculator 1804, a score generator 1806 and a scoring module 1808. The quality predictor 502 has inputs coupled to signal line 532 to receive an image query, context and metadata, and device parameters. The image query may be video frames, a single frame or image features. The context and metadata includes time, date, location, environmental conditions, etc. The device parameters include brand, type, macro block on/off, gyro or accelerometer reading, aperture, time, exposure, flash, etc. Additionally, the quality predictor 502 uses certain parameters of the recognition algorithm parameters 1802. These parameters of the recognition algorithm parameters 1802 can be provided to the quality predictor 502 from the acquisition unit 406 or the image registration unit 408. The vector calculator 1804 computes quality feature vectors from the image to measure its content and distortion, such as its blurriness, existence and amount of recognizable features, its luminosity, etc. The vector calculator 1804 computes any number of quality feature vectors from one to n. One embodiment of the vector calculator 1804 is described below with reference to FIG. 19. In some cases, the vector calculator 1804 requires knowledge of the recognition algorithm(s) to be used, and the vector calculator 1804 is coupled by signal line 1820 to the recognition algorithm parameters 1802. For example, if an Invisible Junctions algorithm is employed, the vector calculator 1804 computes how many junction points present in the image as a measure of its recognizability. All or some of these computed features are then input to score generator 1806 via signal line 1824. The score generator 1806 is also coupled by signal line 1822 to receive recognition parameters for the recognition algorithm parameters 1802. The output of the score generator 1806 is provided to the scoring module 1808. The scoring module 1808 generates a recognition score using the recognition scores provided by the score generator 1806 and applies weights to those scores. In one embodiment, the result is a single recognizability score. In another embodiment, the result is a plurality of recognizability scores ranked from highest to lowest.

Figure 19:
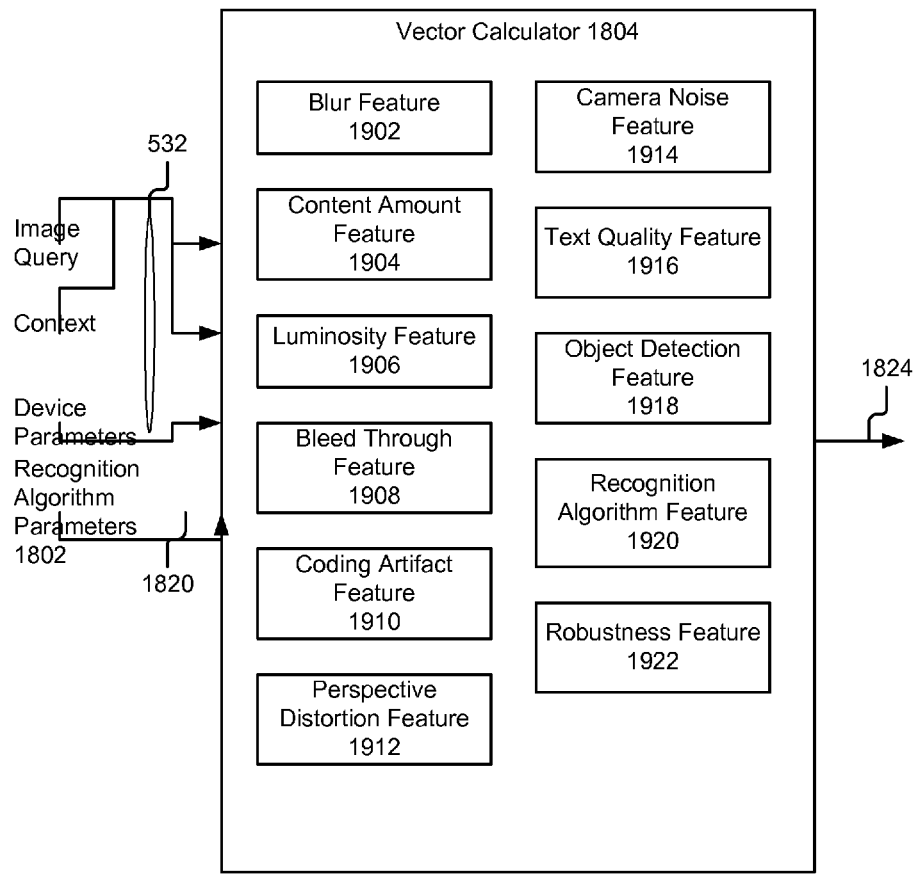
FIG. 19 is a block diagram of an embodiment of a vector calculator in accordance with the present invention.

Referring now to FIG. 19, an embodiment of the vector calculator 1804 in accordance with the present invention is shown. The vector calculator 1804 comprises a blur feature module 1902, a content amount feature module 1904, a luminosity feature module 1906, a bleed through feature module 1908, a coding artifacts feature module 1910, a perspective distortion feature module 1912, a camera noise feature module 1914, a text quality feature module 1916, an object detection feature module 1918, a recognition algorithm feature module 1920 and a robustness feature module 1922. Those skilled in the art will realize that the vector calculator 1804 they include various other feature modules and the embodiment of FIG. 19 is only one example. Other embodiments may have more or fewer modules than those depicted in FIG. 19. The vector calculator 1804 has inputs for receiving the image query, the context and metadata, device parameters, and parameters of the recognition algorithm. In one embodiment, these inputs are coupled to the modules 1902, 1904, 1926, 1908, 1910, 1912, 1914, 1916, 1918, 1920 and 1922 of the vector calculator 1804.

The blur feature module 1902 is software and routines for determining a quality feature based on an amount of blur in a captured image. In one embodiment, motion blur features are computed in one or more of the following ways:

Gradient Based Features. The gradient of the input image is computed (for example with a [−1 0 1] kernel), in both horizontal and vertical dimensions. The magnitudes of gradient values are used to form two n-bin histograms (for example n=3), one for vertical and one for horizontal direction, yielding a 2n dimensional feature vector. The gradient of the input image is computed with 2D kernels and histograms is computed for n gradient directions (for example in n=8 direction). The histogram can be computed for the whole image or the image can be divided into overlapping or non overlapping regions and an n-bin histogram can be computed for each region. For example, if the image is divided into K×L non-overlapping rectangle regions, the resulting feature vector will be size of K×L×n.

Edge detection. Edge detection such as described in "*A Computational Approach To Edge Detection*," Canny, J., IEEE Trans. Pattern Analysis and Machine Intelligence, 8:679-714, 1986, edge direction and edge amount histograms can be employed in a similar way to compute blur features.

Motion Estimation Based Features. If the input is video frames, the motion between two frames can be estimated with one of the motion estimation algorithms know in the art such as "*A Novel Four-Step Search Algorithm For Fast Block Motion Estimation*," and displacement in horizontal direction (dx), displacement in horizontal direction (dy), and the time of displacement (dt) yields to a feature vector [dx, dy, dt].

Frequency Domain Analysis Based Features. The focus blur of the image can be treated as a spatially-invariant low-pass spatial filter, and the frequency cutoff of this filter is inversely proportional to the size of the blur. If the image contains sharp and high-contrast edges then the image will have significant high-frequency content. The blur feature module 1902 takes 2D Discrete Fourier Transforms (DFT) of the image. As with almost all natural images, spectral magnitude decreases rapidly with increasing frequency. To compute the cutoff, the average spectral magnitude at each frequency (in all directions) is computed. In other words, the average magnitude along concentric ellipses, centered at the DC (0 frequency) term is computed. Once we have this average radial magnitude graph, we want to pick out the cutoff. Specifically, this is the first point at which the spectrum flattens into the noise floor. One way of selecting this cutoff is to low-pass filter the graph (to remove spikiness), scale the graph to a fixed height, and then look for the first point below a certain graph value at which the graph reaches a (fixed) very flat slope. Another way is to look for points in the graph with the greatest curvature (change in angle) over a fixed distance. Once these cutoffs are determined, they are converted into an actual scale. This is most easily done by taking a calibration shot of a text block and computing its cutoff, and then having a function return the ratio of your calibrated cutoff to each new, sampled cutoff. As blur features, we can employ cut off frequency Y and some other features we can compute from the frequency domain analysis, such as Eigen vectors $E_i$ and spread S of the spectrum.

The content amount feature module 1904 is software and routines for determining a quality feature based on the amount of content in the image. In one embodiment, the amount of content features are computed in one or more of the following ways:

Connected component features. Image is binarized for example using a technique described in "*Survey Over Image Thresholding Techniques And Quantitative Performance Evaluation*," and connected components are computed such as using a technique described in "*A Simple And Efficient Connected Components Labeling Algorithm*,". Then content amount feature module 1904 computes a number of features from connected components, such as histogram (H=[$h_1$ ... $h_n$]) of, average (A) of, and variance ($\sigma$) of connected components such as sizes, widths and heights, number of pixels, aspect ratios, spread, Eigen vectors, number of holes, compactness, etc.

Edge features. Corners such as using "*Optimal Corner Detector*," and edges computed in an image and their detection and strength is used to form corner and edge histograms.

Entropy. Entropies of the connected components (Ecc), binarized pixels (Eb), or graylevel/color pixels (Eg/Ec) in the image are an indication of how much information present in the image. Image can also be segmented into overlapping or non overlapping segments and entropies for each of these segments are computed and used to form entropy feature vectors. A low pass filtering or median filtering step may also be used on the image before computing entropy to remove the camera noise.

Frequency Domain Features. Frequency domain analysis, for example transform functions such as 2D fast Fourier transform (FFT) or Discrete Cosine Transforms (DCT) can be applied to the image (the whole image, or overlapping or non overlapping segments). Once frequency domain representation is obtained, this can be represented with histograms.

Compressed Image Size. If two images are compressed with the same compression algorithm, such as JPEG, with same parameters, such as same quantization factor, most of the time the image with higher frequency content results in a compressed image with higher file size. If the file size S is too high, this may be an indication of speckle noise in the image which makes it harder to recognize the image. If the file size if too low then this may be an indication of lack of significant content in the image.

The luminosity feature module 1906 is software and routines for determining a quality feature based on luminosity features. In one embodiment, the luminosity features are computed in one or more of the following ways:

Histogram features. Patterns in the grayscale histogram or color histogram are good indicators of how the image is illuminated. For example, if an image has mostly dark pixels and not any bright pixels that has a value larger than 50 (where pixel values vary from 0 to 255), then the image is likely to yield a lower recognizability score. Besides forming feature vectors from histograms or features extracted from histograms (such as number of peaks), Fisher discriminant analysis can be performed both on luminance and saturation values of the pixels. Discriminant analysis on luminance samples results in 2 classes with the mean values $ml_1$ and $ml_2$ and interclass variances $vl_1$ and $vl_2$. The degree of separation $ml_1-ml_2$, the summation of interclass variation $vl_1+vl_2$, and/or their ratios, $r=ml_1-ml_2/vl_1+vl_2$ can be used to form a feature vector.

Contrast. Contrast of the image can be computed in a number of efficient ways, for example: Contrast=average of X % lightest pixels/average of Y % darkest pixels.

Shadow. In one method, a shadow mask can be computed from the image such as described in "*Image Difference Threshold Strategies And Shadow Detection*,", and luminosity feature module 1906 uses features extracted from shadow histogram. In another method, luminosity feature module 1906 divides the image into overlapping or non overlapping segments, measure histogram in these segments regions, perform histogram equalization and detect if the histograms are similar. The similarity score can be employed as one of the features.

The bleed through feature module 1908 is software and routines for determining a quality feature based on the bleed through feature. If the captured image is an image of a paper document, and it contains some content from a page that is not in the view (i.e. content printed on the other side of the page), then this would degrade the recognition performance. The content from the other page is referred to here as the bleed through features. Bleed through features can be detected using techniques such as described in "*Restoring Ink Bleed-Through Degraded Document Images Using a Recursive Unsupervised Classification Technique*," P. Rosen, et al. Proceedings of the 6th British Machine Vision Conference, 1995.

The coding artifacts feature module 1910 is software and routines for determining a quality feature based on coding artifacts. Coding and compression artifacts may degrade the recognizability of images. Methods such as described in "*Detection Of Blocking Artifacts Of Compressed Still*

*Images*," Triantafyllidis et al, can be used to form feature vectors from the amount and probability of coding artifacts' presence in the image.

The perspective distortion feature module 1912 is software and routines for determining a quality feature based on perspective distortion. Severe perspective distortion can affect recognizability of the image. There are many methods for detecting and correcting perspective distortion. Correction may be a part of recognition strategy, but detection of such distortions is useful in identifying if an image is recognizable. Perspective distortion can be measured by many methods such as the relative positions of lines and edges in the image, or using the method described in "*Perspective Correction Methods For Camera Based Document Analysis*, by Jagannathan et al, Proc. First Int. Workshop on Camera-based Document Analysis and Recognition, 2005. Features representing the amount or a histogram of perspective distortion can be used in computing a recognizability score.

The camera noise feature module 1914 is software and routines for determining a quality feature based on camera noise. If the camera charge-coupled device (CCD) size is too small, or there is not enough light in the environment, the captured image or video frame may contain noise, such as speckle noise. There are several ways to measure such noise. One method used by the camera noise feature module 1914 is to apply speckle noise reduction with median filtering, take the difference between noise in the reduced image and the original image, and compute some features based on the difference image. For example, the percentage of pixels that is larger than a threshold.

The text quality feature module 1916 is software and routines for determining a quality feature based on the text in images. The text can be measured as text box features, optical character recognition (OCR) features or text line features.

Text box features. Text boxes can be detected in an image such as using a method described in "*Text Detection from Natural Scene Images: Towards A System For Visually Impaired Persons*," N. Ezaki et al. Proc. of 17th Int. Conf. on Pattern Recognition (ICPR 2004), IEEE Computer Society, 2004, pp. 683-686, vol. II, 23-26 August, Cambridge, UK, and a text quality feature module 1916 computes a number of features from text box detection such as: Histogram of text box heights; histogram of text box width/height ratios (nubs); and histogram of text box densities, etc. Histogram of text boxes that are considered good for recognition (good height). For example, text boxes that have less than $\frac{1}{10}^{th}$ of the height of the image and more than $\frac{1}{50}^{th}$ height of the image.

OCR features. Images can be OCR'ed (Optical Character Recognition) and the confidence scores of OCR can be used to form feature vectors.

Text line features. In one embodiment, the text quality feature module 1916 computes text line features by computing line spacing histograms. These features maybe useful especially if the text is blurry and gradient based methods do not provide much information. First graphs from the vertical intensity values (only one pixel wide) are computed, and then the local minimums in each graph are found. Then, the distances between local minimums are computed. These distances correspond roughly the distance between lines. Finally, a histogram is formed with these distances. Histograms of non-document images and document images that contain little text are easily distinguishable since they either have many peaks and the histogram is more uniformly distributed. They also have low peak values. Features extracted from these histograms, such as the number of peaks, N, the height of peaks, $P_i$, are used to form text line feature vectors.

The object detection feature module 1918 is software and routines for determining a quality feature based on the image object. Presence of some objects or shapes such as lines, tables, bulleted items, lists, faces, and buildings affect recognizability depending on the image recognition algorithm. For example, if the image contains mostly tables, the IJ algorithm may not work very well. If the image contains many lines, the BWC algorithm may not work well. In one embodiment, the object detection feature module 1918 can use any one of the following techniques to detect objects in an image: "*Use Of The Hough Transformation To Detect Lines And Curves In Pictures*," R. Duda and P. Hart, Communications of the ACM, Vol. 15, pp 11-15, 1972; "*A Survey Of Table Recognition*," by R Zanibbi, D Blostein, JR Cordy, International Journal on Document Analysis and Recognition, 2004; or "*Face Detection: A Survey*," by E Hjelmas, BK Low, Computer Vision and Image Understanding, 2001 as techniques for object detection in images. The probability of an image containing certain objects, $[P(O_1), \ldots, P(O_i)]$, is a feature vector computed by the object detection feature module 1918.

The recognition algorithm feature module 1920 is software and routines for determining a quality feature based on the differences in recognition algorithms. Entire or part of the feature extraction process (that is part of image recognition algorithm) can be run on the image for measuring its recognizability. For example, if there are not many recognition algorithm specific features extracted, the image can be assigned a low recognizability score. For example, the feature extraction process can be different for each recognition algorithm (such as IJ, BWC, or PC) or share some common components (such as bounding box extraction component in BWC and Syntext coding). For IJ, features extracted from properties of the IJ skeleton, such as the number of junction points, number of regions (holes), histogram of size of regions, and distributions of the regions in the image. In addition, after feature vectors of gradient directions are formed in each junction point, the variations in these feature vectors can be used as a measure of content recognizability. For SIFT, features extracted from detected locations of SIFT features (e.g. via corner detector), as well as SIFT features themselves can be employed as a recognizability measure. For BWC and Syntext, besides word bounding box-based features (mentioned in the "Text Quality Features" section), a full feature vector may be computed. Features such as the number of recognition-specific feature vectors and their spatial distribution can be used as a measure of recognizability. Also, the uniqueness of each feature vector for each recognition algorithm can be measured and used as a measure. For example, in BWC a feature vector of [3 22 22] is very common and a feature vector of [10 67 897] is very unique. TF-IDF (term frequency-inverse document frequency) can be applied to measure the uniqueness of feature vectors. The recognition algorithm feature module 1920 uses any one or combinations of these to produce a feature vector.

The robustness feature module 1922 is software and routines for determining a quality feature based on robustness. The extracted features from an image are robust if they are stable and unaffected by camera distortion from placement, environment and device changes. An input image can be further processed to determine if the extracted features are stable and robust against various camera distortions. For example, for IJ an image can be blurred, tilted, warped (or some other noise simulation can be applied) and the skeleton, feature locations, and feature vectors can be computed again. Then the distance between the feature locations of the input image and those of a distorted image is measured with techniques such as the Hausdorff distance, and the distance between the feature vectors can be measured with techniques such as the Euclidian distance. If a combination (such as a weighted sum or multiplication) of these distances is small, then the image is robust to various camera effects and therefore it has a positive effect on the recognizability score. The distance measures and how these are combined would depend on the recognition algorithm.

Figure 20:
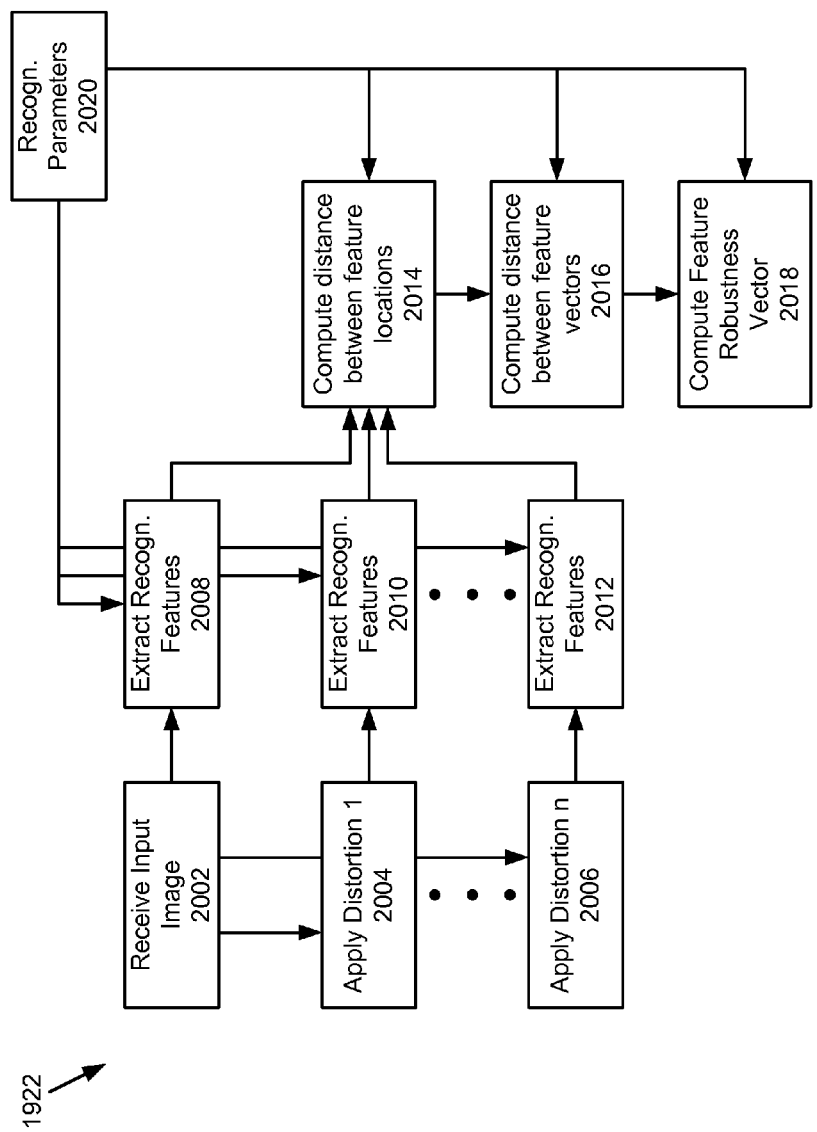
FIG. 20 is a process diagram of a method for generating robustness features in accordance with the present invention.

Referring now also to FIG. 20, a process diagram of a method for generating robustness features such as implemented by the robustness feature module 1922 is shown. The method begins by receiving 2002 an input image. The input image is then processed to extract recognition features 2008 and processed to apply different levels of distortion 2004, 2006. In extracting the recognition features 2008, a set of recognition parameters 2020 such as may be retrieved from the image registration unit 408 or the acquisition unit 406 are used. The recognition parameters 2020 are also provided for the extraction of other features 2010, 2012, computing distances 2014, 2016 and computing the robustness vector 2018. The extracted image features 2008 are provided to model the computed distances between feature locations 2014. Similarly, the received input image 2002 has a first distortion applied 2004, then recognition features are extracted 2010 from the distorted image and the recognition features are provided for the computation of distances between feature locations 2014. This process of receiving the image 2002, applying distortion 2006, extracting features and providing the features is preferably performed for a number of different types of distortion. All the extracted features are then provided to compute 2014 distances between feature locations to produce feature vectors. Then the method computes 2016 the distance between feature vectors. Finally the feature robustness vector 2018 is computed from the distance between the feature vectors.

Figure 21:
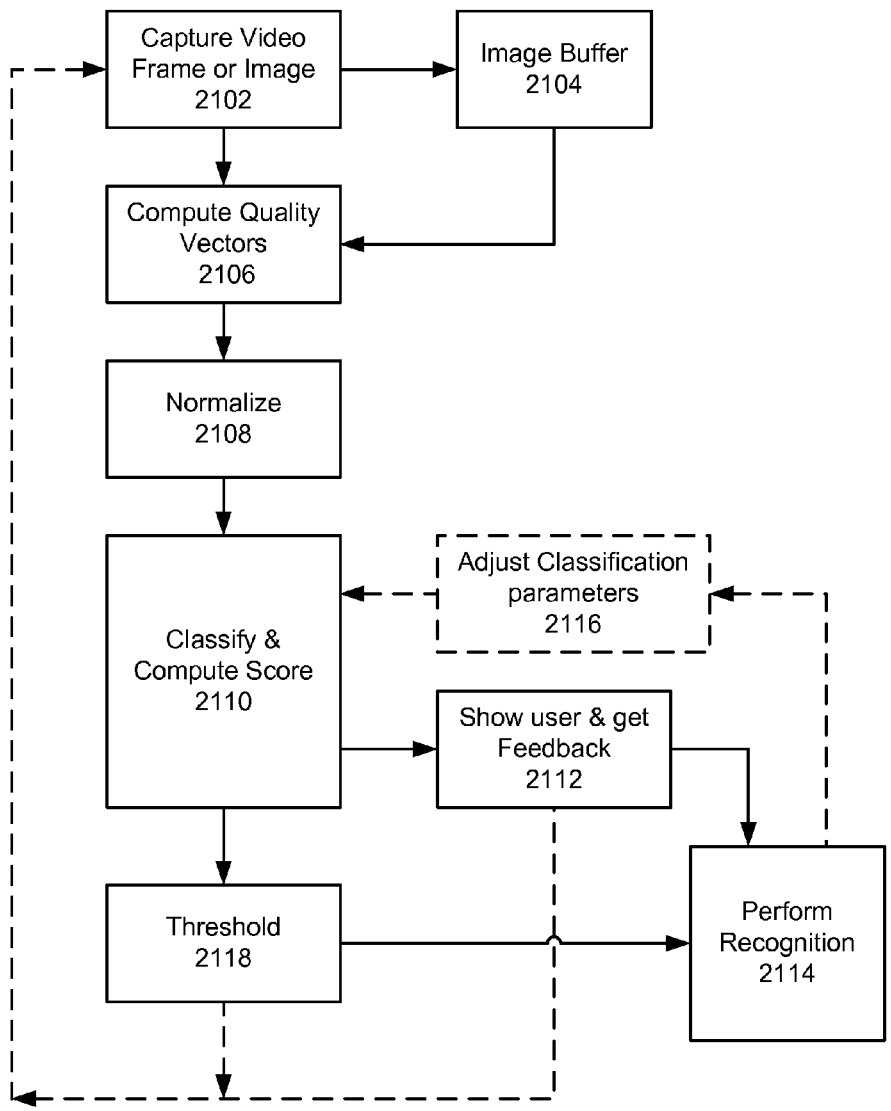
FIG. 21 is a process diagram of a method for generating a recognizability (quality prediction) score in accordance with the present invention.

FIG. 21 is a process diagram of a method for generating a recognizability score in accordance with the present invention. As discussed above, the process begins by capturing 2102 an image or video frame. The captured image can be temporarily stored in an image buffer 2104 or provided directly and immediately for computation 2106 of quality vectors. Some images/video frames can be buffered to be used in quality feature vector computation. As described above for the vector calculator 1804, there are a variety of different features that can be used in calculating the recognizability of the image. Any combination of these features or measurements can be used in predicting recognizability (e.g., generating the recognizability score) of an image using a particular set of recognition algorithms. Each of the modules of the vector calculator 1804 produces feature vectors that represent these measurements. Next, the method normalizes 2108 the feature vectors received from the vector calculator 1804. The normalized vectors are then provided to a module for classifying and computing the recognizability score. The vectors are processed by the classification and scoring module 2110. In one embodiment, the classification and scoring module 2110 is pre-trained with positive and negative image samples and includes a feedback loop 2116 from the recognition unit 410 to adjust the classification parameters. In one embodiment, classification and scoring module 2110 is based on algorithms such as neural networks, naive based classifiers, Bayesian based classifiers, or support vector machine (SVM) based classifiers. These classifiers also output a score, either a probability score or margin of error. In one embodiment, the score is output and used by other components such as the distributor 506 of the dispatcher 402 in determining which recognition unit 410 should be selected to perform 2114 recognition on an input image. In a second embodiment, a threshold is applied 2118 to the score output by the classification of scoring module 2110 and whether a score is above or below the threshold is translated into a Boolean value that can again be used by other components such as distributor 506 of the dispatcher 402 in determining which recognition unit 410 to use for processing.

In another application, such as when the quality predictor 502 is operational as part of a client on the mobile device 102, the score or the score translated into a threshold value can be used to determine whether the received image is of sufficient quality to transmit the captured image from the mobile device 102 on for further processing. In one embodiment, if the recognition score is below a threshold, the recognition score is displayed 2112 to the user along with a request for confirmation that retrieval should be performed on the captured image having the displayed recognition score. In another embodiment, a message is displayed to the user indicating the recognition score and that the score is below a level at which the image can be recognized and therefore the image will not be sent to the MMR Gateway 104. Additionally, the message displayed could request that the user capture another image.

In yet another embodiment, classification (and adjusting classification parameters) is done separately for each algorithm. If quality predictor 502 is used in the dispatcher 402 or prior to indexing, the recognition algorithm that results in the highest recognizability score is selected first in the dispatcher 402 or as indexing algorithm, then the second highest is selected and so on. If quality predictor 502 is used prior to performing retrieval, then the recognizability scores for each algorithm ($R_n$) can be combined in a weighed ($w_n$) sum: Score=$w_1 R_1 + \ldots + w_N R_N$. Weights can be computed based on retrieval time and retrieval accuracy. Weights can also be re-computed on the fly using the retrieval results.

Result Combiner 610

Figure 22:
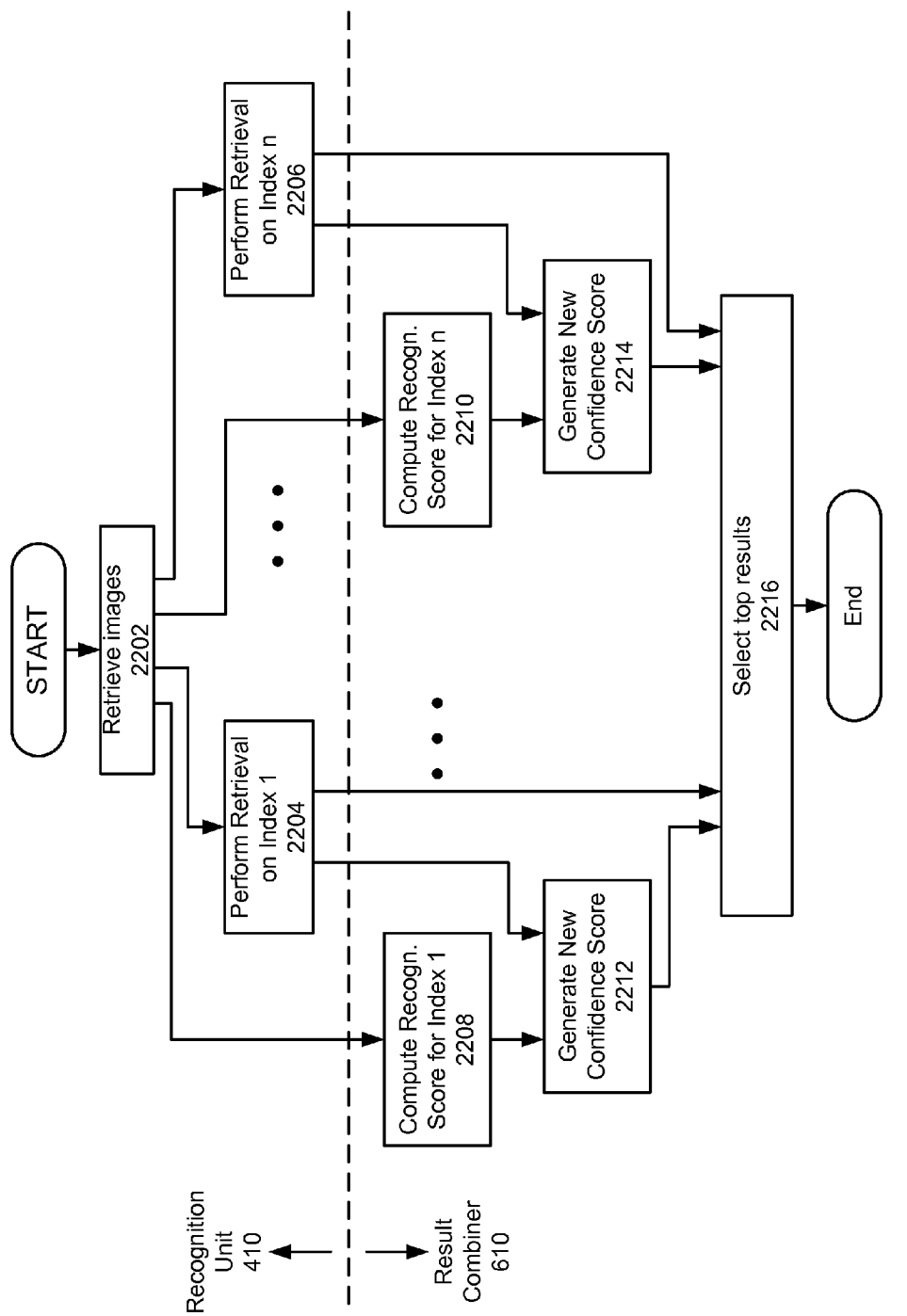
FIG. 22 is a flowchart of a first embodiment of a method for combining a plurality of results using a predictor in accordance with the present invention.
Figure 23:
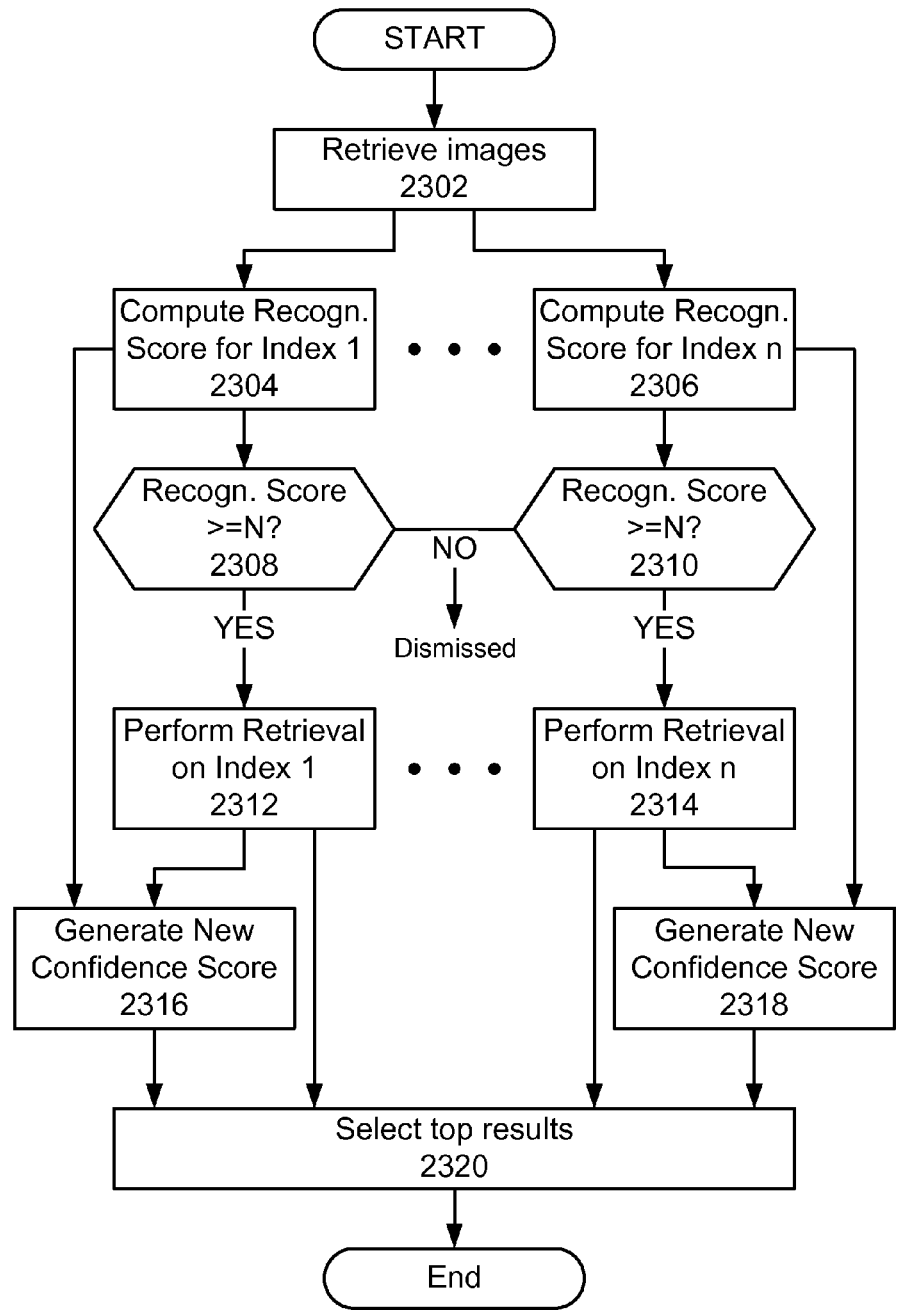
FIG. 23 is a flowchart of a second embodiment of the method for combining a plurality of results using the predictor in accordance with the present invention.
Figure 24:
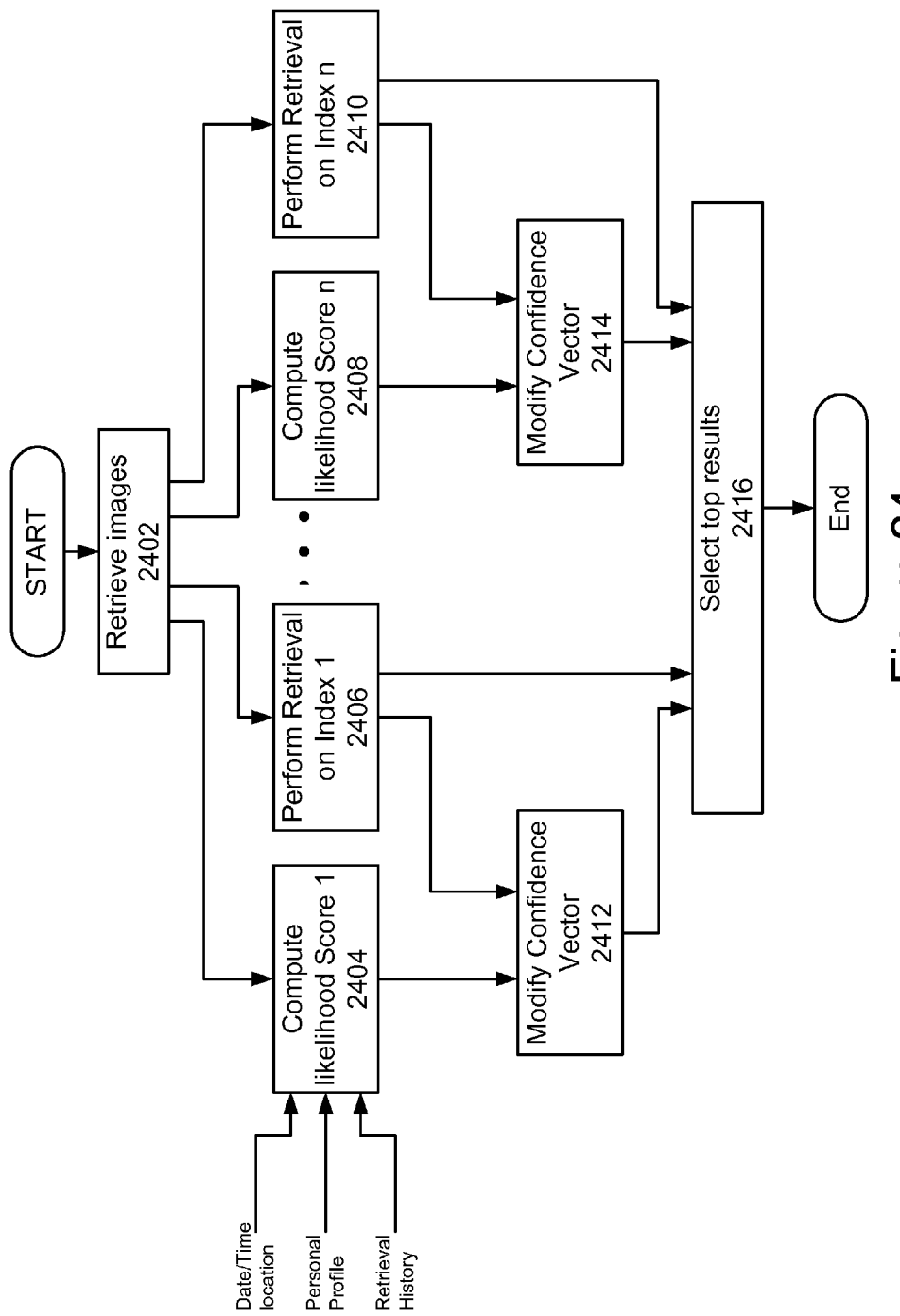
FIG. 24 is a flowchart of an embodiment of a method for combining a plurality of results in accordance with the present invention.

Referring now to FIGS. 22-24 various embodiments of methods for combining results of image-based text retrieval from different image retrieval algorithms is described. FIG. 22 illustrates a first embodiment of a method for combining recognition results using a quality predictor or a recognizability score. FIG. 23 illustrates a second embodiment of a method for combining recognition results using a quality predictor. FIG. 24 illustrates a method for combining a plurality of recognition results (without prediction) in accordance with the present invention.

Referring now to FIG. 22, the first embodiment of a method for combining recognition results using a quality predictor is shown. More particularly, FIG. 22 illustrates processes performed by the result combiner 610 and the recognition unit 410. The processes above the dashed lines are performed by the recognition unit 410 while the processes below the dashed line are performed by the result combiner 610. Given an input image or images (I) and several image recognition algorithms, $A_1 \ldots A_N$, the output of each recognition algorithm is a list of recognition results=$\{R_{1,n}, \ldots, R_{k,n}\}$ (for example top K matched document, page, and location on the page) and confidence values associated with each of these results= $\{C_{1,n} \ldots, C_{k,n}\}$, therefore: $[\vec{C}_n, \vec{R}_n]=A_n(I)$. In addition, prediction algorithms, $P_1 \ldots P_N$ (that compute recognizability given an Algorithm $A_n$), compute a recognizability score based on an input image or images (I), and recognition algorithms, $S_n=P_n (I, A_n)$. The method of the first embodiment determines a result R (that contains information about matched document, such as document id, page, and location on the page) or an ordered result list using the following method.

The process begins by retrieving 2202 images. The retrieved images are used to perform recognition/retrieval 2204, 2206 using a plurality of indices 1 to n. In one embodiment, each recognition algorithm $A_n$ is run to obtain result and confidence vectors for the input image, $[\vec{C}_n, \vec{R}_n] = A_n(I)$. Next, the result combiner 610 computes 2208, 2210 a recognizability score using a plurality of indices 1 to n. The prediction algorithm is run to obtain a recognizability score for each input image and each algorithm, $S_n = P_n(I, A_n)$. These two confidence scores are used to compute 2212, 2214 a new confidence score $\vec{C'}_n$. For example, a new confidence score $\vec{C'}_n$ is computed based on $\vec{C}_n$ and $S_n$, $\vec{C'}_n = f(\vec{C}_n, S_n)$ for each algorithm $A_n$. Finally, the top results based on the new confidence scores are selected 2216 and output. In one embodiment, this is performed by merging and sorting $\vec{R}_1, \ldots, \vec{R}_N$, based on their corresponding confidence values $\vec{C'}_1, \ldots, \vec{C'}_N$, resulting $\vec{R}_s$. Then the method outputs the top L results of $\vec{R}_s$. L can be any integer greater that one.

Referring now to FIG. 23, the second embodiment of a method for combining recognition results using a quality predictor is shown. Unlike the first embodiment, different steps of the method of FIG. 23 are performed by components of the MMR matching unit 106. The method begins by receiving 2302 images. These images are then used compute 2304, 2306 recognizability scores for a plurality of indexes one to n. In other words, the prediction algorithm is run to obtain a recognizability score for each input image and each algorithm, $S_n = P_n(I, A_n)$. Next, the method determines 2308, 2310 whether the corresponding recognizability score is greater than a predefined threshold. If not, the received images are dismissed and no additional computations are performed. On the other hand, if the recognizability score is greater than the predefined threshold, the method continues to perform recognition/retrieval 2312, 2314 using indexes one to n. For example, each recognition algorithm $A_n$ is run to obtain result and confidence vectors for the input image, $[\vec{C}_n, \vec{R}_n] = A_n(I)$. Then a new confidence score is generated 2316, 2318 for each index one to n. The new confidence score $\vec{C'}_n$ is computed based on $\vec{C}_n$ and $S_n$, $\vec{C'}_n = f(\vec{C}_n, S_n)$. Finally, the top results are selected 2320 and output. In one embodiment, $\vec{R}_1, \ldots, \vec{R}_n$ are merged and sorted based on their corresponding confidence values $\vec{C'}_1, \ldots, \vec{C'}_n$, resulting in $\vec{R}_S$, and then the top L results of are output.

In an alternate embodiment, the processes described above with reference to FIGS. 22 and 23 are modified slightly as follows. The recognition results, confidence scores and modify or new confidence scores are produced in a similar manner. Specifically, the prediction algorithm is run to obtain recognizability score for input image and each algorithm, $S_n = P_n(I, A_n)$. The recognition algorithm $A_n$ is run to obtain result and confidence vectors for the input image, $[\vec{C}_n, \vec{R}_n] = A_n(I)$, only if the corresponding prediction score $S_n$ is higher than a threshold. (We assume that $\vec{R}_n$ is sorted based on the confidence scores, therefore $R_{1,n}$ is the best guess for the matching result. Note that some algorithms may not output any result because of their internal threshold). However, rather than just merging and sorting the top recognition results as in the method described above, this alternate embodiment uses the top results from each algorithm $(R_{1,1}, \ldots, R_{1,N})$ for voting for the best result. The votes can be counted based on document id, (docid+pageid), or (docid+pageid+patch location). Patch locations (x,y) do not exactly need to be the same, a proximity measure can be used for giving votes to each document patch location. The method then output the result that receives the most votes.

Furthermore, if there is a tie between results, one of the following methods can be used to output a result: a) Sum the confidence values $C_{1,n}$ of the tied groups of results and output the result corresponding to the highest confidence summation; b) Compute modified confidence scores $C'_{1,n} = f(C_{1,n}, S_n)$. Sum the modified confidence values $C'_{1,n}$ of the tied groups of results and output the result corresponding to the highest confidence summation; c) Sum the prediction score $S_n$ of the tied groups of results and output the result corresponding to the highest prediction score summation; d) Output the result $R_{1,n}$ of the algorithm that produced the highest confidence score $C_{1,n}$ or the highest modified confidence score $C'_{1,n}$; e) Output the result $R_{1,n}$ of the algorithm that produced the highest prediction score $S_n$; or f) Pre-determine the order of algorithms to output (based on their previously measured accuracy). For example, first IJ, then snake coding, etc.

FIG. 24 illustrates a method for combining a plurality of recognition results (without prediction) in accordance with the present invention. The process begins by retrieving 2402 images. The retrieved images are used to perform recognition/retrieval 2206, 2208 using a plurality of indices 1 to n. In one embodiment, each recognition algorithm $A_n$ is run to obtain result (if any) and confidence vectors for the input image, $[\vec{C}_n, \vec{R}n] = A_n(I)$. (We assume that $\vec{R}_n$ is sorted based on the confidence scores, therefore $R_{1,n}$ is the best guess for the matching result. Note that some algorithms may not output any result because of their internal threshold). Next, a prediction algorithm is run 2404, 2408 to obtain a likelihood score for input image and each algorithm, $S_n = P_n(I, A_n)$. The likelihood score as receives and uses the date, time location, personal profile, retrieval history and other context and metadata to generate the likelihood score, $O_n$. The confidence score and the likelihood score are used to compute 2412, 2414 a modified confidence score. For example, a modified confidence score $\vec{C'}_n$ is computed based on $\vec{C'}_n = f(O_n, \vec{C}_n)$ for each algorithm $A_n$. Finally, the top results based on the new confidence scores are selected 2216 and output. In one embodiment, this is performed by merging and sorting $\vec{R}_1, \ldots, \vec{R}_n$ based on their corresponding confidence values $\vec{C'}_1, \ldots, \vec{C'}_n$, resulting $\vec{R}_S$ Then the method outputs top L results of L can be any integer greater that one. In a second embodiment, the top results from each algorithm are determined by voting. The top $L_n$ results from each algorithm $(\{R_{1,1}, \ldots, R_{L_1,1}\}, \ldots, \{R_{1,N}, \ldots, R_{L_N,N}\})$ is used to vote (with weights) for the best result. $L_n$ depends on the algorithm. For example IJ may output only one result, i.e. $L_n = 1$, and BWC may output its top 10 results, $L_n = 10$. If $L_n$ is set to 1 for all algorithms, only the top result from each algorithm votes for the result. In one embodiment, the voting weights are based on confidence scores corresponding to each result, 1/(rank in retrieval), or some other measure. The voting scheme and weights can also be trained using a boosting algorithm such as "*A Short Introduction To Boosting*," by Freund, Y. and Schapire, R., J. Japanese Society of Artificial Intelligence, v. 14, no. 5, pp. 771-780, 1999. Further, if there is a tie, one of the following methods can be used to output a result: a) Sum the confidence values of the tied groups of results and output the result corresponding to the highest confidence summation; b) Output the result $R_{1,n}$ of the algorithm that produced the highest confidence score; c) Pre-determine the order of algorithms to output (based on their previously measured accuracy). For example, first IJ, then snake coding etc.

In other embodiments, a classifier (such as neural networks, naive based classifiers, Bayesian based classifiers, SVM based classifiers) can be trained with any combination of the confidence scores of retrieved algorithms, retrieval results, recognizability score or likelihood score S., and/or any combination of features used for computing recognizability score. At retrieval time, the computed scores and features for the input image/images are input to the trained classifier to obtain the recognition result and a confidence score (which might be based on margin of error, probability of the classification etc).

In addition to the embodiment described above, the location and region of the retrieved page may be reconciled among a plurality of recognition results. Once a document, page, and approximate patch location is identified, the method computes the exact location of the patch. Different algorithms may produce different location results. Algorithms may not produce any "location on the page" information, may produce only x,y coordinates, x,y coordinates and width and height, $(x_1,y_1,x_2,y_2)$ coordinates that are not rectangular, or some arbitrarily shaped region defined by a polygon, a closed curve, etc. A final retrieved region or x,y center can be found by assigning priority to algorithms $A_n$ that is based on their accuracy and output the retrieved region based on this priority. Alternatively, in one embodiment, the method finds the retrieved location (x,y) on the page by averaging the mass centers of the retrieved regions, or an x, y location that minimizes the Hausdorff distance to all the edges of the closed regions. The retrieved region on the page is determined by finding a region defined by a rectangle, a polygon (etc.) that minimizes the total overlap error in the retrieved regions.

Dynamic Presentation of Targeted Information

Figure 25:
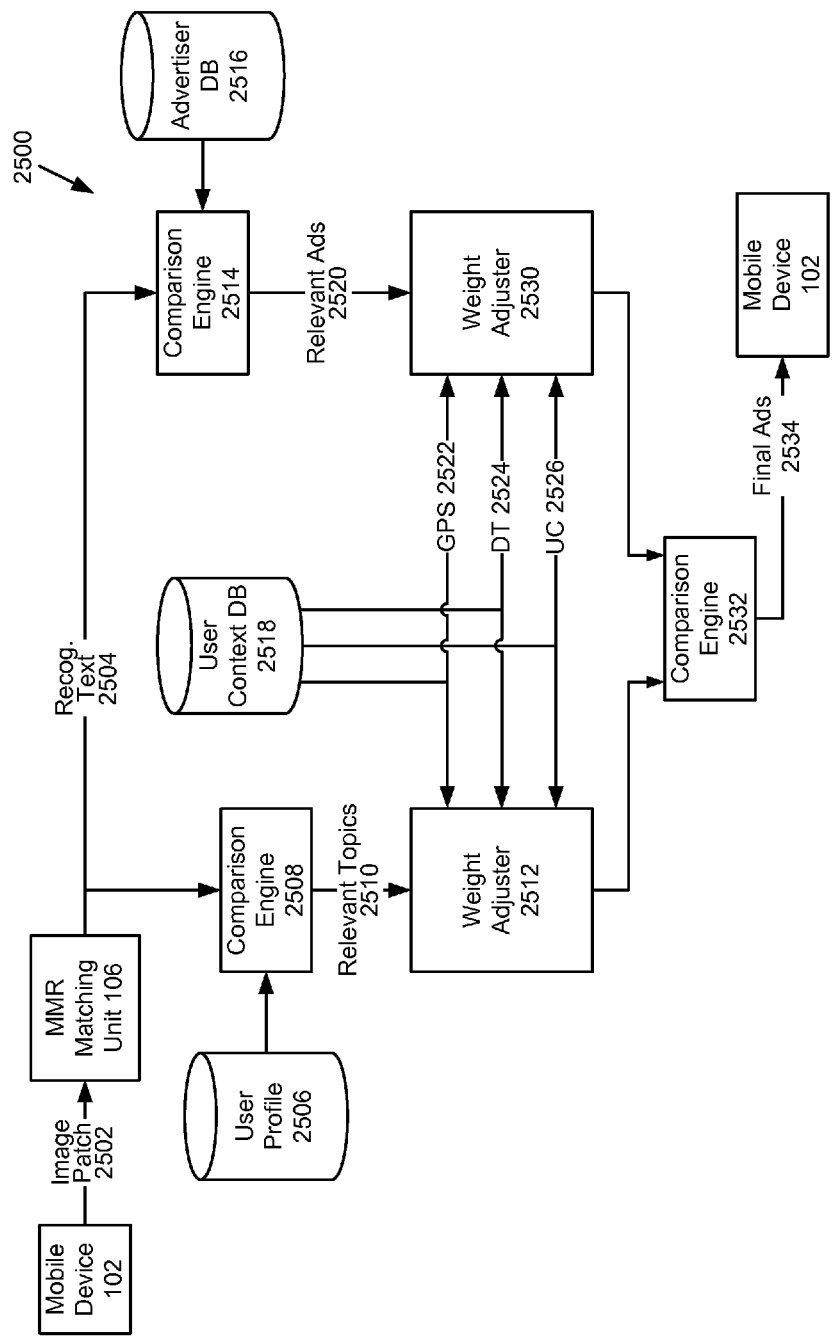
FIG. 25 is a flow diagram of an embodiment of a system for dynamic presentation of targeted information in a MMR system in accordance with the present invention.

FIG. 25 is a flow diagram of an embodiment of a system 2500 for dynamic presentation of targeted information in accordance with the present invention. The present invention will now be discussed in a context in which the targeted information is primarily advertising content, but those skilled in the art will recognize the targeted information may be any type of information and advertising content is merely used by way of example. In one embodiment, the context-aware targeted information delivery system 2500 comprises a mobile device 102, the MMR matching unit 106, a first database 2506 for user profiles, a second database 2516 for advertising information, a third database 2518 for user context, a first comparison engine 2508, a second comparison engine 2514, a third comparison engine 2532, a first weight adjuster 2512 and a second weight adjuster 2530.

While this embodiment is described as having a plurality of databases 2506, 2516 and 2518, those skilled in the art will recognize that in an alternate embodiment, the system 2500 includes a single database that provides the content necessary for operation of the context-aware targeted information delivery system 2500. Similarly, this embodiment is described as having a plurality of comparison engines 2508, 2514 and 2532, however, in an alternate embodiment, the system 2500 includes a single comparison engine that performs the comparisons that will be described below of the first comparison engine 2508, the second comparison engine 2514 and the third comparison engine 2532 but in a serial manner. Finally, this embodiment is described as having a plurality of weight adjusters 2512 and 2530. In an alternate embodiment, the system 2500 includes a single weight adjuster that is re-used to perform the operations of the first weight adjuster 2512 and the second weight adjuster 2530. Moreover, in yet another embodiment, those skilled in the art will recognize other configurations for the present invention having any number of databases, comparison engines and weight adjusters greater than one.

The context-aware targeted information delivery system 2500 utilizes user profile information, document context, mobile proximity and previous recognition results to produce a set of targeted advertisements that are sent or displayed to the user. The user (e.g., MMR user) of the mobile device 102 has profile information about characteristics of the user and information about the user's interests called topics of interest. Recognizing the location on the page (i.e. the text patch) that the user is capturing with the mobile device 102 is analogous to hovering with the electronic lens over a portion of an electronic document. The portion of the document recognized thus provides a document context including the text associated with that text patch, the surrounding text (text in proximity to the target location) and the previous targets the user hovered over (provides context). In particular, the context-aware targeted information delivery system 2500 performs a complex match with a targeted advertisement generator to produce advertisements that are relevant to the user's experience when interacting with the paper document. Example information provided as inputs to the system include: Patch image; recognized doc ID, X, Y, width & height (location on the page);recognized text from the patch image & surrounding text; image features such as whether it contains text or an image; surrounding hotspot information; GPS or physical location where the image was captured; Time of day and time of year when the image was captured (lunch time; Christmas); History of previous matches or even what other images were taken before the latest one; User profile including interests like topics and User context. In one embodiment, the system 2500 also constantly gathers user interaction data (UID) thereby creating an evolving context used to influence the outcome of the production of the targeted advertisements. This kind of information is, over time, used to search for trends, like whether users frequent areas/locations often and when they are there, e.g. in "San Carlos" at lunch time and in the evening. Trend information improves the production of relevant ads since, as in the above example, the user is typically in "San Carlos" at lunch time, "restaurant" ads may have a greater weight during a short period of time between 12 pm & 1:30 pm.

Referring now to FIG. 25, the context-aware targeted information delivery system 2500 will be described in more detail. The mobile device 102 is used to capture an image patch 2502 as has been described above. The mobile device 102 is coupled to the MMR matching unit 106 to deliver the image patch 2502. In one embodiment, the mobile device 102 sends the image patch 2502 to the MMR matching unit 106. In another embodiment, the mobile device 102 performs some amount of preprocessing, and sends, for example, image features to the MMR matching unit 106. In yet another embodiment, the mobile device 102 also captures context information such as the physical location where the user captured the image such as determined by a GPS signal, and the time of day and time of year when the image was captured (e.g., lunch time; Christmas). The mobile device 102 is coupled to the third database to provide this information and store it in the third database 2518 for later use.

The MMR matching unit 106 performs recognition on the image patch or image features to produce recognized text 2504. The MMR matching unit 106 performs recognition in any of the variety of methods described above. Although not shown in FIG. 25, those skilled in the art will recognize that the MMR matching unit 106 is coupled to or includes a source document database (MMR database 254) as well as a hot spot database 404 to which the image patch 2502 or image features can be compared. In one embodiment, words in the recognized text 2504 come with proximity weights already assigned since the proximity assessment is performed when the recognized text 2504 is retrieved. In another embodiment, the recognized text 2504 includes the recognized text corresponding to the image patch as well as proximate text information of text surrounding the recognized text, associated hotspot information, and other information related to the recognition process. In other words, by recognizing the location on the page (i.e. the text patch) where the user is hovering with the electronic lens effectively formed by the camera of the mobile device 102, the system 2500 determines the text associated with that image patch, the surrounding text (text in proximity to the target location as will be described in more detail below), and the previous targets over which the user hovered (provides context). Still more specifically, in one embodiment, the recognized text 2504 includes recognized doc ID, X, Y, width & height (location the page);recognized text from the patch image & surrounding text; image features such as whether it contains text or an image; surrounding hotspot information. In yet another embodiment, the original image patch is also stored such in the third database 2518 for later use. The output of the MMR matching unit 106 is coupled to an input of the first comparison engine 2508 and an input of the second comparison engine 2514 to provide the recognized text 2504.

In an alternate embodiment, MMR Matching Unit 106 produces recognized text 2504 that is a list of words composed as category: descriptor 1, . . . , descriptorN. For an image patch 2502, the category describes the content of the image and the descriptors are further details about that category. For example, if 2502 is a photo of the San Francisco Giants baseball field, the category would be PLACE and descriptor1 would be "Baseball" and descriptor2 would be "Field." Other examples of categories include PERSON, THING, VIDEO, TEXT, BAR CODE, and URL. Categories and Descriptors can be generated with manual settings on the Mobile Device 102 such as those that are often provided for "portrait" or "landscape" photos, etc. Or, Categories and Descriptors can be derived by automatic analysis of the captured image. In this embodiment the comparison engines 2508 and 2514 are configured to compare the descriptors of an input image to categories and descriptors of objects in the databases 2506 and 2514. In our example, this would retrieve topics 2506 related to baseball and advertisements 2516 related to baseball, such as those provided by Major League Baseball, a baseball glove company, etc.

The first database 2506 stores a number of user profiles. For example, for each user the first database 2506 includes a profile that contains information about the user's interests called topics of interest. The user profile also includes other information about the user such as age, gender, residence, citizenship, or other information about the user.

The first comparison engine 2508 receives user profile information from the first database 2506 in addition to the recognized text 2504. The first comparison engine 2508 uses the recognized text 2504 and the user profile information to produce a list of relevant topics 2510. More specifically, the user of the mobile device 102 is identified using the MMR matching unit or the MMR Gateway 104. This information is used in turn to identify a specific user profile from the first database 2506. By comparing the user profile and the recognized text 2504, the list of topics of interest is narrowed for more targeted information about the paper document being captured by the mobile device 102.

The second database 2516 is a database of targeted information such as advertising information. In one embodiment, the advertising information includes advertisements themselves, keywords associated with the advertisements, and text associated with the advertisements. In one embodiment, category names and descriptors are associated with advertisements. This provides a means of finer targeting of advertisements. For example, an advertisement for Major League Baseball (MLB), that might be composed of an image of the MLB logo and a link to a website for purchasing game tickets, would be assigned CATEGORY=baseball and DESCRIPTORS=today's date, "URL for purchasing tickets".

The second comparison engine 2514 is coupled to the MMR matching unit 106 to receive the recognized text 2504. The second comparison engine 2514 is also coupled to the second database 2516 to receive advertising information. The second comparison engine 2514 receives the recognized text 2504 from the MMR matching unit 106 and advertising information from the second database 2516; and produces a list of relevant ads 2520. In one embodiment, the second comparison engine 2514 compares keywords in the recognized text 2504 to the second database 2516 to produce a set of relevant ads 2520 associated with the recognized text 2504. The set of relevant ads 2520 is the pool of advertisements that are used by the system 2500 to sample for the remainder of the processes.

The third database 2518 is a database storing user context information. Such user context information includes the location at which the image is captured, the time of day at which the image was captured and the day of the year that the image was captured as has been described above. The user context information also includes a user history including previous matches or even other images that were captured before the current image. In yet another embodiment, the user context information includes user interaction data (UID) that the system 2500 has gathered in a background process thereby creating an evolving context used to influence the targeted delivery of information. It should be noted that the system 2500 gathers and stores this kind of information over time. It is then used to search for trends, like whether users frequent areas/locations often and when they are there, e.g. in "San Carlos" at lunch time and in the evening. The trend information improves the production of relevant targeted information or ads since, as in the above example, the user is typically in "San Carlos" at lunch time, "restaurant" ads may have a greater weight during a short period of time between 12 & 1:30.

The first weight adjuster 2512 is coupled to the output of the first comparison engine 2508 to receive the relevant topics 2510. The first weight adjuster 2512 also has inputs coupled to the output of the third database 2518 to receive user context information. For example, a first signal line couples the first weight adjuster 2512 to the third database 2518 to receive location information (GPS) 2522; a second signal line couples the first weight adjuster 2512 to the third database 2518 to receive date and time information (DT) 2524; and a third signal line couples the first weight adjuster 2512 to the database 2518 to receive user context information (UC) 2526. In other embodiments, a single signal line couples the third database 2518 to the first weight adjuster 2512 to provide the above information. The first weight adjuster 2512 modifies the weightings of the relevant topics 2510 and provides the weight-adjusted relevant topics to the third comparison engine 2532. In particular, the first weight adjuster 2512 compares the current location, as derived from a GPS signal provided by the mobile device 102, to locations associated with the relevant topics 2510. In one embodiment this is a proximity search where the first weight adjuster 2512 searches for ads with location characteristics similar to those of the current location. If any relevant topics 2510 are found, the first weight adjuster 2512 increases the weight of each topic that has such features. The first weight adjuster 2512 also compares the time and date at which the image was captured with the list of relevant topics 2510. This is a time search where the first adjuster 2512 searches for topics having a timeliness aspect. If any topics are found with matching (or approximate matching) timeliness features, the first weight adjuster 2512 modifies or increases the weight of each such topic. Finally, the first weight adjuster 2512 compares the user's context, UC 2526, with the relevant topics 2510 to determine whether any features might overlap. More specifically, the first weight adjuster 2512 determines if the content such as text, hotspots or topics (the content the user has been looking at) are related in any way to the topics in the list of relevant topics 2510. If similarities are found, the first weight adjuster 2512 increases the context weight of each topic in the list of relevant topics 2510 that satisfies these criteria. Once the weights of the relevant topics 2510 have been modified, the first weight adjuster 2512 outputs the weighted relevant topics to the third comparison engine 2532.

The second weight adjuster 2530 is coupled to the output of the second comparison engine 2514 to receive the relevant ads 2520. The second weight adjuster 2530 also has inputs coupled to the output of the third database 2518 to receive user context information. In particular in one embodiment, a first signal line couples the second weight adjuster 2530 to the third database 2518 to receive location information (GPS) 2522; a second signal line couples the second weight adjuster 2530 to the third database 2518 to receive date and time information (DT) 2524; and a third signal line couples the second weight adjuster 2530 to the database 2518 to receive user context information (UC) 2526. In other embodiments, a single signal line couples the third database 2518 to the second weight adjuster 2530 to provide the above information. The second weight adjuster 2530 modifies the weightings of the relevant ads 2520 and provides the weight-adjusted relevant ads to the third comparison engine 2532. The second weight adjuster 2530 compares the current location of the mobile device 102 to the relevant ads 2520. Again, this is a proximity search in which the second weight adjuster 2530 searches for ads with particular location characteristics. If found, the second weight adjuster 2530 increases the weight of the ads with such location characteristics, e.g. a restaurant or gas station or coffee shop, if the phone is within X miles of the address. The second weight adjuster 2530 also compares the time and data which the image was captured with the list of relevant ads 2520. This is a time search where the second adjuster 2530 searches for ads that have a timeliness aspect to them, e.g., Christmas sale or lunch special. If any ads are found with matching (or approximate matches) timeliness features, the second weight adjuster 2530 modifies or increases the weight of each such advertisement. Finally, the second weight adjuster 2530 compares the user's context UC 2526 with the relevant ads 2520 to determine whether any features might overlap. More specifically, the second weight adjuster 2530 determines if the content such as text, hotspots or topics (the content the user has been looking at) are related in any way to the ads in the list of relevant ads 2520. If similarities are found, the second weight adjuster 2530 increases the context weight of each ad in the list of relevant ads 2520 that satisfies these criteria. For example, a context item from a scenario described below is the viewing of an article about the WhooHoo company. In this case, the user either successfully performed a search/match of a text patch that was associated with an article about WhooHoo or he looked at a hotspot in such an area. In either case the user was "interested" in the article and the interest was recorded as part of the user's history. Once the weights of the relevant ads 2520 have been modified, the second weight adjuster 2530 outputs the weighted relevant topics to the third comparison engine 2532.

The third comparison engine 2532 compares the weighted relevant topics and weighted relevant ads to produce a set of final ads 2534 that are most related to the topics of interest for the user. The third comparison engine 2532 is coupled to the output of the first weight adjuster 2512 in the output of the second weight adjuster 2530. In one embodiment, the location, date, time and user context weights supplement the comparison performed by the third comparison engine 2532 and possibly tip the balance towards an ad that is in the context with the surroundings, time of year or a previous context. If no match is found between the weighted relevant topics in the weighted relevant ads, the context weights are used to determine the best ad by adding up the weight values and using the ads with the highest scores. These final ads 2534 are delivered for display on to the mobile device 102. Furthermore, the final results can also be logged into the third database 2518 to record the context for future use.

In one embodiment, the components described above are implemented as described in related U.S. patent application Ser. No. 11/327,087, titled "Method, System And Computer Code For Content Based Web Advertising," filed Jan. 5, 2006 which is incorporated by reference herein in its entirety.

User Interface and Example

Figure 26:
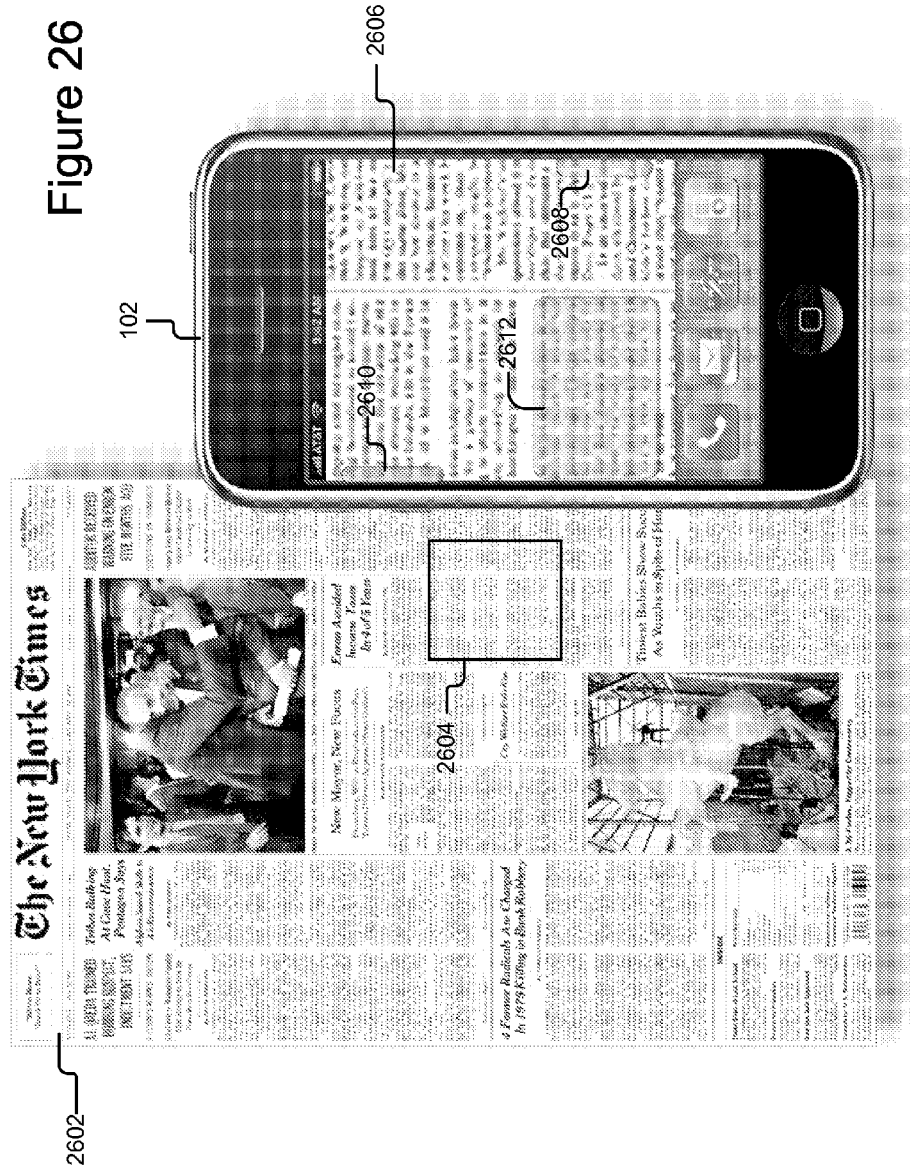
FIG. 26 is a graphic representation of a document and a mobile device showing one embodiment of an interface for dynamic presentation of targeted information in accordance with the present invention.

As example, imagine we have a person named "Fred" who is a business person who frequently uses his mobile device 102 for phone calls, email, scheduling and browsing the web. Fred is also an avid fan of the San Francisco Giants baseball team. Today Fred is reading the New York Times Business section. While reading an article on Apple Computer's new products, he decides he would like to see the products and possibly watch a video on how they are used along with their potential impact on the consumer electronics industry. Fred pulls out his mobile device 102 and starts scanning the document with his application for the dynamic presentation of targeted information enabled. The application captures images from the paper newspaper, processes them and displays the results. Fred is effectively using the mobile device 102 to hover over a printed page of the news paper and use the mobile device 102 as a lens that captures an area of focus on the printed page. Looking at the newspaper through the camera preview window on the mobile device 102 shows electronic information not visible on the raw paper newspaper page. Some of these items are called Hotspots. Hotspots are authored hyperlinks to electronic content and they typically are relevant only to the story they appear near. The Hotspots available on the mobile device 102 offer not only instant information related to a patch of text in a document but also supplemental information for performing advanced advertising analysis. In this scenario the additional information provided by the content of the Hotspot was not needed or not used. The other items in the lens are dynamically produced advertisements. A set of ads was returned when the image patch was recognized. Both ads are relevant to the content of the page, the user's interests and the context of the MMR session. These ads are relevant not only to the content of the newspaper page but also to what Fred is either interested in or articles he recently read or selected with his MMR application. Referring now to FIG. 26, the paper document 2602 and the mobile device 102 showing one embodiment of an interface 2606 for dynamic presentation of targeted information consistent with the example above are shown. The paper document 2602 is a page of a newspaper. FIG. 26 shows a portion 2604 of the newspaper page that is captured by the camera of the mobile device 102. The user interface 2606 generated in accordance with the present invention is a window showing an electronic version of the text corresponding to the portion 2604 of the newspaper page. For example, the window shows the image patch captured by the camera that is sent to the MMR matching unit 106. The present invention advantageously generates a plurality of visually distinctive markers 2610, 2612 and 2608. Each of the markers 2610, 2612 and 2608 has a shape and color associated with its function so that the user can easily distinguish between this hotspots and advertisements. Each of the markers 2610, 2612 and 2608 is also a selectable button that the user can toggle to expand and access additional information. In this embodiment, the hotspot data is represented by marker 2612 formed as a blue rectangular highlight over the text with which the hotspot is associated. The advertisements are represented by markers 2608, 2610 about the periphery of the window. The position of the markers 2608, 2610 is as close as possible to the text in the window with which the advertisements are associated. The markers 2608, 2610 have a thin rectangular shape and a green in color so that they are easily distinguishable from the hotspot marker 2612. Those skilled in the art will recognize that the sheets and colors used in these figures is only by way of example, and that a variety of other shapes and colors may be alternatively used.

Figure 27:
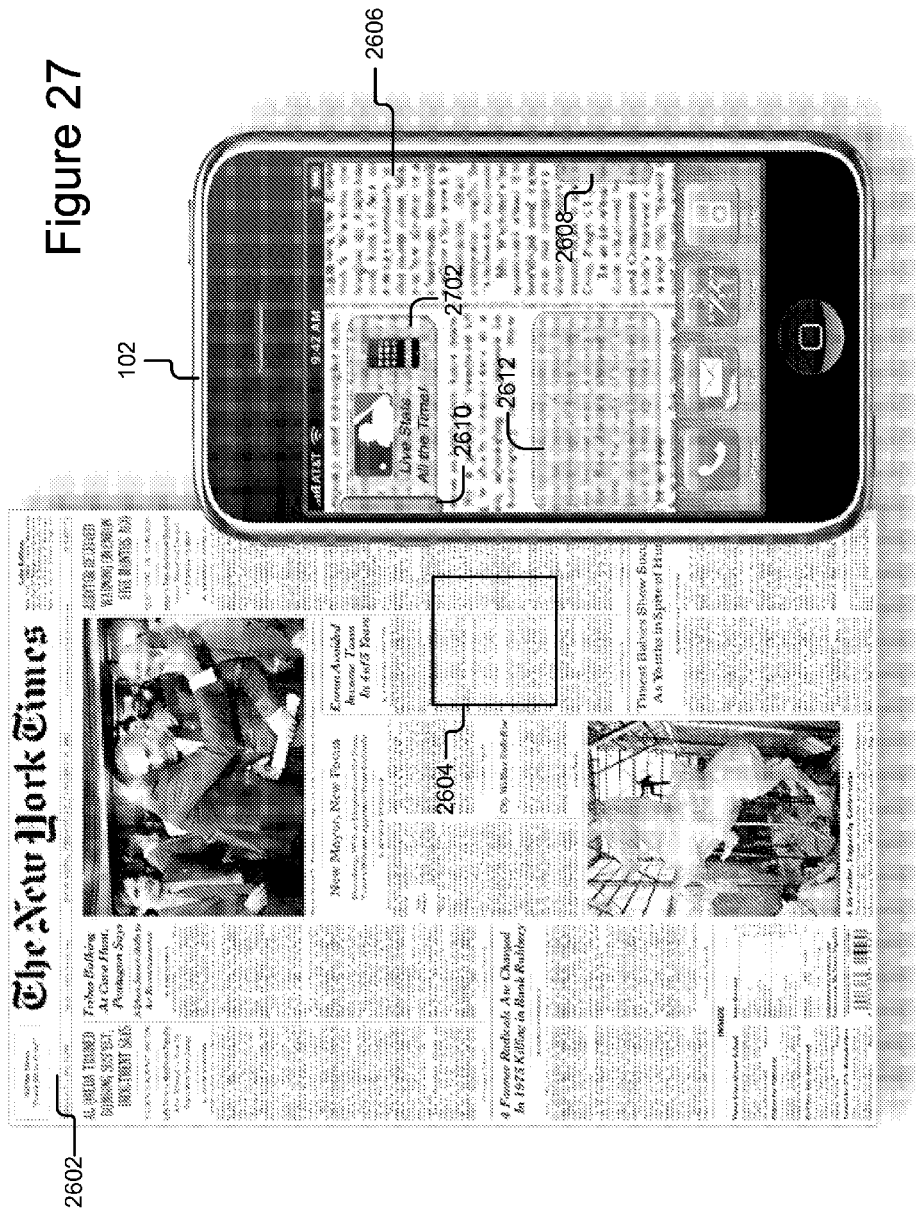
FIG. 27 is a graphic representation of a document and a mobile device showing one embodiment of the interface for dynamic presentation showing a first advertisement in accordance with the present invention.

Even though Fred's original intention was to view Hotspot data about the Apple products, the advertisements that appears on the mobile device 102 gave Fred a few more choices. The first ad was about the new baseball tracking software available for the mobile device 102, for example an Apple iPhone. This software provides instantaneous updates during all baseball games across the country; a must for the October portion of the Major League baseball season. The fact that it runs on an iPhone is even better because, while Fred is a fan of Apple products, he also happens to own an iPhone. This ad was selected by the system 2500 because a) Fred likes baseball (i.e., he has information in his profile which names baseball and, specifically, the SF Giants, as his favorite team) b) he enjoys Apple products (again, in his profile) and c) he is an iPhone user. In this case, the system 2500 locates this ad based on page content and user profile. Referring now to FIG. 27, the document 2602 and the mobile device 102 showing one embodiment of the interface 2606 for dynamic presentation are again shown. However, FIG. 27 shows how the interface 2606 is modified after the user has selected the advertising marker 2610. In particular, the interface 2606 is updated to present a first advertisement 2702. The first advertisement 2702 is shown in an extended window that expands to the right of marker 2610. This expansion functionality is particularly advantageous because when the first advertisement 2702 is closed, a minimal amount of screen space is occupied, and presentation of the first advertisement 2702 attracts the users the user's attention when it pops out from the side. In this embodiment, the extended window is the same color as the marker 2610 with a slightly smaller height than the marker 2610. The first advertisement 2702 includes information about the software for sale. As illustrated, in addition to having text, the first advertisement includes graphics and can even include additional control structures such as buttons to order the advertised item.

Figure 28:
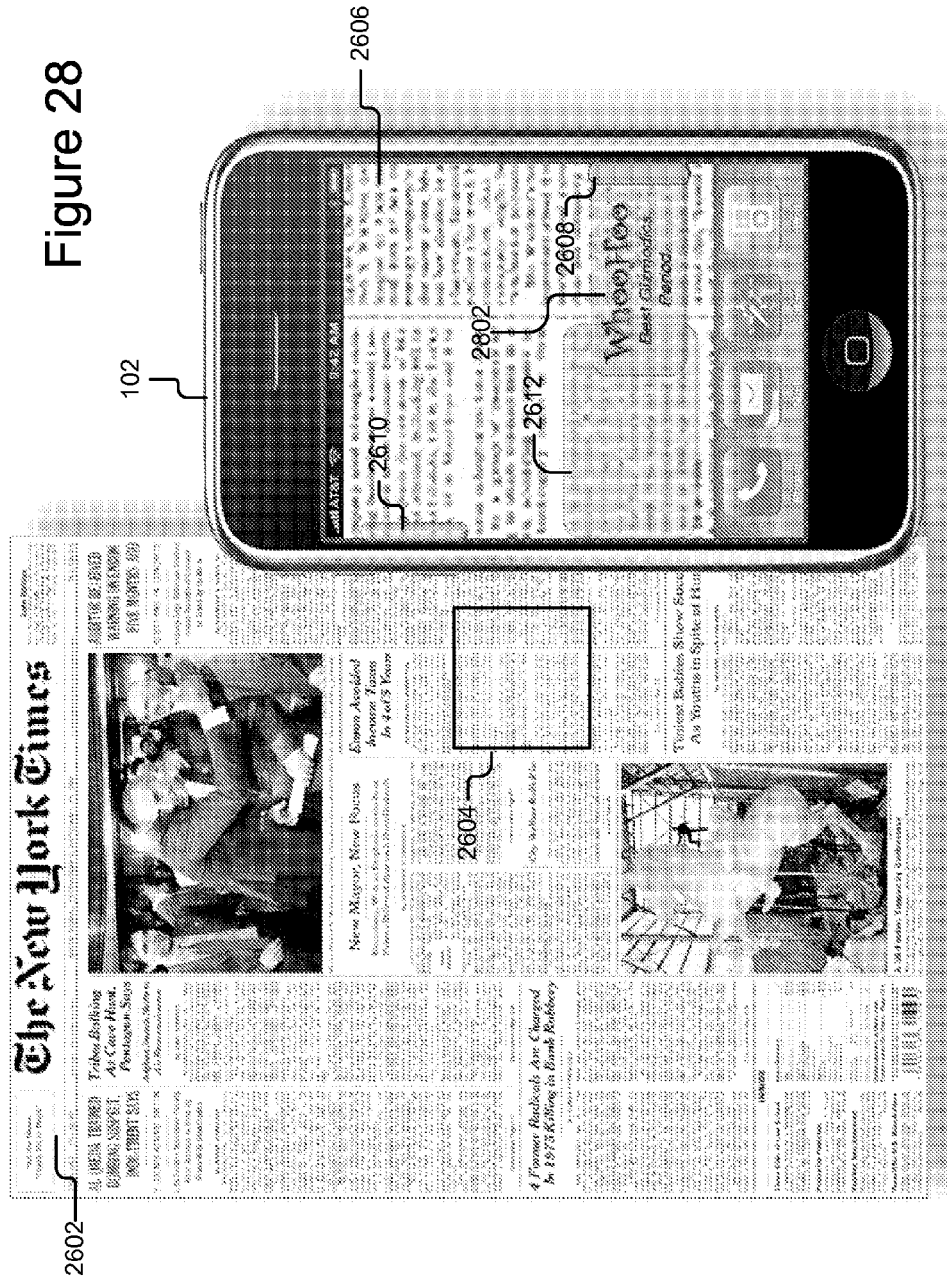
FIG. 28 is a graphic representation of a document and a mobile device showing one embodiment of the interface for dynamic presentation showing a second advertisement in accordance with the present invention.

The second ad represented by marker 2608 is about a company called WhooHoo Tech, a startup with advanced gizmodicts. Microsoft and Apple have recently expressed interest in acquiring the company. Earlier while reading the newspaper, Fred had scanned the article on WhooHoo Tech with his MMR application and he also viewed their web site using his mobile device. The second ad requires a bit more information. Not only was the selection of this ad based on the content on the page (it's about Apple) and in Fred's profile (he likes Apple) but also on his history with the MMR application. The fact that he earlier in the day retrieved information about the WhooHoo company made that information a part of his current context. A second competing ad on Apple's upcoming product launch would have been selected had he not earlier had a "WhooHoo" experience. Referring now to FIG. 28, the document 2602 and the mobile device 102 showing one embodiment of the interface 2606 and the second advertisement 2802 are shown. In particular, the interface 2606 is updated to present the second advertisement 2802. The second advertisement 2802 is shown in extended window that expands to the left of marker 2608. This expansion functionality is particularly advantageous because when the second advertisement 2802 is closed, a minimal amount of screen space is occupied. In this embodiment, the extended window as the same color as the marker 2608 with a slightly smaller height than the marker 2608. The second advertisement 2802 includes information about the WhooHoo company in text and graphics.

Figure 29:
FIG. 29 is a graphic representation of a document and a mobile device showing one embodiment of the interface for dynamic presentation showing a third advertisement in accordance with the present invention.

FIG. 29 illustrates an example of how time/date context information is used to influence the outcome of that selection. FIG. 29 illustrates a third alternate advertisement 2902 that is used in place of the second advertisement 2802 of FIG. 28. In this case, the third advertisement 2902 has the same presentation and functionality as described above for the second advertisement 2802; however, the content of the advertisement is dramatically different. In this case, the third advertisement 2902 was selected because of the time of the year was close to Christmas and the user's profile stated that he "likes" Christmas. Thus, the third advertisement 2902 is an advertisement for Apple Computer that present Santa Claus instead of the second advertisement 2802 that provided information about WhooHoo.

Figure 30:
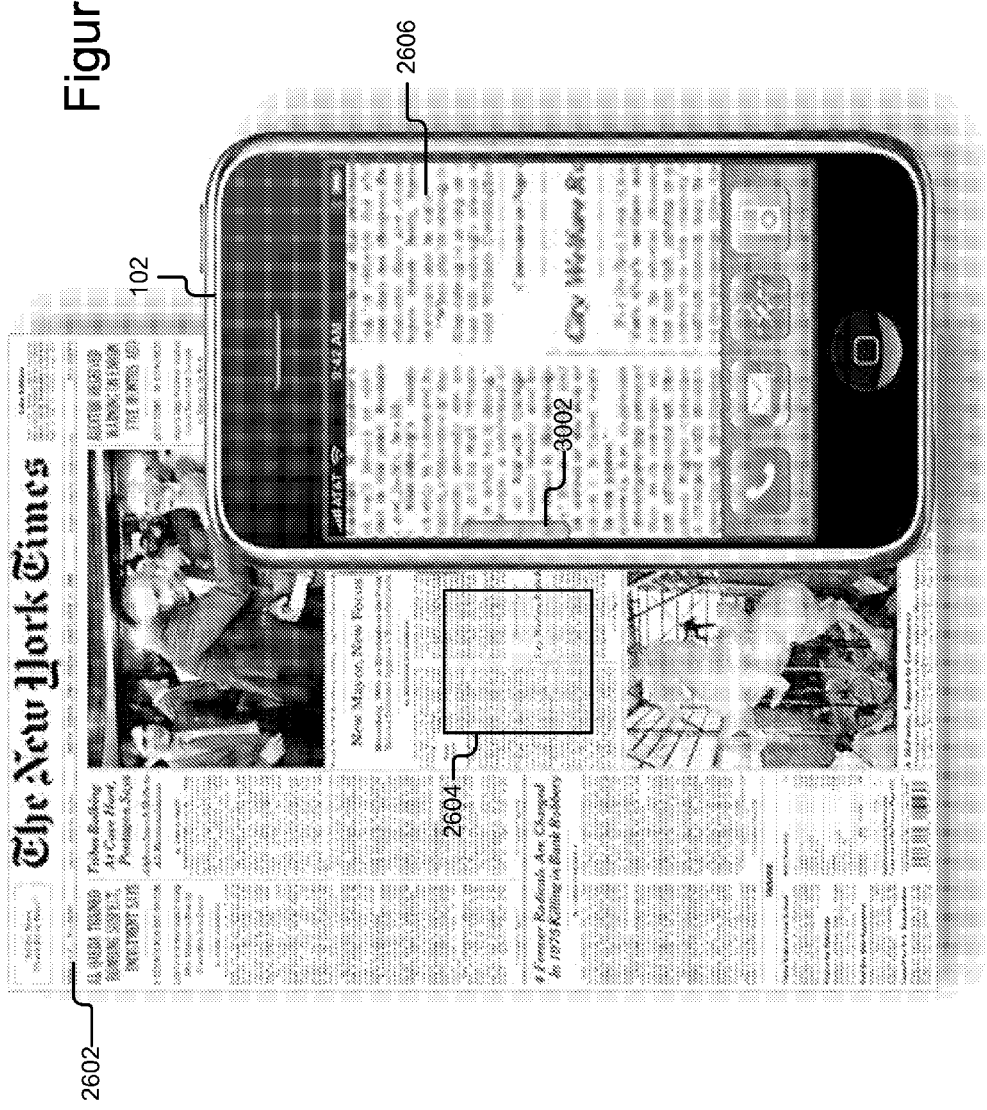
FIGS. 30 and 31 is a graphic representation of a document and a mobile device showing one embodiment of an interface for dynamic presentation showing a proximity indicator or an advertisement marker in accordance with the present invention.
Figure 31:

The system 2500 is also capable of using proximity information to locate relevant information pertaining to the user's current context. For instance, in the above example, as Fred continues to read the paper with the help of the application for the dynamic presentation of targeted information, the areas of the newspaper that provide enhanced content are reflected in the user interface 2602. In this embodiment, a proximity indicator 3002 is positioned about the periphery of the interface 2602 in the direction of the enhanced content. FIG. 30 shows the document 2602 and the mobile device 102 showing the interface 2606 for dynamic presentation with the proximity indicator 3002 in accordance with the present invention. In this embodiment, the proximity indicator 3002 has a similar shape to the markers 2610, 2608 for the advertisements but is orange in color so that it can be distinguished from the advertisement markers 2610, 2608. As noted above, the position of the proximity indicator 3002 is on the left side of the interface 2606 indicating that if the user were to move the mobile device 102 such that an image of the newspaper 2602 to the left of the current image were captured then there would be additional enhanced content associated with that area of the page 2602. When Fred sees the proximity indicator 3002, he knows that in order to see this information he needs to either broaden the view of the page 2602 by pulling the mobile device 102 back away from the page 2602 or move in the direction of the proximity indicator 3002. Thus in this scenario, Fred moves toward the proximity indicator 3002 as shown by the image patch of FIG. 31. After moving toward the proximity indicator 3002, the relevant ad becomes active (green) and is positioned near the text to which it is relevant. As can be seen, the orange proximity indicator 3002 is replaced by the green advertisement markers this 3102.

Figures 32A, 32B:
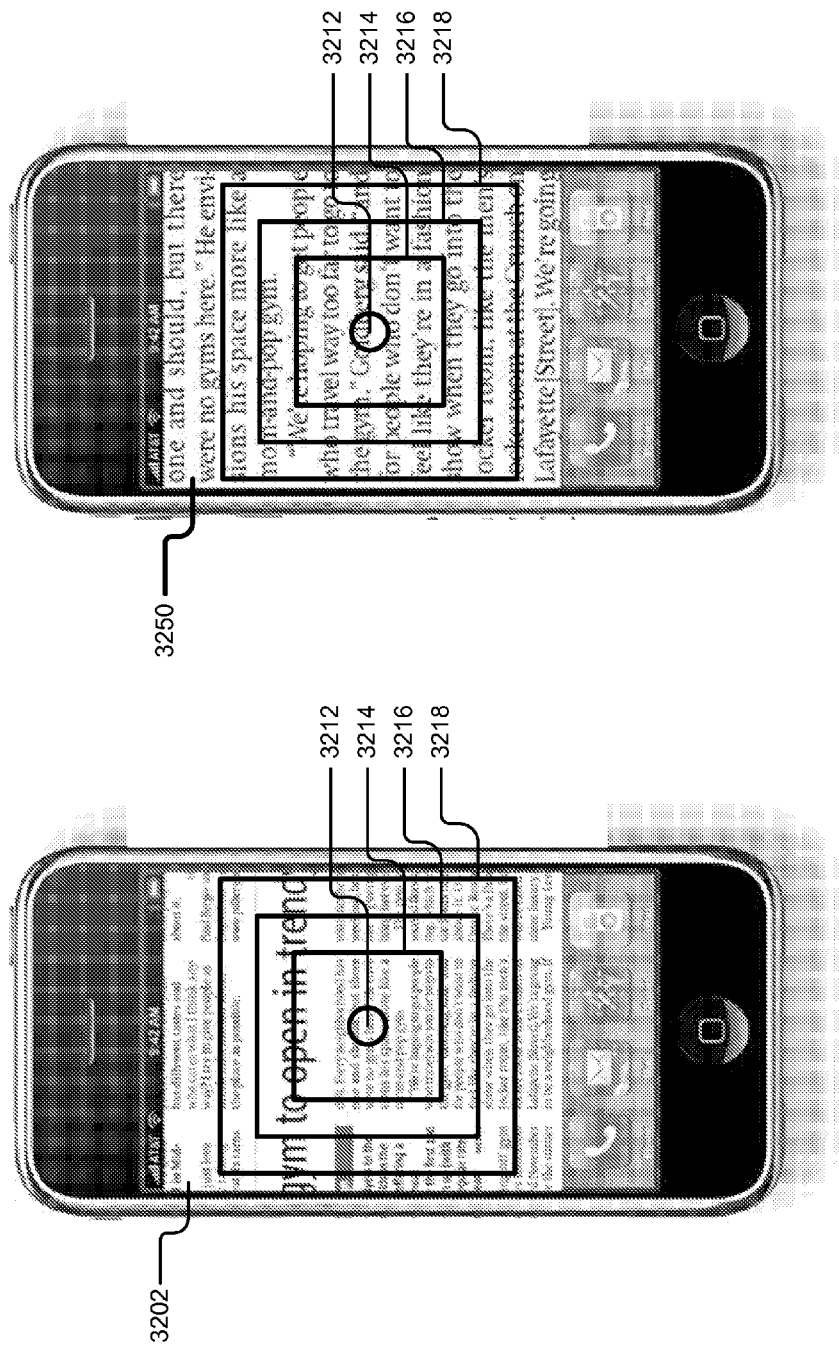
FIGS. 32A and 32B are graphic representations of a document showing proximity areas used in determining word relevancy in accordance with the present invention.

Referring now to FIGS. 32A and 32B, the process for determining word relevancy in accordance with the present invention will be described. The patch text and proximity word information are both used to weight the importance of words with respect to what the user is currently looking at with the mobile device 102. The system 2500 calculates the distance from the center of the current image outward using a distance measure. The system 2500 can calculate this because it has access to the source document the user is scanning Source document contents, at the time it was indexed and added to the MMR database 254, are stored in the database as follows:

"Word1" X, Y, width, height
"Word2" X, Y, width, height
"Word3" X, Y, width, height
....
"Wordn" X, Y, width, height When a patch is recognized by the MMR system 2500, the X, Y, width and height of the patch are used to locate the words from the document that fit in those coordinates. Next, a computation is performed to produce the distance weight for each word in the patch area where words closer to the center receive a higher value than words closer to the edge of the viewing area. One method to evaluate word distance uses a set of tiers 3212, 3214, 3216 and 3218 which establish the boundaries for the weighting process. For instance, FIG. 32A shows a text patch and the boundaries 3212, 3214, 3216 and 3218 which define how to weight individual words. Each tier 3212, 3214, 3216 and 3218 represents a portion of the current viewing area. For instance, the center tier 3214 (the one which provides the highest value is closest to the center) is represented by scaling the viewing area by 50% and using that size rectangle as tier 1. Each tier is then centered (vertically and horizontally) in the viewing area. Tier 2 3216, is computed by increasing the percentage to 70% thereby creating a slightly larger rectangle which is again centered in the viewing area. Thus depending on the configuration of the system 2500, this process continues until the last tier is created using the dimension of the viewing area. The configuration step provides the information needed to generate the tiers plus weights. For example, one embodiment uses tier value pairs [{T1=50%, 0.45}, {T2=60%, 0.35}, {T3=70%, 0.25}, {T4=80%, 0.08}, {T5=100%, 0.04}]. The value pairs define the rectangle size with respect to the current viewing image area along with the weight value assigned to words that fall within the tier rectangle's boundaries. Those skilled in the art will recognize that there are more complex and accurate methods for computing word distance that could easily replace this method. The same technique is used for weighting proximity for words that fall outside the current viewing area. If necessary, the entire catalog of words for the current document page can be used. FIGS. 32A and 32B are graphic representations of a document 3202 or 3250 showing the proximity areas 3212, 3214, 3216 and 3218 used in determining word relevancy in accordance with the present invention. The word weighting is based on proximity to the center 3212 of the viewing area. FIG. 32A shows the preview area 3202 generated on the display of the mobile device 102 when the camera is further away from the page, for example there are more words in the viewing area. In contrast, FIG. 32B shows the preview area 3250 generated on the display of the mobile device 102 when the camera is closer to the page, and for example there are few words in the viewing area.

Those skilled in the art will recognized that in an alternate embodiment the advertisements have an associated type, and the associated type is stored in the second database 2516 of advertising information. For example, the first advertisement type is commercial ads where the sponsor is trying to sell a product or service; the second advertisement type is free ads where the sponsor is trying to get information out to a select or specific audience; the third advertisement type is hobby ads where the user has completed the profile of interest and that profile is used in conjunction to display information related to the profile; and the final type of advertisement is a travel ad where the content of the advertisement is specifically related to travel. Those skilled in the art will recognize that there are a variety of advertisements other than those in this small sampling. Furthermore, it should be recognized that the more specific the information about context, the user and the advertisement, the more narrowly tailored the advertisement can be to the individual users. The more specifically tailored the advertisement, the greater the conversion rate in terms of sales and proliferation of information.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A computer-implemented method, the method comprising:

receiving an input image;

performing, with one or more processors, a visual search using the input image to produce recognized text;

receiving user profile information;

generating, with the one or more processors, relevant topics based on the recognized text and the user profile information;

receiving targeted information;

generating, with the one or more processors, relevant targeted information based on the recognized text, the targeted information, and the user profile information;
receiving user context information comprising a history of produced recognized text from previous visual searches; and
generating final targeted information based on the relevant topics, the relevant targeted information, and the user context information.

2. The computer-implemented method of claim 1, wherein receiving the input image comprises receiving the input image from a user device.

3. The computer-implemented method of claim 1, further comprising adjusting a weight of an element of the relevant targeted information based on the user context information.

4. The computer-implemented method of claim 1, wherein the user context information includes at least one from the group of a patch image; a recognized document; a location and page of a recognized document; recognized text from a patch image;
surrounding text for a patch image; image features of a patch image; hotspot information;
physical location where the image was captured; time of day when the image was captured; time of year when the image was captured; history of previous matches; and other images that were captured before the latest one.

5. The computer-implemented method of claim 1, wherein the targeted information includes advertisements.

6. The computer-implemented method of claim 1, further comprising transmitting the final targeted information for presentation on a user device.

7. A system comprising:
one or more processors;
a memory storing instructions, which when executed cause the one or more processors, to receive an input image, perform a visual search using the input image to produce recognized text, receive user profile information, receive targeted information, and receive user context information comprising a history of produced recognized text from previous visual searches;
one or more databases configured to store the user profile information, the targeted information, and the user context information;
a first comparison engine in communication with the one or more processors and the one or more databases, the first comparison engine configured to generate relevant topics based on the recognized text and the user profile information;
a second comparison engine in communication with the one or more processors and the one or more databases, the second comparison engine configured to generate relevant targeted information based on the recognized text and the targeted information; and
a third comparison engine, in communication with the first comparison engine and the second comparison engine, configured to generate final targeted information based on the relevant topics, the relevant targeted information, and the user context information.

8. The system of claim 7, wherein the one or more processors receive the input image from a user device.

9. The system of claim 7, further comprising:
a weight adjuster in communication with the first comparison engine, the weight adjustor configured to adjust a weight of an element of the relevant topics based on the user context information.

10. The system of claim 7, further comprising a weight adjuster in communication with the second comparison engine, the weight adjustor configured to adjust a weight of an element of the relevant targeted information based on the user context information.

11. The system of claim 7, wherein the user context information includes at least one from the group of a patch image; a recognized document; a location and page of a recognized document; recognized text from a patch image; surrounding text for a patch image; image features of a patch image; hotspot information; physical location where the image was captured; time of day when the image was captured; time of year when the image was captured; history of previous matches; and other images that were captured before the latest one.

12. The system of claim 7, wherein the targeted information includes advertisements.

13. The system of claim 7, further comprising a communication module configured to transmit the final targeted information for presentation on a user device.

14. A computer program product, the computer program product comprising a non-transitory computer usable medium including a computer readable program, wherein the computer readable program, when executed on a computer, causes the computer to:
receive an input image;
perform a visual search using the input image to produce recognized text;
receive user profile information;
generate relevant topics based on the recognized text and the user profile information;
receive targeted information;
generate relevant targeted information based on the recognized text, the targeted information, and the user profile information;
receive user context information comprising a history of produced recognized text from previous visual searches; and
generate final targeted information based on the relevant topics, the relevant targeted information, and the user context information.

15. The computer program product of claim 14, wherein receiving the input image comprises receiving the input image from a user device.

16. The computer program product of claim 14, wherein the computer readable program further causes the computer to adjust a weight of an element of the relevant targeted information based on the user context information.

17. The computer program product of claim 14, wherein the computer readable program further causes the computer to adjust a weight of an element of the relevant topics based on the user context information.

18. The computer program product of claim 14, wherein the user context information includes at least one from the group of a patch image; a recognized document; a location and page of a recognized document; recognized text from a patch image; surrounding text for a patch image; image features of a patch image; hotspot information; physical location where the image was captured; time of day when the image was captured; time of year when the image was captured; history of previous matches; and other images that were captured before the latest one.

19. The computer program product of claim 14, wherein the targeted information includes advertisements.

20. The computer program product of claim 14, wherein the computer readable program further causes the computer to transmit the final targeted information for presentation on a user device.

* * * * *